United States Patent [19]
Sakamoto et al.

[11] Patent Number: 6,014,195
[45] Date of Patent: *Jan. 11, 2000

[54] LCD DEVICE WITH POLARIZERS HAVING POLARIZING AND TRANSMITTANCE CHARACTERISTICS

[75] Inventors: Katsuhito Sakamoto, Sagamihara; Zenta Kikuchi, Hamura; Satoru Shimoda, Fussa; Hisashi Aoki, Hamura; Soichi Sato, Ome; Tetsushi Yoshida, Kanagawa-ken, all of Japan

[73] Assignee: Casio Computer Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/709,210

[22] Filed: Aug. 29, 1996

[30] Foreign Application Priority Data

| Sep. 1, 1995 | [JP] | Japan | 7-247028 |
| Sep. 6, 1995 | [JP] | Japan | 7-229001 |
| Oct. 25, 1995 | [JP] | Japan | 7-277568 |
| Oct. 27, 1995 | [JP] | Japan | 7-302312 |
| Oct. 27, 1995 | [JP] | Japan | 7-302317 |

[51] Int. Cl.$^7$ .................. G02F 1/1335; G02F 1/1347
[52] U.S. Cl. .................. 349/96; 349/113; 349/80
[58] Field of Search .................. 349/96, 99, 102, 349/103, 113, 106, 80, 176

[56] References Cited

U.S. PATENT DOCUMENTS

| 4,552,436 | 11/1985 | Kozaki et al. | 349/95 |
| 4,859,037 | 8/1989 | Iwashita et al. | 349/95 |
| 5,150,237 | 9/1992 | Iimura et al. | 349/99 |
| 5,206,752 | 4/1993 | Itoh et al. | 349/176 |
| 5,644,415 | 7/1997 | Aoki et al. | 349/123 |

FOREIGN PATENT DOCUMENTS 6-235930  8/1994  Japan.

*Primary Examiner*—William L. Sikes
*Assistant Examiner*—Toan Ton
*Attorney, Agent, or Firm*—Frishauf, Holtz, Goodman, Langer & Chick, P.C.

[57] ABSTRACT

A liquid crystal display device, for displaying pure white, has a first substrate having first electrodes formed thereon; a second substrate positioned to face the first substrate and having second electrodes formed thereon; a liquid crystal sealed between the first and second substrates; and first and second polarization plates arranged to sandwich the first and second substrates and having such polarization characteristics that when the first and second polarization plates are placed one on the other in such a way as to have substantially perpendicular transmission axes, a value acquired by dividing a transmittance of light with a wavelength of 500 nm by a transmittance of light with a wavelength of 440 nm becomes substantially smaller than 0.4. The first and second polarization plates have optical characteristics such that when the first and second polarization plates are placed one on the other in such a way as to have substantially parallel transmission axes, a value acquired by subtracting a transmittance of light with a wavelength of 640 nm from a transmittance of light with a wavelength of 460 nm is greater than −3%.

4 Claims, 68 Drawing Sheets

$\Delta n \cdot d = 800{\sim}1100$ nm

RETARDATION 60±20 nm

Δn·d = 800~1100nm

RETARDATION
215 ± 20 nm

RETARDATION
800~1100nm

RETARDATION 585±20 nm

RETARDATION 610±20 nm

Δn·d = 800~1100nm

BRIGHT RED

LITTLE BRIGHT RED

LITTLE DARK RED

DARK RED

| R1 R2 G1 G2 B1 B2 | DIGITAL VOLTAGE DATA |
|---|---|
| 0  0  0  0  0  1 |  |
| 0  0  0  0  1  0 | 1  0  0  1 |
| 0  0  0  0  1  1 |  |
|  |  |
| 1  1  1  1  1  1 | 1  1  1  1 |

FIG.78

| GRADATION DATA | DIGITAL VOLTAGE DATA |
|---|---|
| 0 0 0 | 0 1 1 0 1 |
| 0 0 1 | 0 1 1 1 0 |
| 0 1 0 | 0 1 1 1 1 |
| 1 1 1 | 1 0 1 0 0 |

LCD DEVICE WITH POLARIZERS HAVING POLARIZING AND TRANSMITTANCE CHARACTERISTICS

BACKGROUND OF THE INVENTION

1. Field of the Invention

The present invention relates to a liquid crystal display device, and, more particularly, to a electrically controlled birefringence (ECB) type liquid crystal display device capable of displaying full-color images.

2. Description of the Related Art

Color liquid crystal display (LCD) devices which display color images generally use color filters.

A color LCD device using this color filter suffers dark display due to the light absorbed by the color filter. When a color filter is used in a reflection type LCD device which is not equipped with a back light, particularly, the light is absorbed twice, at the incident time and the outgoing time, so that the display becomes very dark. It was therefore difficult to provide a reflection type color LCD device using a color filter.

Under this situation, recently, ECB type color LCD apparatuses which use no color filters and which, if they are of a reflection type, can present sufficient bright display.

An ECB type color LCD device comprises a liquid crystal (LC) cell, which is comprised of a pair of substrates which have electrodes formed on their opposing surfaces and a liquid crystal like a TN liquid crystal sealed between the two substrates, a pair of polarization plates sandwiching the LC cell, and a reflector provided outside one of the polarization plates. At least one retardation plate may be provided between the LC cell and the polarization plates.

In the ECB type color LCD apparatus, linearly polarized light which has passed one of the polarization plates becomes elliptically polarized light whose polarization state differs wavelength by wavelength, while passing the LC cell (and the retardation plate). As this elliptically polarized light passes the other polarization plate, the wavelength components of the light are selectively passed, thus presenting a display color. The birefringence of the liquid crystal can be controlled by controlling the voltage to be applied between the electrodes of the LC cell. This changes the polarization state of the light passing the LC cell to acquire the light with the desired color. It is therefore possible to display a plurality of colors with a single pixel.

The conventional ECB type color LCD apparatus however has the following problems.

1. The ECB type color LCD apparatus which uses conventional polarization plates suffers "white" becoming yellowish by the birefringence effect of the liquid crystal. To make this yellowish "white" to pure "white," a bluish polarization plate whose blue color is a complementary color to yellow may be used. Even with such a polarization plate, "white" still becomes yellowish. Moreover, the display of "black" becomes bluish, not dark.

2. Since the conventional ECB type color LCD apparatus cannot display pure and bright "white" and pure and dark "black," the display contrast is low. Further, this conventional ECB type color LCD apparatus cannot clearly display white and black, which are the basic display colors, and three primary colors of red (R), green (G) and blue (B) with high purities.

3. When a voltage is applied between the electrodes, the areas around the electrodes (non-display areas) show electro-optical responses different from those of the areas which display colors in accordance with the applied voltage. The display colors of the non-display areas therefore differ from the display colors of the electrode areas (display areas), thus lowing the purities of the display colors and the display contrast. To overcome this problem, a black mask is formed on the common electrodes (in the case of an active matrix LCD device) to shield the display of the non-display areas. In this case, however, possible misalignment of the upper and lower substrates may cause the black mask to cover the display areas to thereby reduce the effective area of the display areas, thus reducing the brightness of the displayed image.

4. As the display color and gradation (brightness) simultaneously change with respect to the applied voltage in the conventional ECB type color LCD apparatus, it is difficult to ensure gradation display and multi-color display. As a solution, an ECB type color LCD device and a monochromatic LCD device may be placed one on the other so that the light whose gradation is obtained by the monochromatic LCD device is colored by the conventional ECB type color LCD device, thus presenting gradation display for each color. Such a double LCD-device structure is complex and requires approximately two times the cost of a single LCD-device structure.

SUMMARY OF THE INVENTION

Accordingly, it is the primary object of the present invention to provide an LCD device capable of displaying colorless "white" and "black" with high purities.

It is the secondary object of this invention to provide an LCD device which can display clear "white," "black," "red," "green" and "blue" with high purities, and has a high display contrast.

It is the third object of this invention to provide an LCD device which can present bright display without reducing the purities in the display colors and the display contrast.

It is the fourth object of this invention to provide an LCD device which can accomplish multi-color display and gradation display with a simple structure.

By achieving the first to fourth objects, it is possible to provide an ECB type color LCD device capable of accomplishing full-color display.

To achieve the objects, the liquid crystal display device according to the first aspect of the present invention comprises:

a first substrate having first electrodes formed thereon;

a second substrate positioned to face said first substrate and having second electrodes formed thereon;

a liquid crystal sealed between said first and second substrates; and first and second polarization plates arranged to sandwich said first and second substrates and having such polarization characteristics that when said first and second polarization plates are placed one on the other in such a way as to have substantially perpendicular transmission axes, a value acquired by dividing a transmittance of light with a wavelength of 500 nm by a transmittance of light with a wavelength of 440 nm becomes substantially smaller than 0.4.

The first and second polarization plates may have optical characteristics such that when said first and second polarization plates are placed one on the other in such a way as to have substantially parallel transmission axes, a value acquired by subtracting a transmittance of light with a wavelength of 640 nm from a transmittance of light with a wavelength of 460 nm is greater than −3%.

A reflector may be provided outside of one of said first and second polarization plates.

The first and second polarization plates may be arranged to have said transmission axes set in such directions as to cause said liquid crystal display device to display a plurality of colors and pure white and black (achromatic colors) in accordance with a voltage applied between said first and second electrodes.

To achieve the objects, the liquid crystal display device according to the second aspect of the present invention comprises:

a liquid crystal cell having a liquid crystal sealed between a pair of substrates having electrodes formed thereon; and a pair of polarization plates arranged to sandwich said liquid crystal cell, said liquid crystal having molecules twisted from one of said pair of substrates toward the other substrate by a twist angle of 60°±5° to 90°±5°, a value of a product $\Delta n \cdot d$ of a refractive anisotropy $\Delta n$ of said liquid crystal of said liquid crystal cell and a layer thickness d being 800 to 1100 nm, said pair of polarization plates being arranged to have said transmission axes set in such directions that when white light is incident, lights with a plurality of colors and lights of colorless white and black go out in accordance with a voltage applied between said first and second electrodes.

The pair of polarization plates have polarization characteristics such that when said first and second polarization plates are placed one on the other in such a way as to have substantially perpendicular transmission axes, a value acquired by dividing a transmittance of light with a wavelength of 500 nm by a transmittance of light with a wavelength of 440 nm is less than 0.4.

The molecules of said liquid crystal are twisted from one of said pair of substrates toward the other substrate by a twist angle of, for example, 75°±10°; and said pair of polarization plates are arranged in such a way that given that an aligning direction of said molecules of said liquid crystal in a vicinity of said one substrate is set to a direction of 0°, said transmission axis of one of said polarization plates which faces said one substrate is set in a direction of, for example, 52.5°±3° with respect to an opposite direction to a twisted direction of said molecules of said liquid crystal and said transmission axis of the other polarization plate facing the other substrate is set in a direction of, for example, 47.5°±3° with respect to said twisted direction of said molecules of said liquid crystal.

The liquid crystal display device may have one to three retardation plates intervened between said liquid crystal cell and said polarization plates.

The liquid crystal display device may have a back light.

To achieve the objects, the liquid crystal display device according to the third aspect of the present invention comprises:

a first substrate having pixel electrodes and active elements arranged thereon in a matrix form, said active elements being respectively connected to said pixel electrodes;

a second substrate facing said first substrate and having common electrodes so arranged as to respectively face said pixel electrodes;

a liquid crystal sealed between said first and second substrates, an alignment state of said liquid crystal being changed in accordance with a voltage applied between said pixel electrodes and said common electrodes;

a pair of polarization plates arranged so as to sandwich said first and second substrates and to display a color according to a change in said alignment state of said liquid crystal; and an optically nontransparent black mask formed in a non-display area where said pixel electrodes are not formed, said black mask being smaller than said non-display area.

The non-display area is comprised of, for example, an area which cannot display a desired color when a predetermined voltage is applied between said pixel electrodes and said common electrodes.

The black mask is comprised of, for example, a light shielding film formed on a non-display area portion on said second substrate having said common electrodes formed thereon. The black mask may be comprised of an overcoat layer formed on said first substrate to cover said active elements and a light shielding film formed smaller than said non-display area between said pixel electrodes.

To achieve the objects, the liquid crystal display device according to the fourth aspect of the present invention comprises:

a first substrate having scan electrodes arranged thereon;

a second substrate facing said first substrate and having signal electrodes so arranged as to respectively face said scan electrodes;

a liquid crystal sealed between said first and second substrates, an alignment state of said liquid crystal being changed in accordance with a voltage applied between said scan electrodes and said signal electrodes;

a pair of polarization plates arranged so as to sandwich said first and second substrates and to display a color according to a change in said alignment state of said liquid crystal; and an optically nontransparent black mask formed in a non-display area where said scan electrodes do not face said signal electrodes, said black mask being smaller than said non-display area.

To achieve the objects, the liquid crystal display apparatus according to the fifth aspect of the present invention comprises:

an electrically controlled birefringence type liquid crystal display device including a first substrate having first electrodes arranged thereon, a second substrate facing said first substrate and having second electrodes arranged on that surface thereof which faces said first substrate, a liquid crystal located between said first and second substrates, a polarization plate arranged outside at least one of said first and second substrates, individual pixels being formed by opposing portions of said first electrodes and said second electrodes and said liquid crystal therebetween, whereby one of a plurality of colors is displayed in accordance with a first applied voltage in a predetermined range to be applied to said liquid crystal and substantially black and white, i.e., achromatic colors are displayed in accordance with a second applied voltage in a voltage range different from said range of said first applied voltage;

image data output means for outputting image data specifying a color and gradation of each pixel; and drive means for converting image data output from said image data output means to color data and gradation data, applying a voltage corresponding to said color data between said first and second electrodes associated with one or more of a plurality of adjoining pixels of said electrically controlled birefringence type liquid crystal display device and applying a voltage corresponding to said gradation data between said first and second electrodes associated with other pixels in said plurality of adjoining pixels, wherein colors and gradations specified by said image data are displayed by visual combination of displays of said plurality of adjoining pixels.

The liquid crystal display apparatus according to the sixth comprises:

an electrically controlled birefringence type liquid crystal display device including a first substrate having first electrodes arranged thereon, a second substrate facing said first substrate and having second electrodes arranged on that surface thereof which faces said first substrate, a liquid crystal located between said first and second substrates, a polarization plate arranged outside at least one of said first and second substrates, individual pixels being formed by opposing portions of said first electrodes and said second electrodes and said liquid crystal therebetween, whereby one of a plurality of colors is displayed in accordance with a first applied voltage in a predetermined range to be applied to said liquid crystal and white and black (achromatic colors) are displayed in accordance with a second applied voltage in a voltage range different from said range of said first applied voltage;

image data output means for outputting image data specifying a color and gradation of each pixel; and drive means for converting image data output from said image data output means to color data and gradation data, and alternately applying a voltage corresponding to said color data and a voltage corresponding to said gradation data between said first and second electrodes associated with each pixel of said electrically controlled birefringence type liquid crystal display device over two or more consecutive frames, wherein color gradation display is accomplished by visual combination of display colors and display gradations of individual pixels over a plurality of frames.

The liquid crystal display apparatus according to the seventh aspect of the present invention comprises:

an electrically controlled birefringence type liquid crystal display device having a plurality of pixels for displaying one of a plurality of colors in accordance with a first applied voltage in a predetermined range and displaying white and black (achromatic colors) in accordance with a second applied voltage in a voltage range different from said range of said first applied voltage, said pixels being arranged in a matrix form;

image data output means for outputting image data specifying a color and gradation of each pixel; and drive means for converting image data output from said image data output means to color data and gradation data, and alternately applying a voltage corresponding to said color data and a voltage corresponding to said gradation data between first electrodes and second electrodes associated with individual pixels of said electrically controlled birefringence type liquid crystal display device over two or more consecutive frames.

BRIEF DESCRIPTION OF THE DRAWINGS

FIG. 78 is a diagram showing an example of a first conversion table of the LCD apparatus in FIG. 74;

FIG. 79 is a diagram showing an example of a second conversion table of the LCD apparatus in FIG. 74.

DETAILED DESCRIPTION OF THE PREFERRED EMBODIMENTS

Preferred embodiments of the present invention will now be described with reference to the accompanying drawings.

First Embodiment

Figure 1:
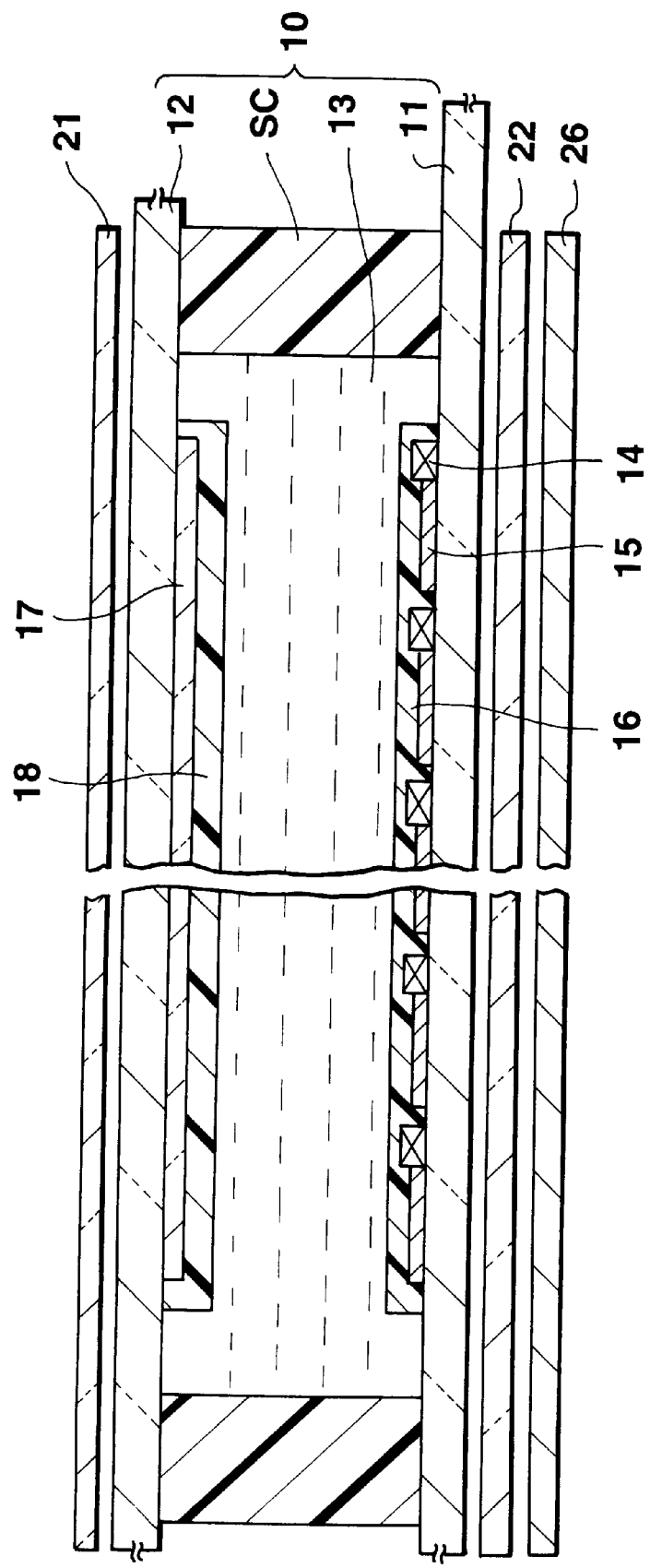
FIG. 1 is a cross-sectional view illustrating the structure of an ECB type color LCD device according to the first embodiment of this invention.
Figure 2:
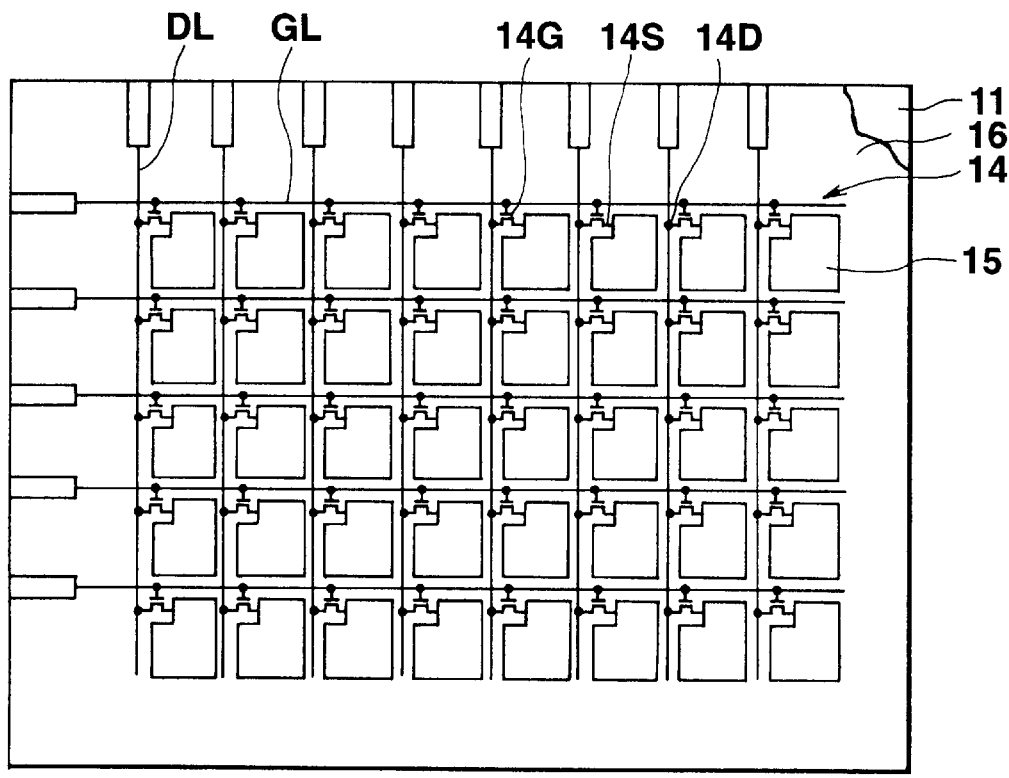
FIG. 2 is a plan view showing the structure of a TFT substrate of the color LCD device in FIG. 1.
Figure 3:
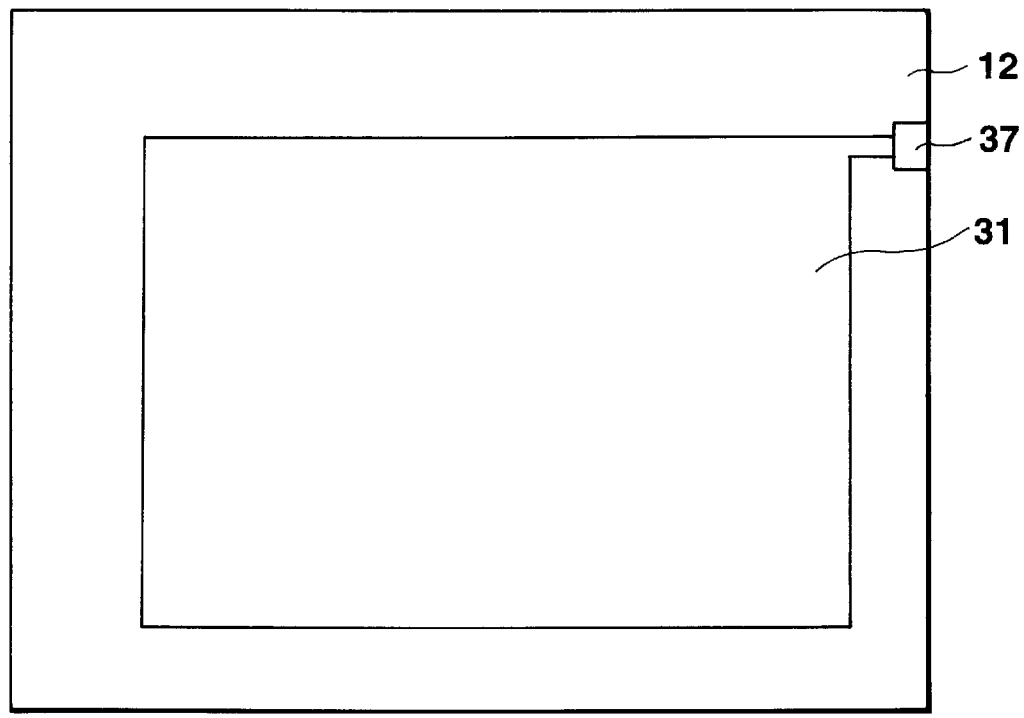
FIG. 3 is a plan view showing the structure of an electrode on an opposing substrate of the color LCD device in FIG. 1.

FIG. 1 illustrates the sectional structure of an ECB type color LCD device according to this embodiment, FIG. 2 depicts the planar structure of a TFT substrate of the color LCD device in FIG. 1, and FIG. 3 shows the planar structure of an opposing substrate of the color LCD device in FIG. 1.

As shown in FIG. 1, this LCD device comprises an LC cell 10, which is constituted of a pair of transparent substrates 11 and 12 connected by a seal member SC and a liquid crystal 13 sealed between those transparent substrates 11 and 12, polarization plates 21 and 22 sandwiching the LC cell 10, and a reflector 26 located outside of the polarization plate 22.

The transparent substrates 11 and 12 are glass substrates, reflective film substrates or the like.

As shown in FIGS. 1 and 2, TFTs (Thin Film Transistors) 14 and pixel electrodes 15 connected to source electrodes 14S of the associated TFTs 14 are arranged in a matrix form on the lower transparent substrate (hereinafter referred to as "TFT substrate") 11, and an aligning film 16 is formed on the TFTs 14 and the pixel electrodes 15.

As shown in FIG. 2, gate electrodes 14G of each row of TFTs 14 are connected to an associated gate line GL, and drain electrodes 14D of each column of TFTs 14 are connected to an associated data line DL.

As shown in FIGS. 1 and 3, transparent opposing electrodes 17 opposing to the pixel electrodes 15 are formed on the upper transparent substrate (hereinafter referred to as "opposing substrate") 12. The opposing electrodes 17 are formed of ITO or the like, and are applied with a reference voltage (common voltage) via electrode leads 37. An aligning film 18 of polyimide or the like is formed on the opposing electrodes 17.

Figure 4:
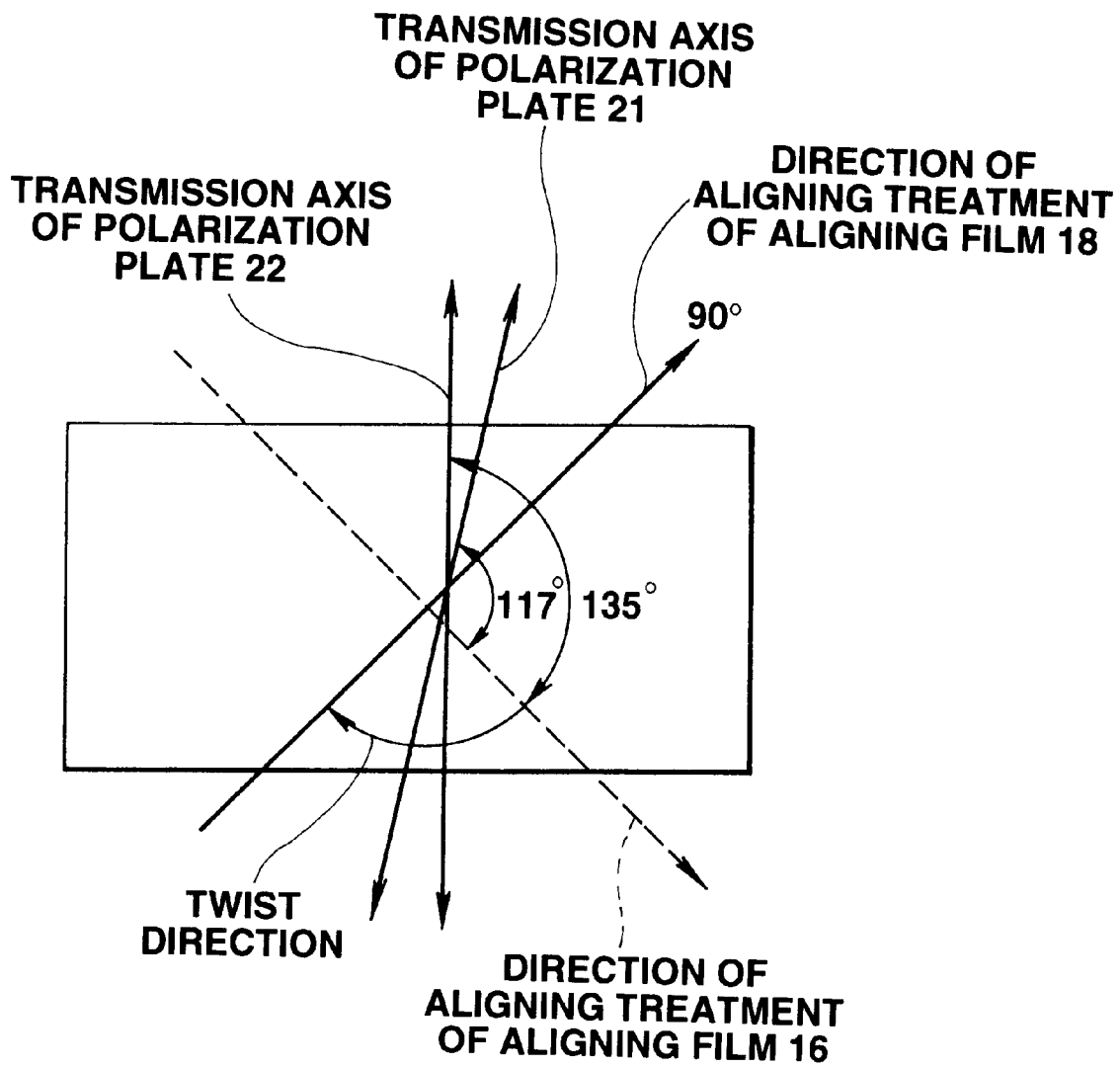
FIG. 4 is a diagram for explaining the direction of an aligning treatment and the aligning direction of a liquid crystal according to the first embodiment.

In this embodiment, an aligning treatment like rubbing is performed on the lower aligning film 16 in the direction indicated by the broken line in FIG. 4 (the direction of 0°), and an aligning treatment is performed on the upper aligning film 18 in the direction indicated by the solid line in FIG. 4 (the direction of 90°).

The liquid crystal 13 is a nematic liquid crystal (TN liquid crystal) added with a chiral substance and is twisted by 90° (0° to −90°) clockwise toward the opposing substrate 12 from the TFT substrate 11 in accordance with the aligning treatment.

As shown in FIG. 4, the lower polarization plate 22 has its transmission axis set to intersect the direction of the aligning treatment performed on the lower aligning film 16 by approximately 135° counterclockwise, and the upper polarization plate 21 has its transmission axis set to intersect the direction of the aligning treatment performed on the lower aligning film 16 by approximately 117° counterclockwise.

According to the thus constituted ECB type TFT color LCD device, the linearly polarized light which has passed the polarization plate 21 has various wavelength components, which are affected by the birefringence effect of the liquid crystal 13 that differs wavelength by wavelength, and which become different elliptically polarized lights that differ wavelength by wavelength, while passing the liquid crystal 13.

Of the light components which have passed the liquid crystal 13, only those components which are parallel to the transmission axis of the polarization plate 22 pass through the polarization plate 22 and are reflected at the reflector 26.

The light components reflected at the reflector 26 pass the liquid crystal 13 again and are affected by the birefringence effect to become polarization states which further differ wavelength by wavelength. Of the light components which have passed the liquid crystal 13, only the components which are parallel to the transmission axis of the polarization plate 21 pass therethrough and go out. The color that is determined by the wavelength components of the outgoing light is displayed.

When a voltage is applied between the pixel electrodes 15 and the opposing electrodes 17, the molecular arrangement (alignment) of the liquid crystal 13 varies in accordance with this voltage and the birefringence of the liquid crystal varies. This changes the state of the elliptically polarized light by the birefringence effect of the liquid crystal 13 is changed. Consequently, the color and intensity of the light outgoing from the polarization plate 21 change to ensure color display of red, green, blue and so forth and white, black and the like.

According to this invention, the individual characteristics and a combination of the polarization plates 21 and 22 are selected in such a way as to reduce the coloring of "white" which is displayed in accordance with the applied voltage. Conducted experiments have proved that "white" with less coloring can be displayed and high-quality images can be displayed by the use of the polarization plates 21 and 22 whose transmittances have spectral characteristics that satisfy an equation (1) when they are placed one on the other in such a way that their transmission axes are perpendicular to each other (perpendicular transmission axes) and whose transmittances have spectral characteristics that satisfy an equation (2) when they are placed one on the other in such a way that their transmission axes are parallel to each other (parallel transmission axes). In this respect, the polarization plates 21 and 22 have the characteristics which fulfill at least the equation (1) and desirably fulfill the equation (2).

(transmittance of 500-nm light)/(transmittance of 440-nm light)<0.4    (1)

(transmittance of 460-nm light)−(transmittance of 640-nm light)>−3%    (2)

A specific description will now be given of how the quality of displayed images is improved by using the polarization plates that satisfy the equations (1) and (2).

First, to define the spectral characteristics of a pair of polarization plates, the ratio of the transmittance of light with a wavelength of 500 nm to the transmittance of light with a wavelength of 440 nm when the polarization plates are placed one on the other in such a way as to have perpendicular transmission axes is introduced as the first parameter in this invention. According to the conventional combinations of polarization plates, the transmittance when the polarization plates are placed one on the other in such a way as to have perpendicular transmission axes has peaks or maximum values near 440 nm and 500 nm. This first parameter represents the ratio of those maximum values or represents the spectral distribution of leak light.

The difference between the transmittance of light with a wavelength of 460 nm and the transmittance of light with a wavelength of 640 nm when the polarization plates are placed one on the other in such a way as to have parallel transmission axes is introduced as the second parameter. This second parameter represents the flatness of the spectral characteristics of the transmittance when a pair of polarization plates are placed one on the other in such a way as to have parallel transmission axes. In general, the longer the wavelength gets, the higher the transmittance becomes, and the second parameter normally takes a negative value.

Table 1 below shows the spectral characteristics of four examples of a plurality of combinations each using a pair of polarization plates which were used in the experiments.

TABLE 1

| Wavelength | Perpendicular | | | |
|---|---|---|---|---|
| | Emb.1-1 | Emb.1-2 | Comp.Ex.1-1 | Comp.Ex. 1-2 |
| 440nm | 1.050% | 2.815% | 0.775% | 2.005% |
| 500nm | 0.370% | 0.565% | 0.410% | 1.700% |
| $T_{500}/T_{440}$ | 0.352 | 0.201 | 0.529 | 0.848 |
| | Parallel | | | |
| 460nm | 36.99% | 38.32% | 35.75% | 36.24% |
| 640nm | 41.42% | 40.53% | 41.23% | 40.27% |
| $T_{460}-T_{640}$ | −4.43% | −2.21% | −5.48% | −4.03% |

Figure 18:
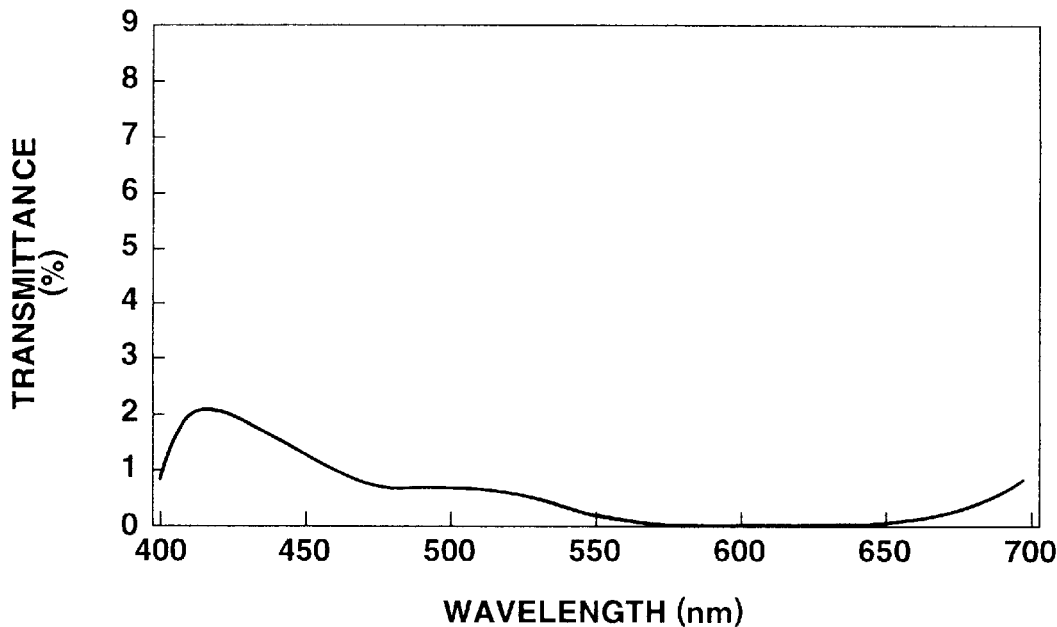
FIG. 18 is a diagram showing the spectral characteristics of the transmittance when two first polarization plates in a comparative example 1-1 are placed one on the other in such a way as to have perpendicular transmission axes.
Figure 19:
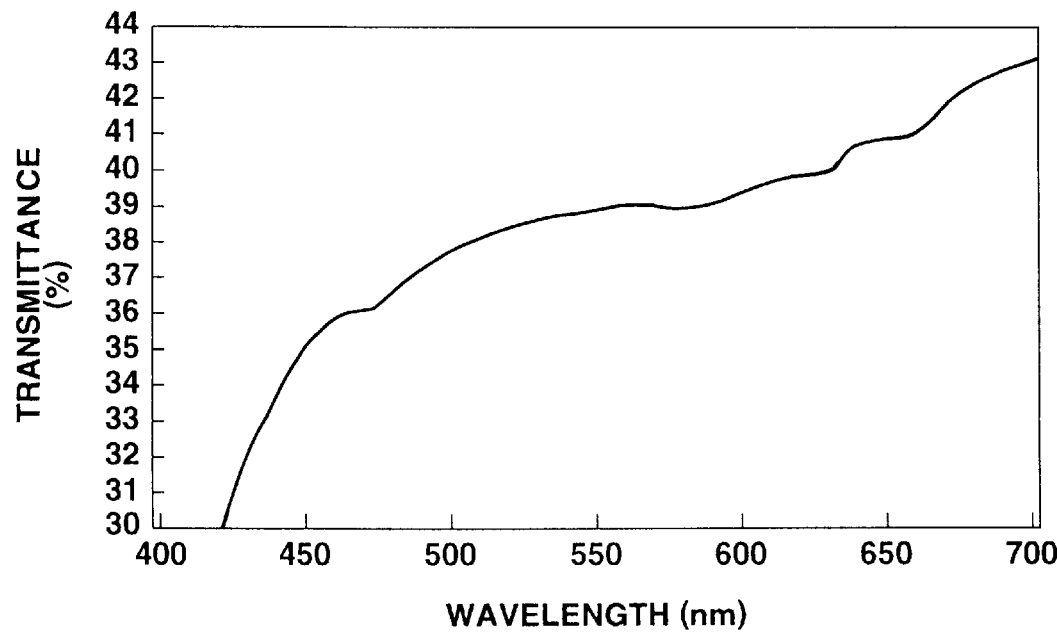
FIG. 19 is a diagram showing the spectral characteristics of the transmittance when the two first polarization plates in the comparative example 1-1 are placed one on the other in such a way as to have parallel transmission axes.
Figure 20:
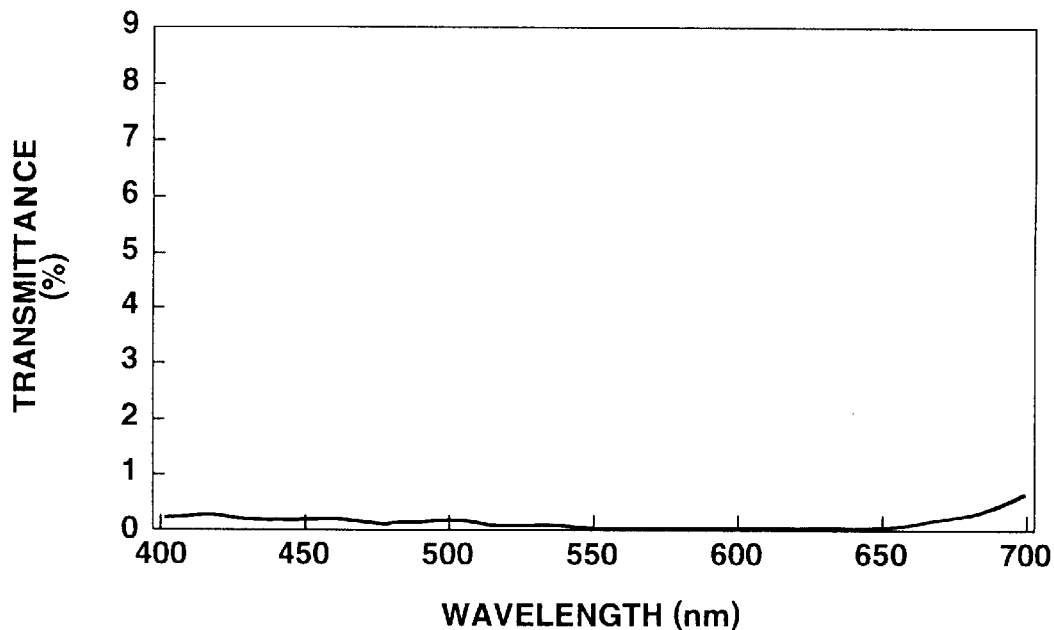
FIG. 20 is a diagram showing the spectral characteristics of the transmittance when two second polarization plates in the comparative example 1-1 are placed one on the other in such a way as to have perpendicular transmission axes.
Figure 21:
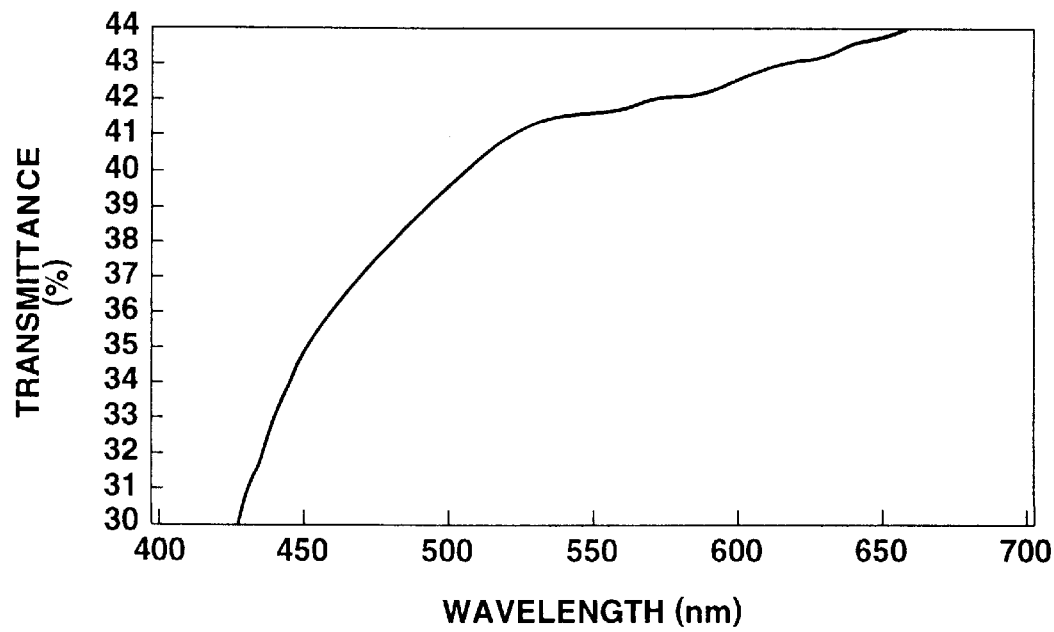
FIG. 21 is a diagram showing the spectral characteristics of the transmittance when the two second polarization plates in the comparative example 1-1 are placed one on the other in such a way as to have parallel transmission axes.

In Table 1, the comparative example 1-1 uses a pair of polarization plates including a first polarization plate whose transmittance has spectral characteristics shown in FIG. 18 when placed on another first polarization plate in such a way as to have perpendicular transmission axes and whose transmittance has spectral characteristics shown in FIG. 19 when those first polarization plates are placed one on the other in such a way as to have parallel transmission axes, and a second polarization plate whose transmittance has spectral characteristics shown in FIG. 20 when placed one on another second polarization plate in such a way as to have perpendicular transmission axes and whose transmittance has spectral characteristics shown in FIG. 21 when those second polarization plates are placed one on the other in such a way as to have parallel transmission axes.

Figure 22:
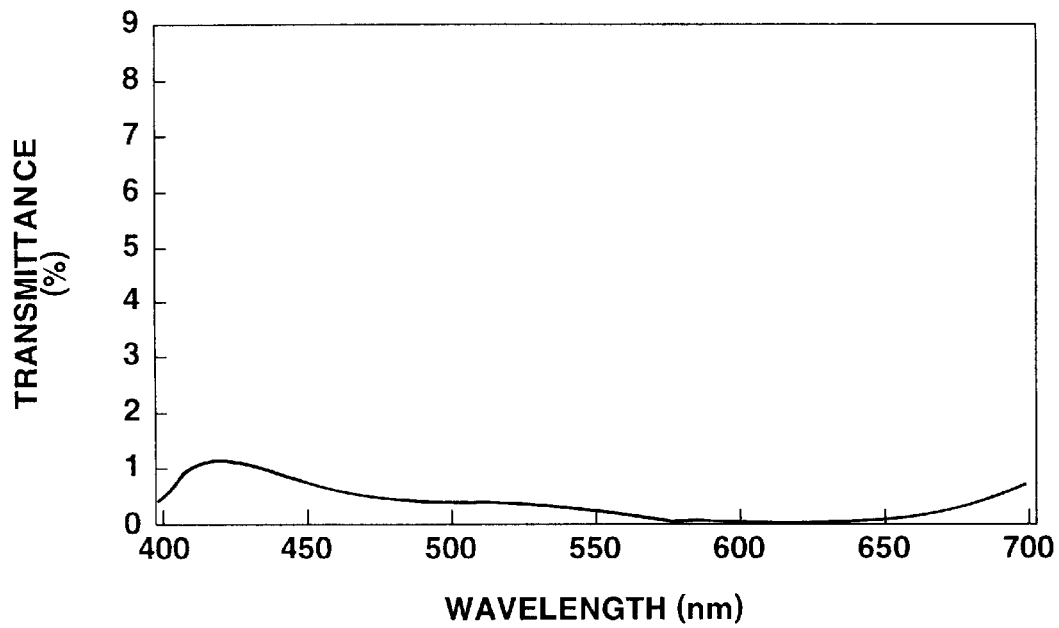
FIG. 22 is a diagram showing the spectral characteristics of the transmittance when first and second polarization plates in the comparative example 1-1 are placed one on the other in such a way as to have perpendicular transmission axes.
Figure 23:
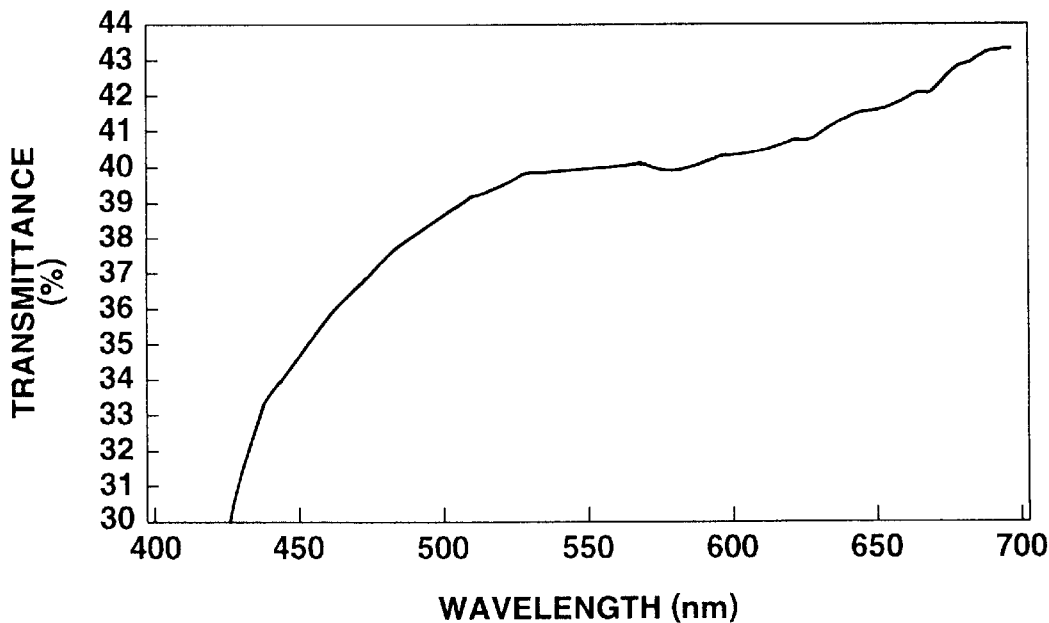
FIG. 23 is a diagram showing the spectral characteristics of the transmittance when the first and second polarization plates in the comparative example 1-1 are placed one on the other in such a way as to have parallel transmission axes.

In this case, the spectral characteristics of the transmittances of the first and second polarization plates when placed one on the other in such a way as to have perpendicular transmission axes become as shown in FIG. 22, and the spectral characteristics of the transmittances of the first and second polarization plates when placed one on the other in such a way as to have parallel transmission axes become as shown in FIG. 23.

From the spectral characteristics shown in FIG. 22, the first parameter $T_{500}/T_{440}$ becomes 0.529 greater than a reference value of 0.4. From the spectral characteristics shown in FIG. 23, the second parameter $T_{460}$-$T_{640}$ becomes −5.48% smaller than a reference value of −3%. That is, both equations (1) and (2) are not fulfilled.

Figure 24:
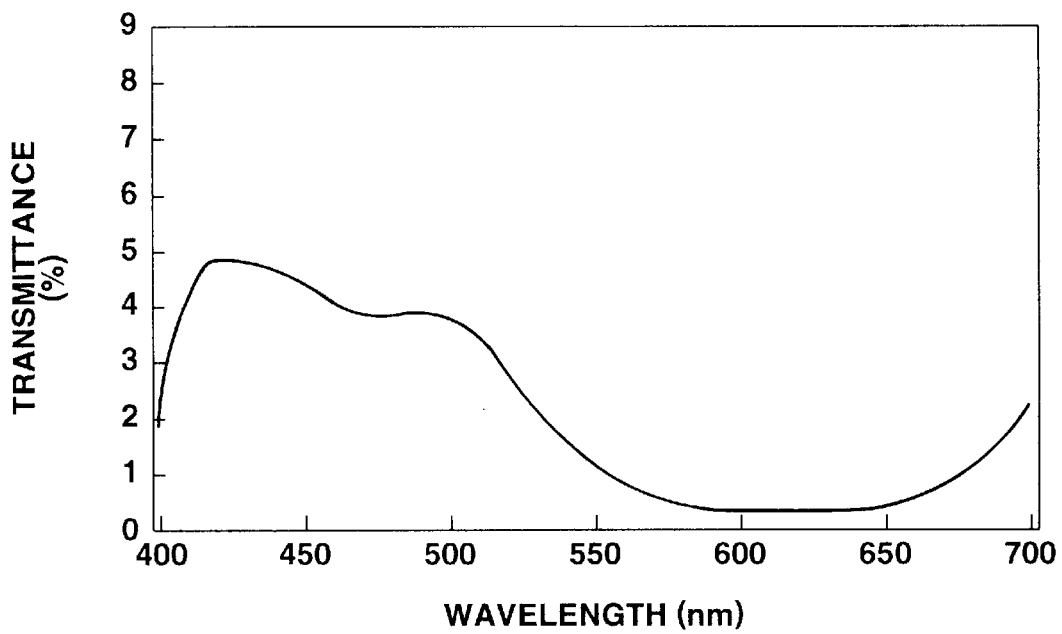
FIG. 24 is a diagram showing the spectral characteristics of the transmittance when two first polarization plates in a comparative example 1-2 are placed one on the other in such a way as to have perpendicular transmission axes.
Figure 25:
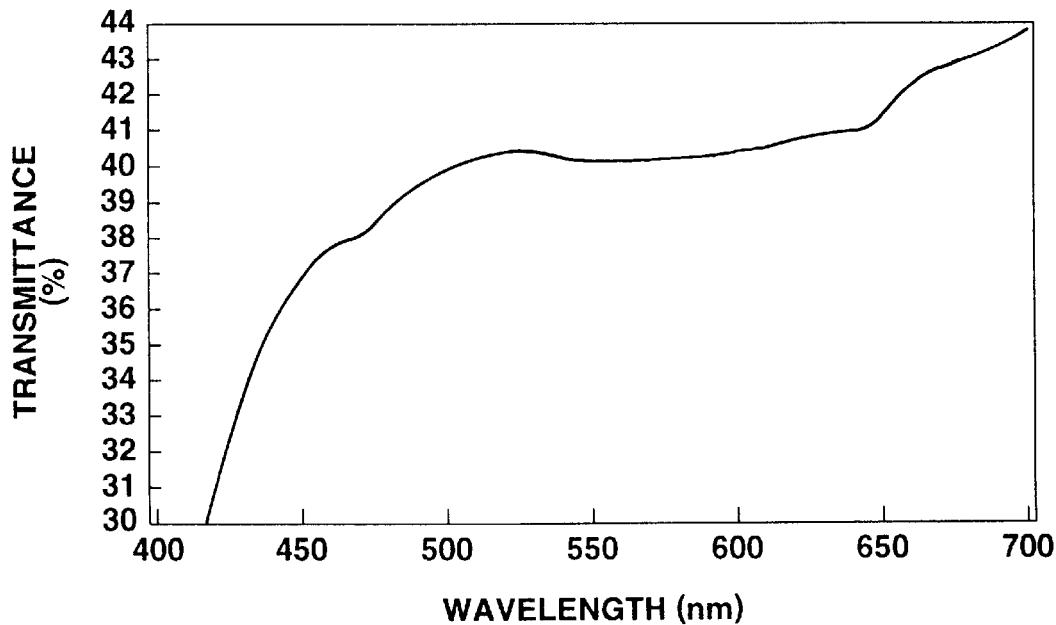
FIG. 25 is a diagram showing the spectral characteristics of the transmittance when the two first polarization plates in the comparative example 1-2 are placed one on the other in such a way as to have parallel transmission axes.
Figure 26:
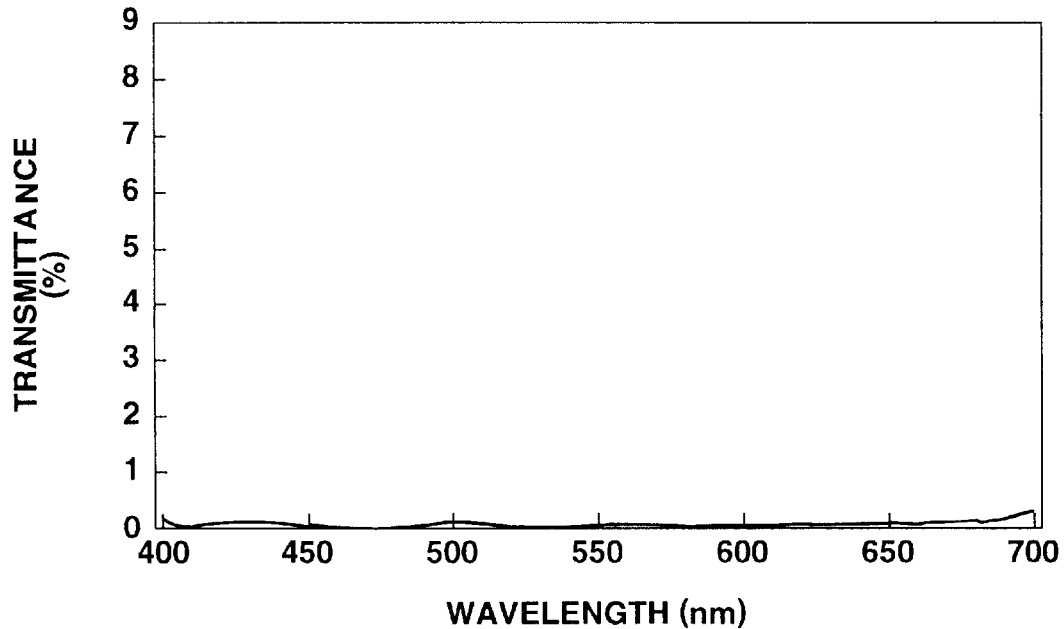
FIG. 26 is a diagram showing the spectral characteristics of the transmittance when two second polarization plates in the comparative example 1-2 are placed one on the other in such a way as to have perpendicular transmission axes.
Figure 27:
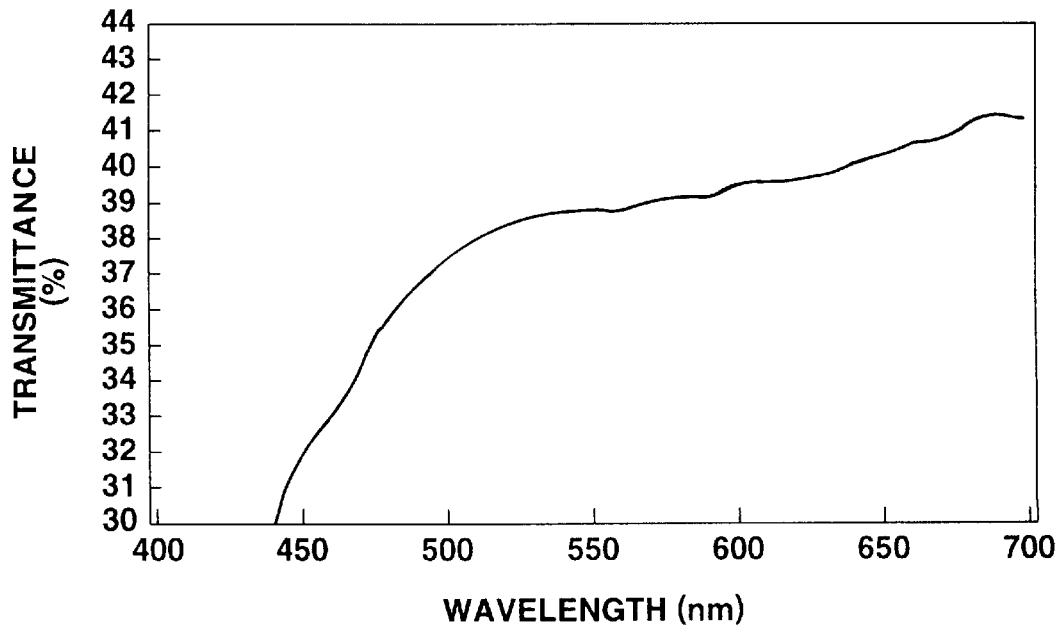
FIG. 27 is a diagram showing the spectral characteristics of the transmittance when the two second polarization plates in the comparative example 1-2 are placed one on the other in such a way as to have parallel transmission axes.

The comparative example 1-2 uses a pair of polarization plates including a first polarization plate whose transmittance has spectral characteristics shown in FIG. 24 when placed on another first polarization plate in such a way as to have perpendicular transmission axes and whose transmittance has spectral characteristics shown in FIG. 25 when those first polarization plates are placed one on the other in such a way as to have parallel transmission axes, and a second polarization plate whose transmittance has spectral characteristics shown in FIG. 26 when placed on another second polarization plate in such a way as to have perpendicular transmission axes and whose transmittance has spectral characteristics shown in FIG. 27 when those second polarization plates are placed one on the other in such a way as to have parallel transmission axes.

Figure 28:
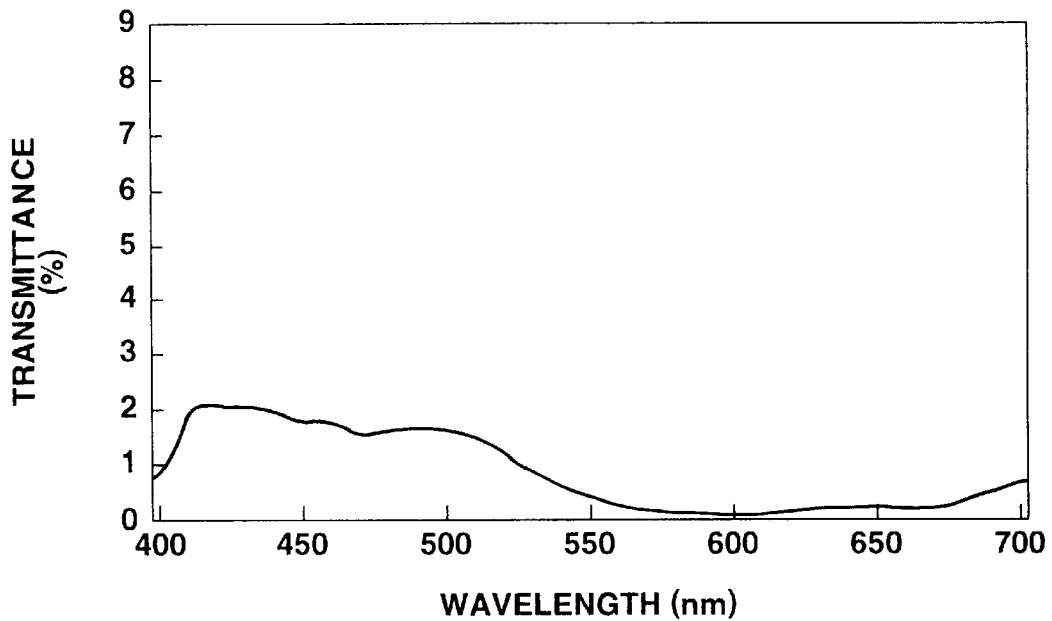
FIG. 28 is a diagram showing the spectral characteristics of the transmittance when first and second polarization plates in the comparative example 1-2 are placed one on the other in such a way as to have perpendicular transmission axes.
Figure 29:
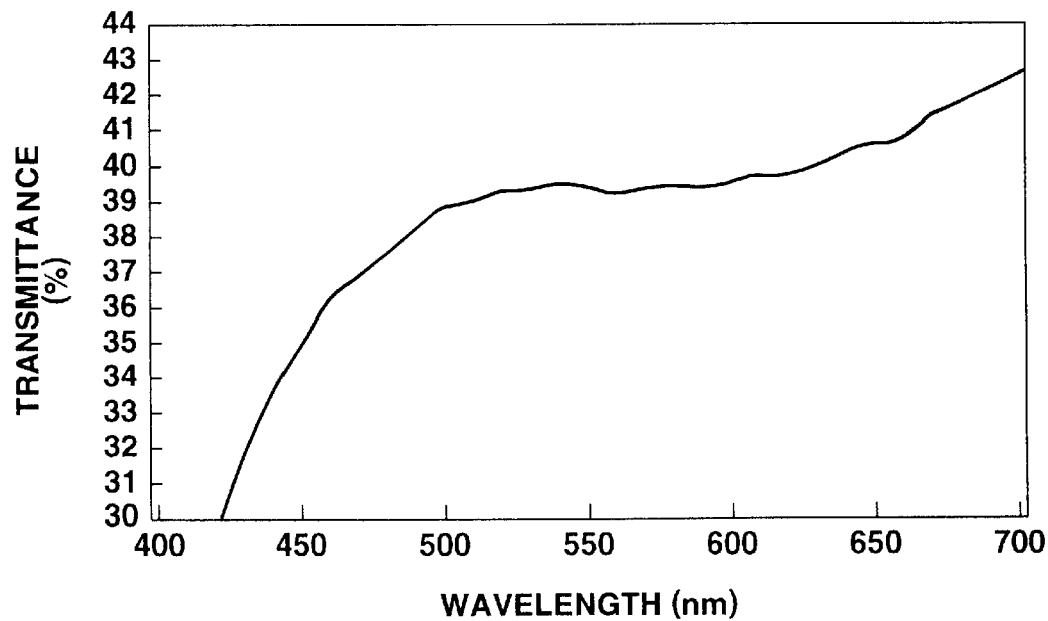
FIG. 29 is a diagram showing the spectral characteristics of the transmittance when the first and second polarization plates in the comparative example 1-2 are placed one on the other in such a way as to have parallel transmission axes.

In this case, the spectral characteristics of the transmittances of the first and second polarization plates when placed one on the other in such a way as to have perpendicular transmission axes become as shown in FIG. 28, and the spectral characteristics of the transmittances of the first and second polarization plates when placed one on the other in such a way as to have parallel transmission axes become as shown in FIG. 29.

From the spectral characteristics shown in FIG. 28, the first parameter $T_{500}/T_{440}$ becomes 0.848 greater than the reference value of 0.4. From the spectral characteristics shown in FIG. 29, the second parameter $T_{460}$-$T_{640}$ becomes −4.03% smaller than the reference value of −3%. That is, both equations (1) and (2) are not fulfilled.

Figure 5:
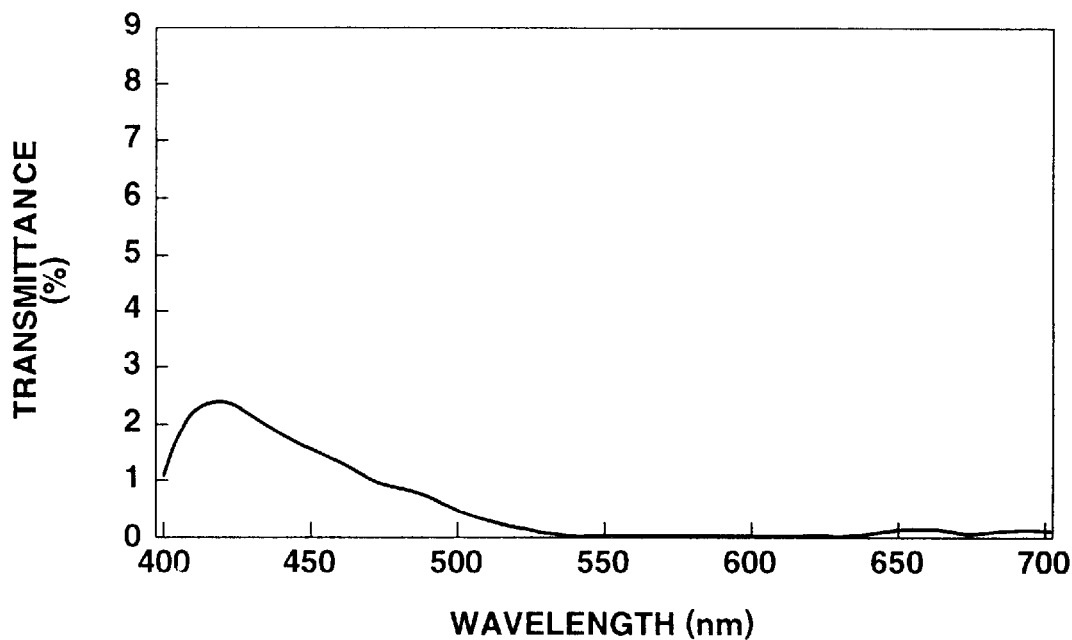
FIG. 5 is a diagram showing the spectral characteristics of the transmittance when two first polarization plates in an embodiment 1-1 are placed one on the other in such a way as to have perpendicular transmission axes.
Figure 6:
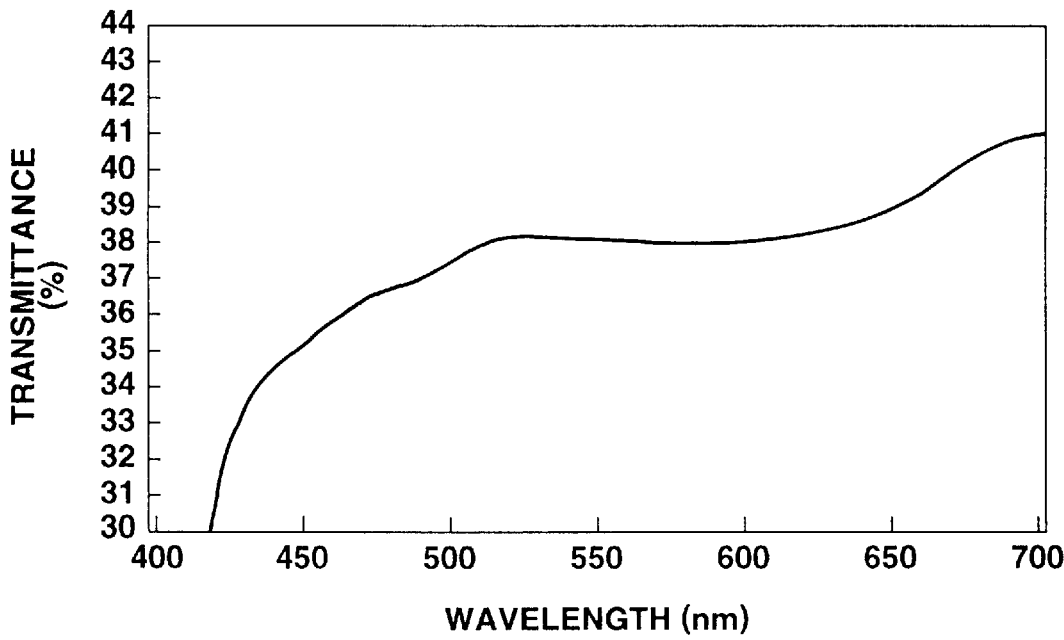
FIG. 6 is a diagram showing the spectral characteristics of the transmittance when the two first polarization plates in the embodiment 1-1 are placed one on the other in such a way as to have parallel transmission axes.
Figure 7:
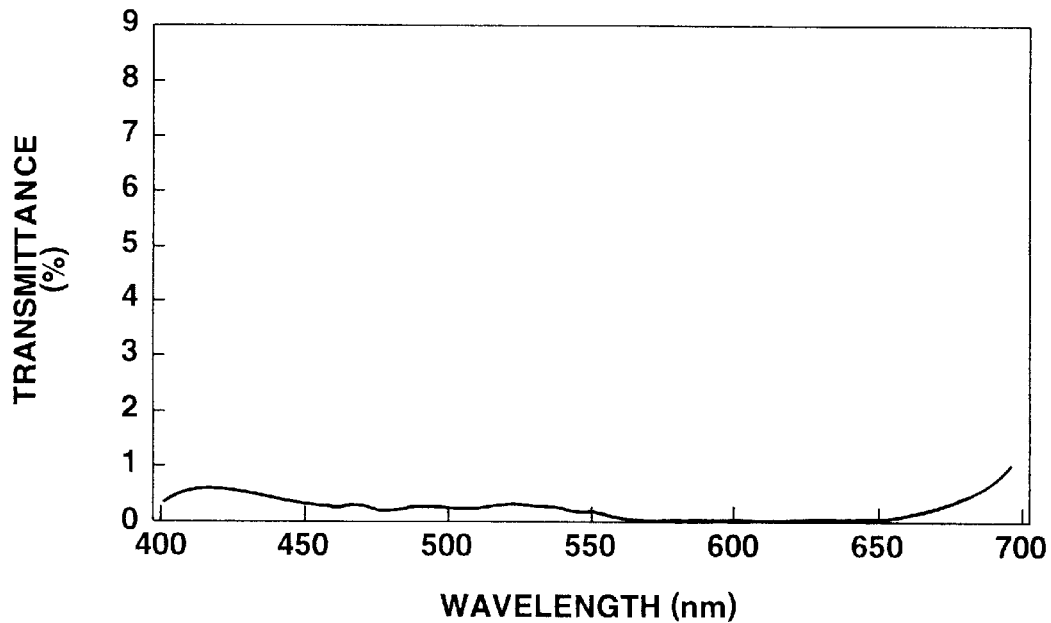
FIG. 7 is a diagram showing the spectral characteristics of the transmittance when two second polarization plates in the embodiment 1-1 are placed one on the other in such a way as to have perpendicular transmission axes.
Figure 8:
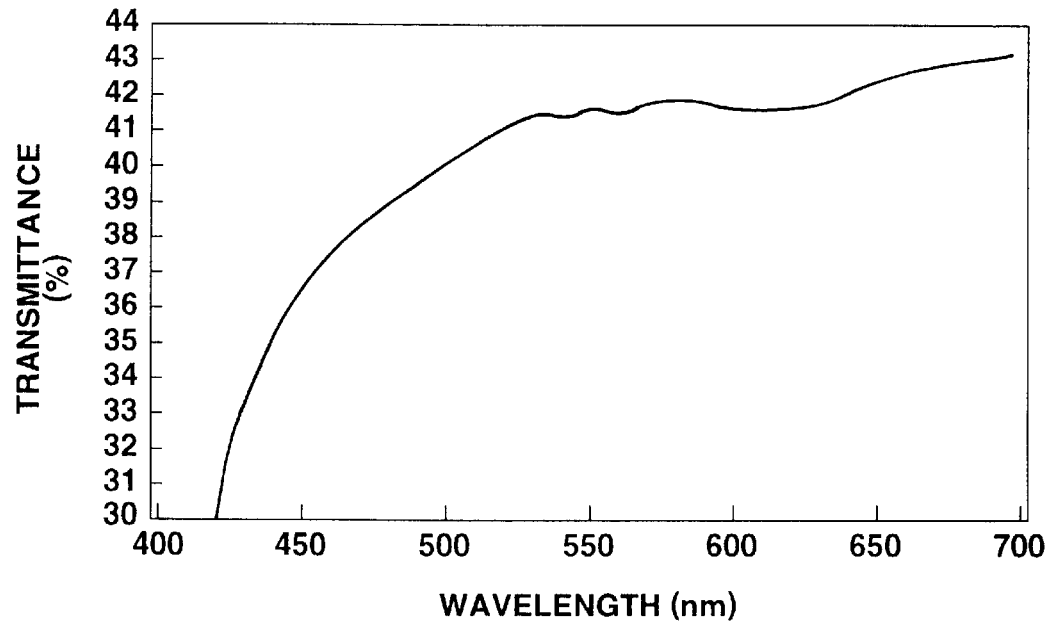
FIG. 8 is a diagram showing the spectral characteristics of the transmittance when the two second polarization plates in the embodiment 1-1 are placed one on the other in such a way as to have parallel transmission axes.

The embodiment 1-1 uses a pair of polarization plates including a first polarization plate whose transmittance has spectral characteristics shown in FIG. 5 when placed on another first polarization plate in such a way as to have perpendicular transmission axes and whose transmittance has spectral characteristics shown in FIG. 6 when those first polarization plates are placed one on the other in such a way as to have parallel transmission axes, and a second polarization plate whose transmittance has spectral characteristics shown in FIG. 7 when placed on another second polarization plate in such a way as to have perpendicular transmission axes and whose transmittance has spectral characteristics shown in FIG. 8 when those second polarization plates are placed one on the other in such a way as to have parallel transmission axes.

Figure 9:
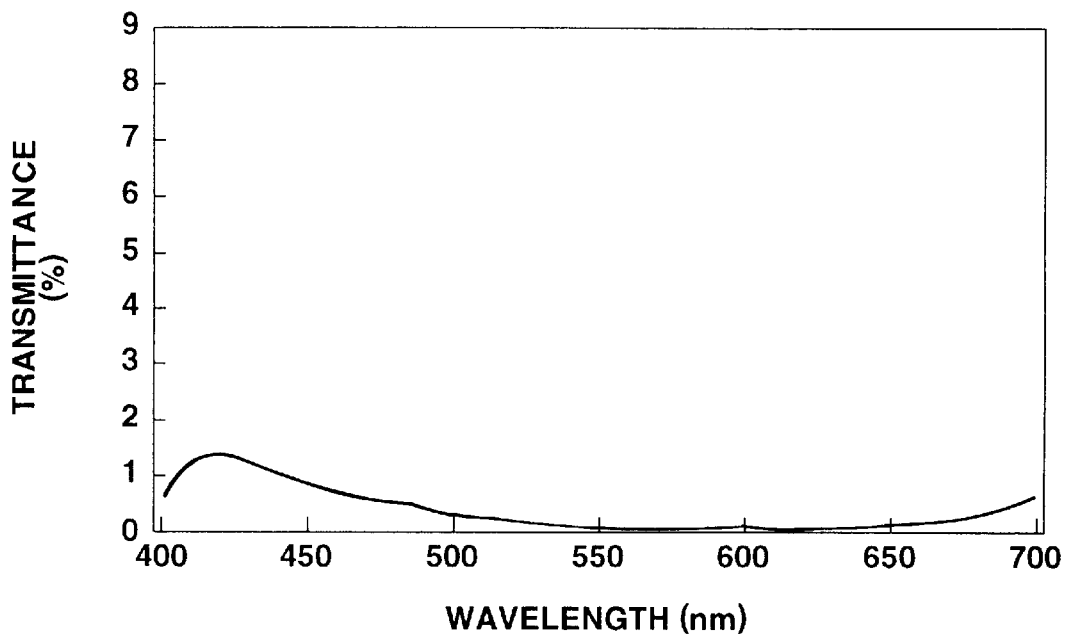
FIG. 9 is a diagram showing the spectral characteristics of the transmittance when first and second polarization plates in the embodiment 1-1 are placed one on the other in such a way as to have perpendicular transmission axes.
Figure 10:
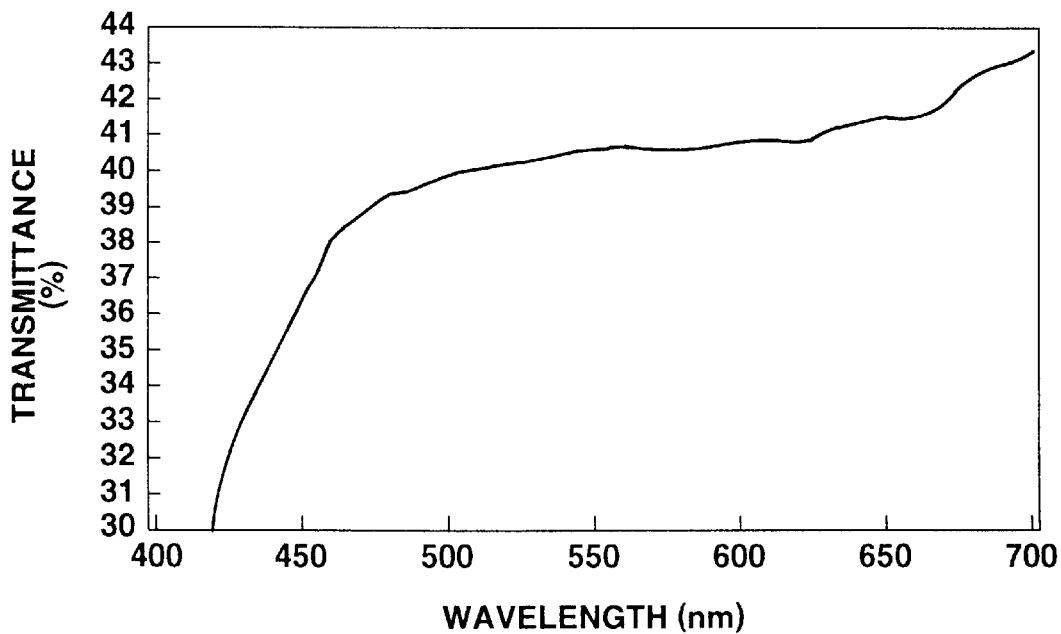
FIG. 10 is a diagram showing the spectral characteristics of the transmittance when the first and second polarization plates in the embodiment 1-1 are placed one on the other in such a way as to have parallel transmission axes.

In this case, the spectral characteristics of the transmittances of the first and second polarization plates when placed one on the other in such a way as to have perpendicular transmission axes become as shown in FIG. 9, and the spectral characteristics of the transmittances of the first and second polarization plates when placed one on the other in such a way as to have parallel transmission axes become as shown in FIG. 10.

From the spectral characteristics shown in FIG. 9, the first parameter $T_{500}/T_{440}$ becomes 0.370%/1.050%=0.352 smaller than the reference value of 0.4. From the spectral characteristics shown in FIG. 10, the second parameter $T_{460}$-$T_{640}$ becomes 36.99%−41.42%=−4.43% smaller than the reference value of −3%. In other words, while the equation (1) is satisfied, the equation (2) is not met.

Figure 11:
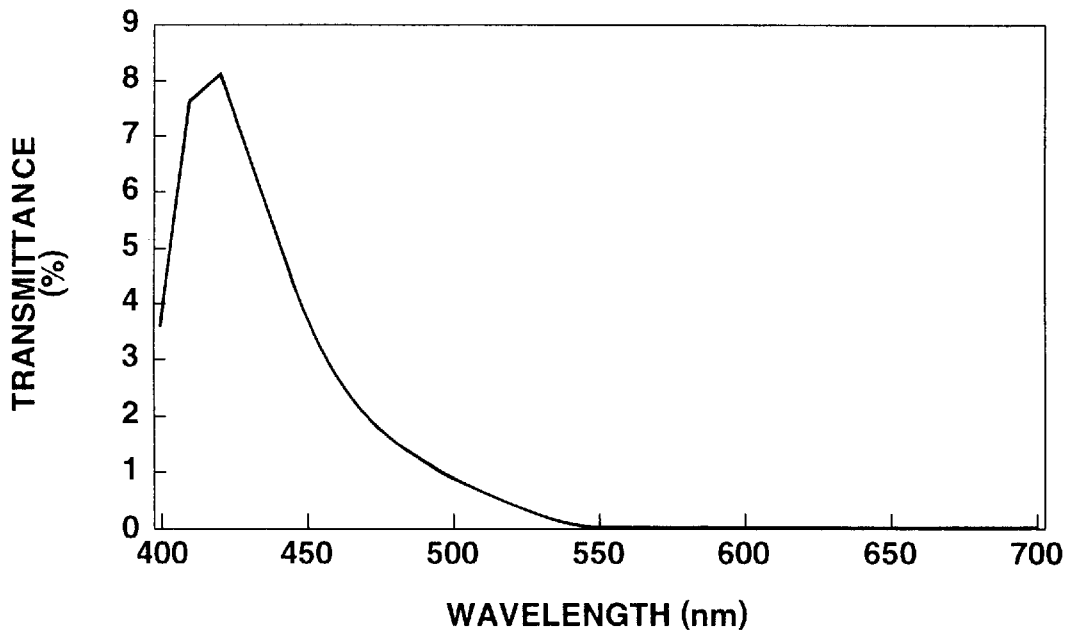
FIG. 11 is a diagram showing the spectral characteristics of the transmittance when two first polarization plates in an embodiment 1-2 are placed one on the other in such a way as to have perpendicular transmission axes.
Figure 12:
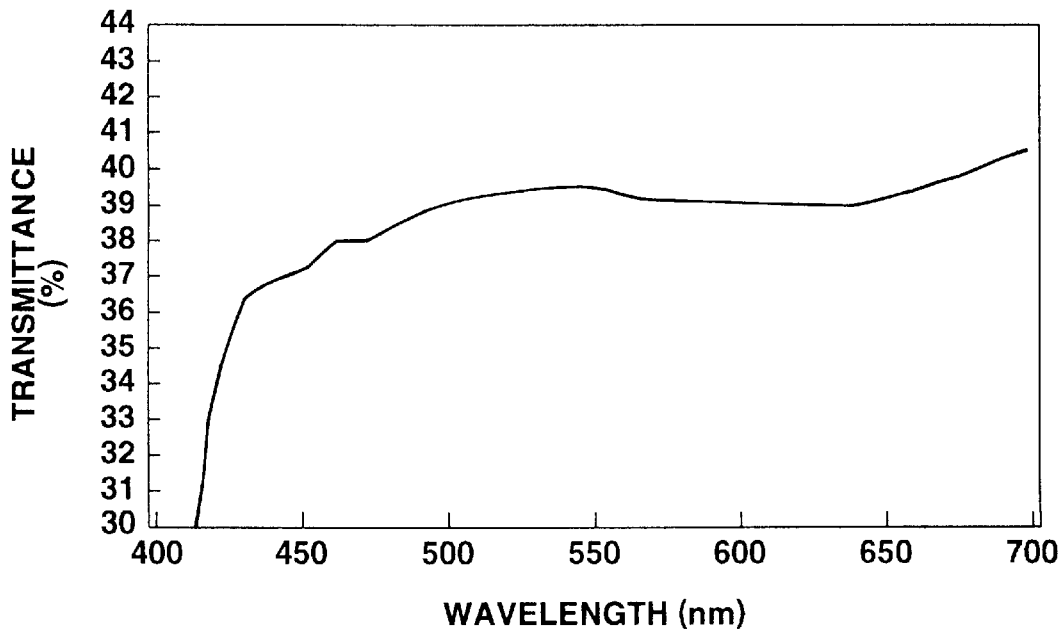
FIG. 12 is a diagram showing the spectral characteristics of the transmittance when the two first polarization plates in the embodiment 1-2 are placed one on the other in such a way as to have parallel transmission axes.

The embodiment 1-2 uses a pair of polarization plates including a first polarization plate whose transmittance has spectral characteristics shown in FIG. 11 when placed on another first polarization plate in such a way as to have perpendicular transmission axes and whose transmittance has spectral characteristics shown in FIG. 12 when those first polarization plates are placed one on the other in such a way as to have parallel transmission axes, and a second polarization plate whose transmittance has spectral characteristics shown in FIG. 7 when placed on another second polarization plate in such a way as to have perpendicular transmission axes and whose transmittance has spectral characteristics shown in FIG. 8 when those second polarization plates are placed one on the other in such a way as to have parallel transmission axes.

Figure 13:
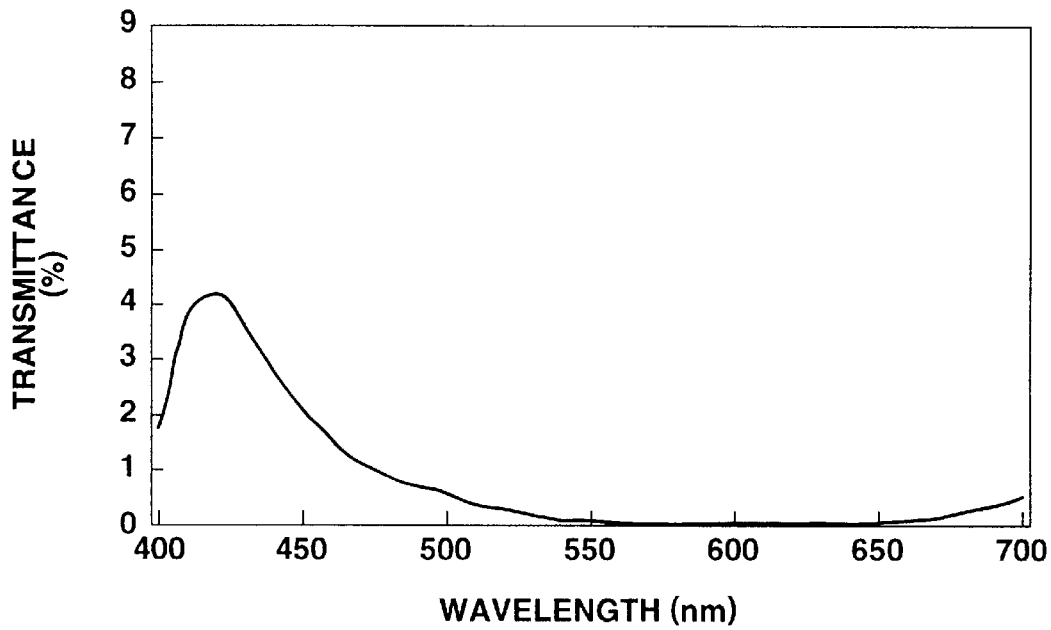
FIG. 13 is a diagram showing the spectral characteristics of the transmittance when the first and second polarization plates in the embodiment 1-2 are placed one on the other in such a way as to have perpendicular transmission axes.
Figure 14:
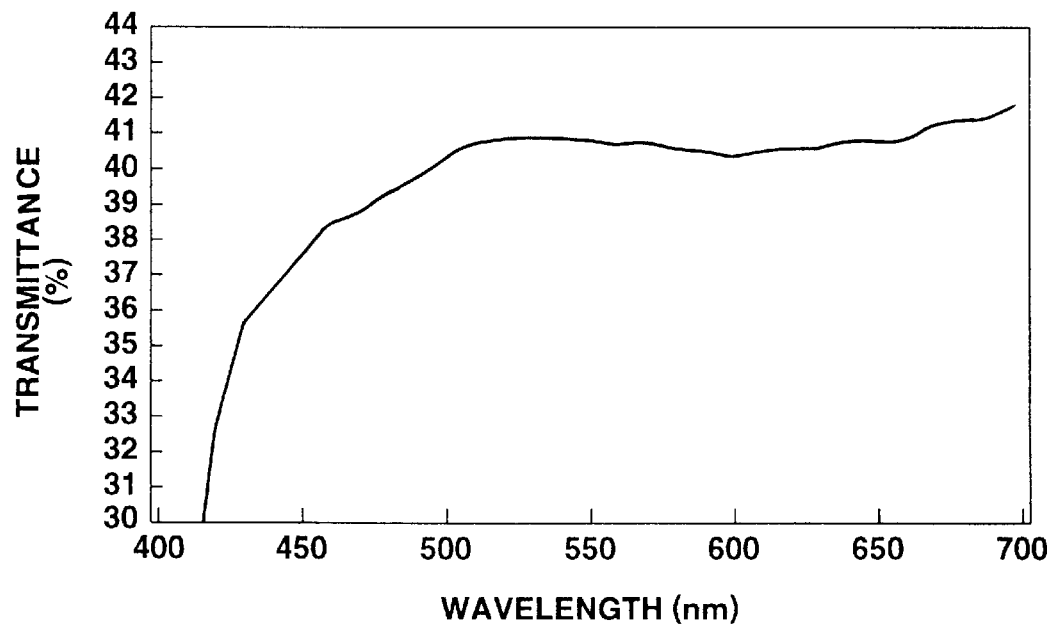
FIG. 14 is a diagram showing the spectral characteristics of the transmittance when the first and second polarization plates in the embodiment 1-2 are placed one on the other in such a way as to have parallel transmission axes.

In this case, the spectral characteristics of the transmittances of the first and second polarization plates when placed one on the other in such a way as to have perpendicular transmission axes become as shown in FIG. 13, and the spectral characteristics of the transmittances of the first and second polarization plates when placed one on the other in such a way as to have parallel transmission axes become as shown in FIG. 14.

From the spectral characteristics shown in FIG. 13, the first parameter $T_{500}/T_{440}$ becomes 0.565%/2.815%=0.201 smaller than the reference value of 0.4. From the spectral characteristics shown in FIG. 14, the second parameter $T_{460}$-$T_{640}$ becomes 38.32%−40.53%=−2.21% smaller than the reference value of −3%. In other words, the equations (1) and (2) are both satisfied.

Figure 16:
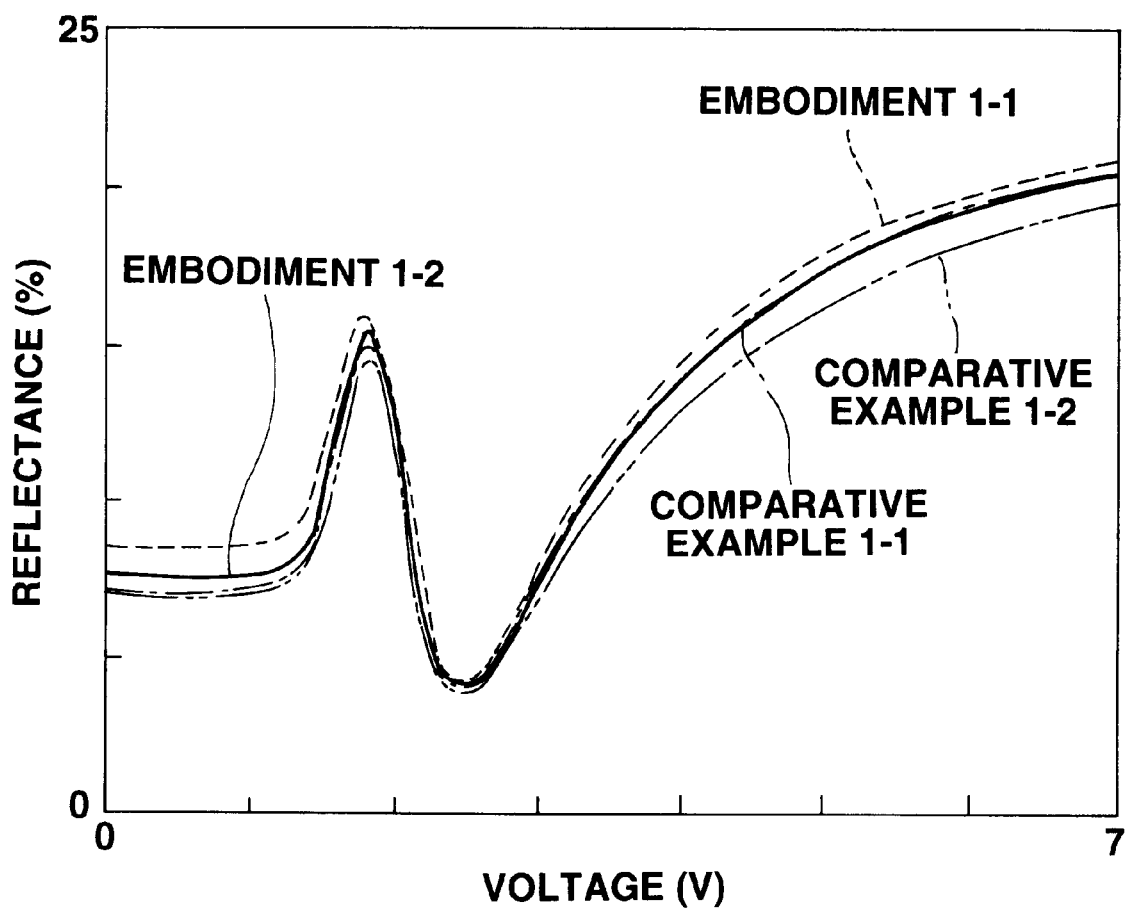
FIG. 16 is a diagram depicting the relationship between an applied voltage V and reflectance R of LCD devices which use the polarization plates of the embodiments 1-1 and 1-2 and comparative examples 1-1 and 1-2.
Figure 17:
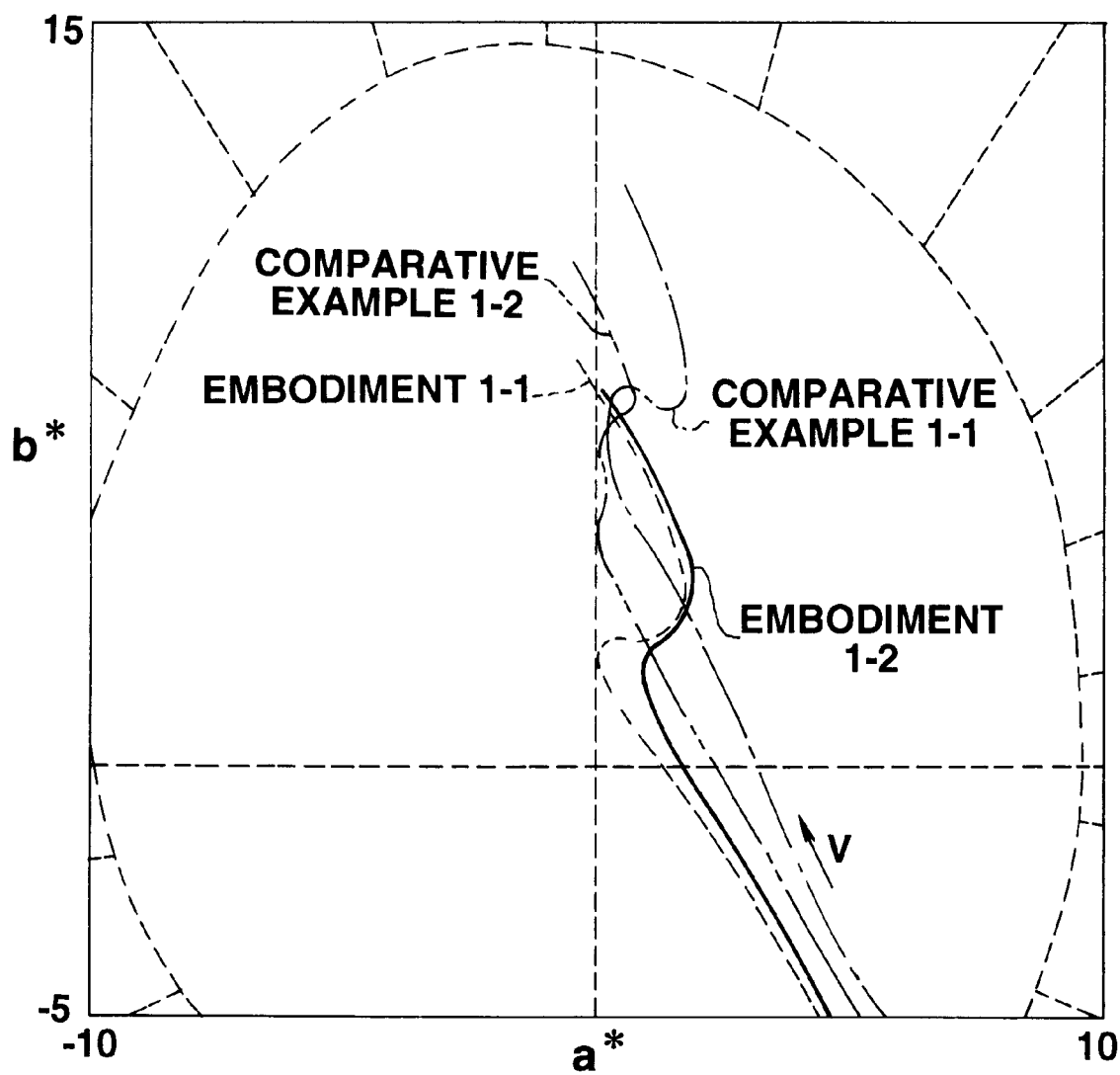
FIG. 17 is an enlarged view showing the display color characteristics of LCD devices which use the polarization plates of the embodiments 1-1 and 1-2 and comparative examples 1-1 and 1-2.

FIG. 16 shows the relationship between the applied voltage V and reflectance R of LCD devices which use the polarization plates of the embodiment 1-1, the embodiment 1-2, the comparative example 1-1 and the comparative example 1-2, and FIG. 17 shows a change in display color (on the L*a*b* display color system) with the portion near white in enlargement.

Figure 15A:
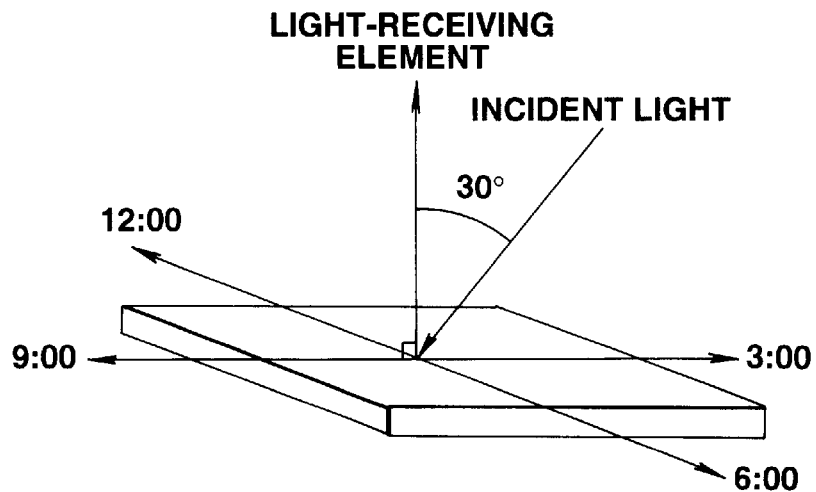
FIGS. 15A and 15B are diagrams used to explain the incident direction of incident light for acquiring the reflectance and display colors of the LCD device.
Figure 15B:
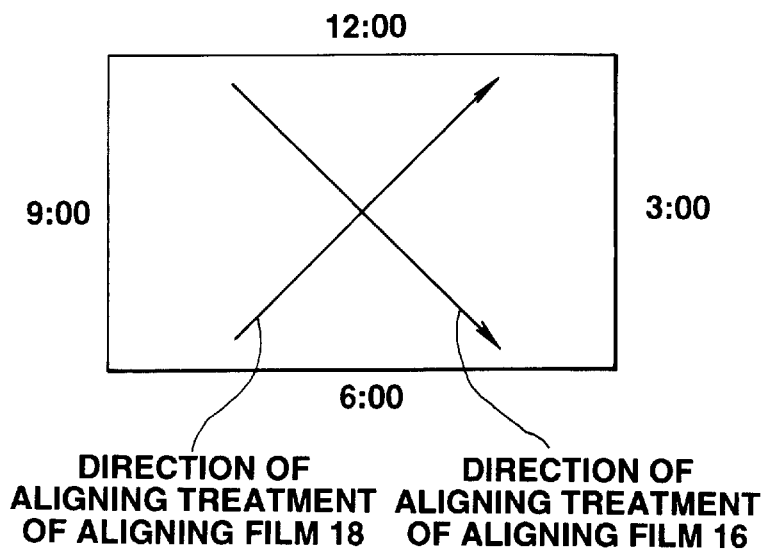

Those characteristics are the results of acquiring the averages of the aforementioned values when white light is let to be incident in the three-o'clock direction, six-o'clock direction, nine-o'clock direction and twelve-o'clock direction from the direction normal to the surface plane at an inclination angle of 30° as shown in FIGS. 15A and 15B.

In FIGS. 16 and 17, the broken lines indicate the embodiment 1-1, the solid lines indicate the embodiment 1-2, the one-dot chain lines indicate the comparative example 1-1 and the two-dot chain lines indicate the comparative example 1-2.

For the LCD device which uses the polarization plates of the embodiment 1-1, the display color is positioned at the coordinates (−0.29, 8.07) in FIG. 17 and is close to white (coordinates (0, 0)) in the vicinity of the applied voltage of 7V where the reflectance R shown in FIG. 16 takes the maximum value.

For the LCD device which uses the polarization plates of the embodiment 1-2, the display color is positioned at the coordinates (0.04, 7.59) in FIG. 17 and is also close to white (coordinates (0, 0)) in the vicinity of the applied voltage of 7V where the reflectance R shown in FIG. 16 takes the maximum value.

For the LCD device which uses the polarization plates of the comparative example 1-1, the display color is positioned at the coordinates (0.06, 11.72) in FIG. 17 and is very yellowish in the vicinity of the applied voltage of 7V where the reflectance R shown in FIG. 16 takes the maximum value.

For the LCD device which uses the polarization plates of the comparative example 1-2 which have high transmittances on the short-wavelength side (blue side), the display color is positioned at the coordinates (−0.46, 10.17) in FIG. 17 and is still yellowish in the vicinity of the applied voltage of 7V where the reflectance R takes the maximum value.

As apparent from the above, the display color "white" when the polarization plates of the embodiments 1-1 and 1-2 are used is colored less than the display color "white" when the polarization plates of the comparative examples 1-1 and 1-2 are used.

As mentioned early, the first parameters $T_{500}/T_{440}$ in the embodiments 1-1 and 1-2 are less than the reference value of 0.4 and the first parameters $T_{500}/T_{440}$ in the comparative examples 1-1 and 1-2 are greater than 0.4. The results of the experiments show that the use of the polarization plates which satisfy the equation (1) can provide an LCD device capable of displaying bright and less-colored "white."

It is understood from FIGS. 16 and 17 that the display color "white" by the embodiment 1-2 has less colored than the display color "white" by the embodiment 1-1. In this case, the second parameter $T_{460}$-$T_{640}$ of the embodiment 1-2 is greater than −3%, and the second parameter $T_{460}$-$T_{640}$ of the embodiment 1-1 is smaller than −3%. It is therefore confirmed that the use of the polarization plates which satisfy the equation (2) can provide an LCD device capable of displaying brighter and less-colored "white."

The transmittances on the short-wavelength side of the embodiments 1-1 and 1-2, unlike that of the comparative example 1-2, are not so high. This makes the display color in the dark state come closer to black. Therefore, the display color "white" becomes brighter and colorless and the display color "black" becomes darker and colorless, thus ensuring high-contrast display.

Second Embodiment

An LCD device according to this embodiment has the same structure as the LCD device shown in FIG. 1.

Although the polarization plates 21 and 22 in use are those of the embodiment 1-2, the polarization plates of any of the embodiment 1-1 and the comparative examples 1-1 and 1-2 may be used.

In this embodiment, the retardation value Δnd of the LC cell 10 (the product of the refractive anisotropy Δn of the liquid crystal 13 and the layer thickness d of the liquid crystal 13) is set to 800 to 1100 nm.

Figure 30A:
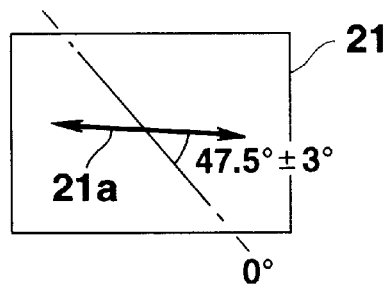
FIGS. 30A to 30C are diagrams illustrating the alignment state of the LC molecules and the directions of the transmission axes of polarization plates of an LCD device according to the second embodiment.
Figure 30B:
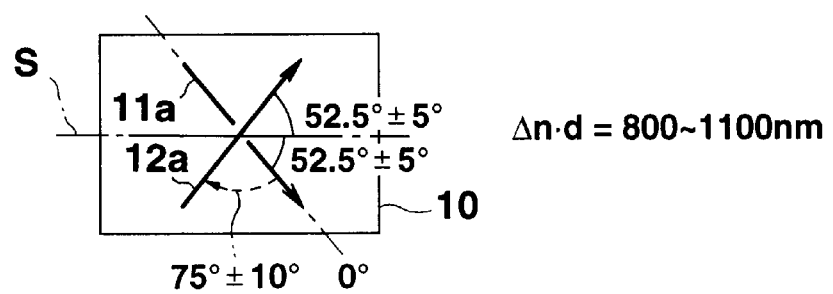
Figure 30C:
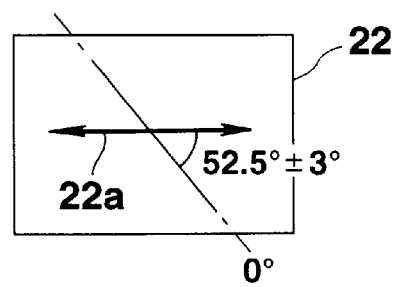

FIGS. 30A to 30C are diagrams used to explain the alignment state of the molecules of the liquid crystal 13 in the LC cell 10 according to this embodiment and the directions of the transmission axes of the polarization plates 21 and 22.

As illustrated, the aligning direction 11a of the molecules of the liquid crystal 13 near the transparent substrate 11 (the direction of the aligning treatment on the aligning film 18) is shifted clockwise by 52.5°±5° with respect to the horizontal axis S of the LC cell 10 and the aligning direction 12a of the molecules of the liquid crystal 13 near the transparent substrate 12 (the direction of the aligning treatment on the aligning film 18) is shifted counterclockwise by 52.5°±5° with respect to the horizontal axis S. The molecules of the liquid crystal 13 are twisted clockwise at a twist angle of 75°±10° toward the transparent substrate 12 from the transparent substrate 11, as indicated by the broken line arrow in the diagram.

Given that the aligning direction 11a of the LC molecules is set to the direction of 0°, the transmission axis 21a of the polarization plate 21 is in the direction of 47.5°±3° with respect to the opposite direction to the twisted direction of the molecules of the liquid crystal 13 and the transmission axis 22a of the polarization plate 22 is in the direction of 52.5°±3° with respect to the opposite direction to the twisted direction of the molecules of the liquid crystal 13.

According to the color LCD device of this embodiment, the incident light passes through the polarization plate 21 to become linearly polarized light with the transmission axis 21a taken as the polarization direction. As this linearly polarized light passes the LC cell 10, it becomes elliptically polarized light whose polarization state differs wavelength by wavelength. Only the components of this elliptically polarized light which are set in the direction of the transmission axis 22a wavelength by wavelength pass the polarization plate 22. Consequently, the light becomes colored in accordance with the light intensity of each wavelength component. The light which has passed the polarization plate 22 is reflected at the reflector 26, passes the polarization plate 22, the LC cell 10 and the polarization plate 21 in order, and goes out from the surface of the LCD device.

The layer of the liquid crystal 13 causes the light reflected at the reflector 26 to be affected by the opposite birefringence effect to the one that is influential at the time the light entered. The light therefore becomes linearly polarized light whose polarization direction is substantially the same direction to the direction of the transmission axis 21a of the polarization plate 21. Thus, the outgoing light which has passed the polarization plate 21 is colored to substantially the same color as that of the light which has been reflected at the reflector 26.

When a voltage is applied between the electrodes 15 and 17 of the LC cell 10, the molecules of the liquid crystal 13 are aligned upright while keeping the twisted state. As the upright angle of the molecules of the liquid crystal 13 increases, the birefringence effect by the layer of the liquid crystal 13 decreases. When the birefringence effect by the layer of the liquid crystal 13 changes, the polarization state of the light which has passed the LC cell 10 to be incident to the polarization plate 22 changes. Consequently, the colored state of the light which has passed the polarization plate 22 changes and that light is reflected at the reflector 26 to go out from the surface of the LCD device.

The display color of the LCD device can be altered in accordance with the voltage to be applied between the electrodes 15 and 17 in this manner.

Figure 31:
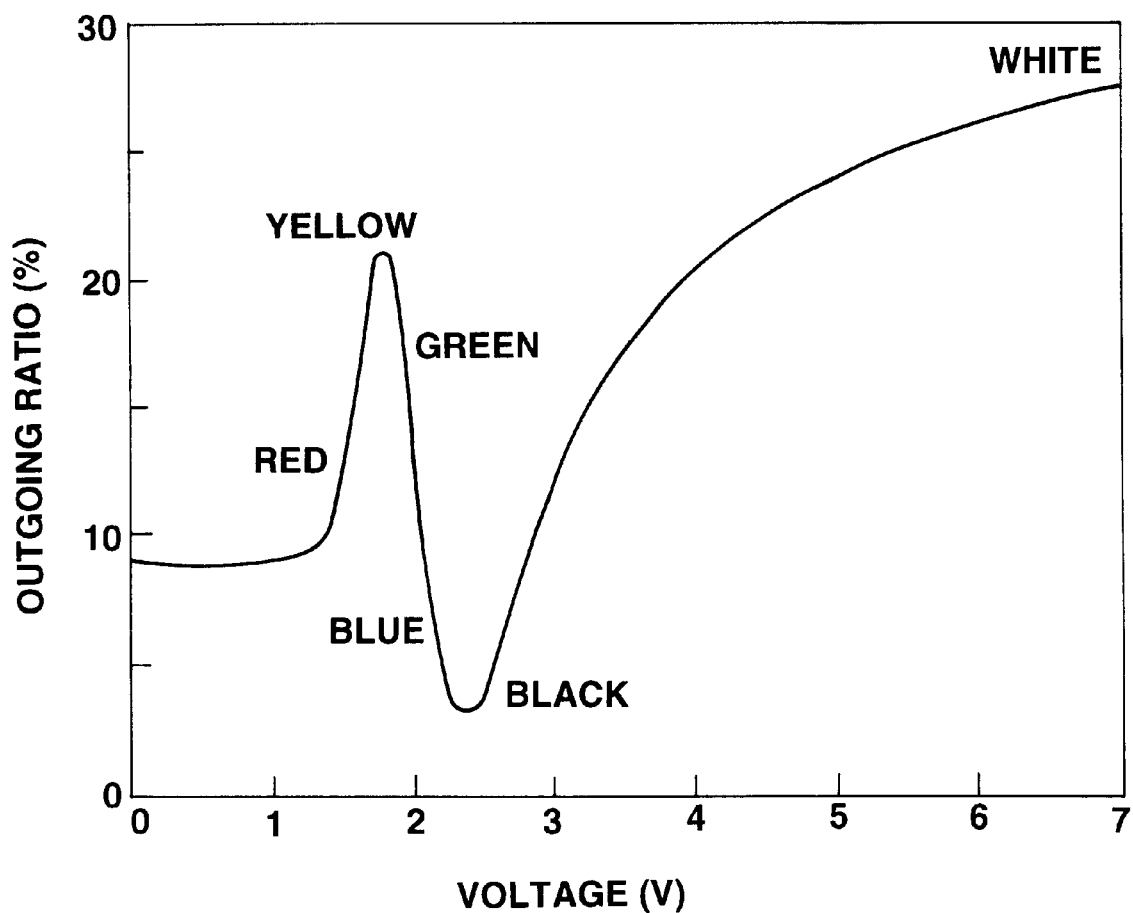
FIG. 31 is a diagram depicting changes in the light outgoing ratio and display color with respect to an applied voltage to the LCD device according to the second embodiment.

FIG. 31 presents a diagram depicting changes in the light outgoing ratio and display color with respect to the applied voltage to the LCD device according to this embodiment. FIG. 31 shows changes in the light outgoing ratio and display color as the voltage to be applied between the electrodes 15 and 17 is changed in a range of 0 to 7 V.

Figure 32:
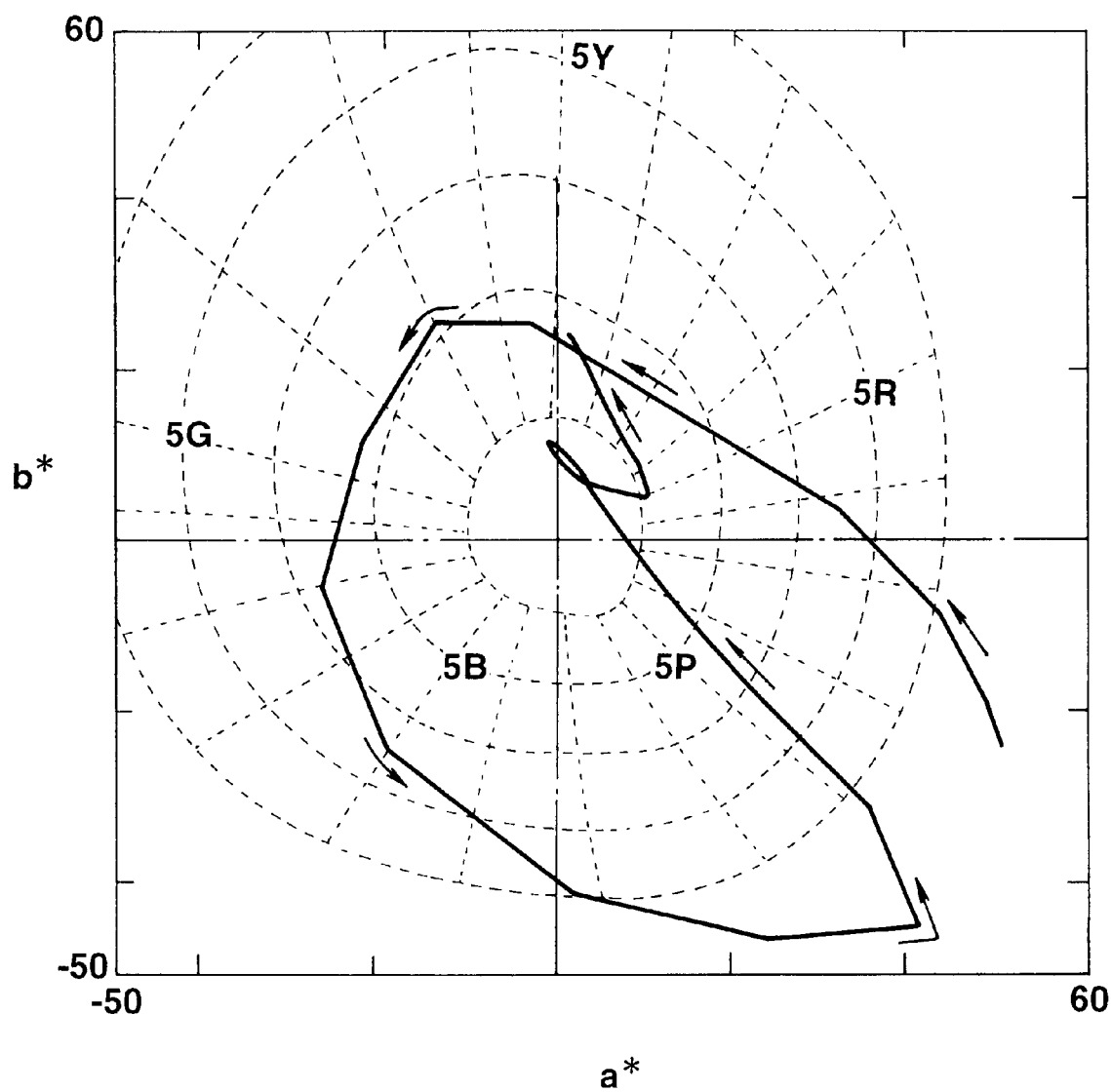
FIG. 32 is an a*-b* chromaticity diagram showing a change in display color according to the second embodiment.

FIG. 32 is an a*-b* chromaticity diagram showing a change in display color according to this embodiment.

As illustrated, the display color of the color LCD device according to this embodiment is close to purple (P) in the initial state where no voltage is applied between the electrodes 15 and 17. As the voltage applied between the electrodes 15 and 17 increases, the display color changes from red (R) to green (G), to blue (B), to black, then to white in order. Those display colors are clear and have high color purities.

Further, the outgoing ratio R(min) in the black display state of the color LCD device of this embodiment, the outgoing ratio R(5V) in the white display state when the applied voltage is 5 V and the outgoing ratio R(7V) when the applied voltage is 7 V are as follows.

R(min)=2.78%
R(5V)=22.85%
R(7V)=29.55%

The display contrast CR between black and white for the color LCD device of this embodiment is as follows:

CR(5V)=8.22
CR(7V)=10.63 where CR(5V) is the contrast when the applied voltage in the white display state is 5 V and CR(7V) is the contrast when the applied voltage in the white display state is 7 V. It is apparent that a sufficiently high contrast is acquired not only when the applied voltage for displaying white is 7 V but also when the applied voltage for displaying white is 5 V.

Such display color and contrast are acquired when the twist angle of the liquid crystal 13, the retardation value Δnd of the LC cell 10, and the directions of the transmission axes 21a and 22a of the polarization plates 21 and 22 are set under the aforementioned conditional ranges. When the conditions come off the ranges, the display quality becomes poorer in the order of the contrast and then the display color as the degree of the deviation increases.

As discussed above, this embodiment can provide an ECB type LCD device which can display clear white, black and three primary colors of red, green and blue with high contrasts and high color purities, thus ensuring colorful multi-color display.

If the molecules of the liquid crystal 13 are twisted at a twist angle of 75°±10°, the retardation value Δnd of the LC cell 10 and the directions of the transmission axes 21a and 22a of the polarization plates 21 and 22 are not limited to those of the second embodiment. That is, the retardation value Δnd of the LC cell 10 and the directions of the transmission axes 21a and 22a of the polarization plates 21 and 22 have only to be set in such a manner that the display color changes among at least red, green, blue, black and white in accordance with the voltage which is applied between the electrodes 15 and 17.

Third Embodiment

Figure 33:
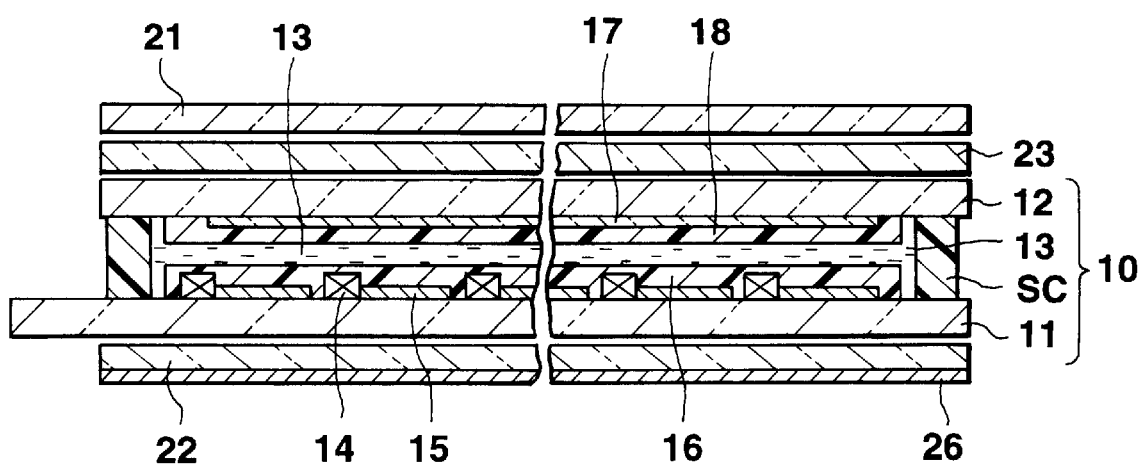
FIG. 33 is a cross-sectional view illustrating the structure of an ECB type color LCD device according to the third embodiment of this invention.
Figure 34A:
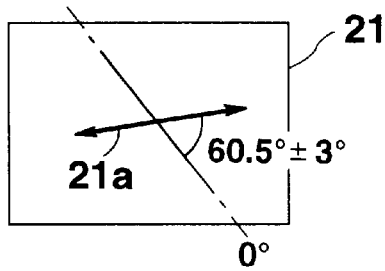
FIGS. 34A to 34D are diagrams illustrating the alignment state of the LC molecules, the directions of the transmission axes of polarization plates and the direction of a phase-delay axis of a retardation plate of an LCD device according to the third embodiment.
Figure 34B:
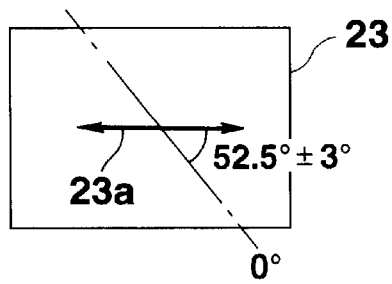
Figure 34C:
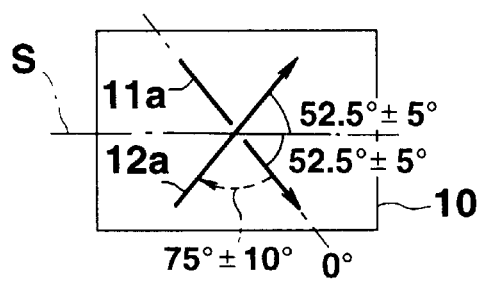
Figure 34D:
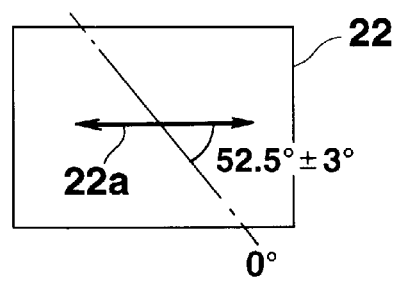

FIG. 33 is a cross-sectional view illustrating the structure of an LCD device according to this embodiment.

This LCD device has a single retardation plate 23 intervened between the LC cell 10 and the polarization plate 21. As the other structure is the same as that shown in FIG. 1, like or same reference numerals are given to those components which are the same as the corresponding components of the first embodiment to avoid the otherwise redundant description.

Although the polarization plates 21 and 22 in use are those of the embodiment 1-2, the polarization plates of any of the embodiment 1-1 and the comparative examples 1-1 and 1-2 may be used.

In this embodiment, the retardation value Δnd of the LC cell 10 (the product of the refractive anisotropy Δn of the liquid crystal 13 and the layer thickness d of the liquid crystal 13) is set to 800 to 1100 nm.

The retardation value of the retardation plate 23 is 60±20 nm.

FIGS. 34A to 34D are diagrams used to explain the alignment state of the molecules of the liquid crystal 13 in the LC cell 10, the directions of the transmission axes of polarization plates 21 and 22 and the direction of the phase-delay axis of the retardation plate 23 according to this embodiment.

As illustrated, the aligning direction 11a of the molecules of the liquid crystal 13 near the transparent substrate 11 (the direction of the aligning treatment on the aligning film 18) is shifted clockwise by 52.5°±5° with respect to the horizontal axis S of the LC cell 10 and the aligning direction 12a of the molecules of the liquid crystal 13 near the transparent substrate 12 (the direction of the aligning treatment on the aligning film 18) is shifted counterclockwise by 52.5°±5° with respect to the horizontal axis S. The molecules of the liquid crystal 13 are twisted clockwise at a twist angle of 75°±10° toward the transparent substrate 12 from the transparent substrate 11, as indicated by the broken line arrow in the diagram.

Given that the aligning direction 11a of the LC molecules is set to the direction of 0°, the transmission axis 21a of the polarization plate 21 is directed the direction of 60.5°±3° with respect to the opposite direction to the twisted direction of the molecules of the liquid crystal 13 and the transmission axis 22a of the polarization plate 22 is in the direction of 52.5°±3° with respect to the opposite direction to the twisted direction of the molecules of the liquid crystal 13.

The phase-delay axis 23a of the retardation plate 23 is in the direction of 52.5°±3° with respect to the opposite direction to the twisted direction of the molecules of the liquid crystal 13.

According to the color LCD device of this embodiment, the incident light passes through the polarization plate 21 to become linearly polarized light with the transmission axis 21a taken as the polarization direction. As this linearly polarized light passes the retardation plate 23, it becomes elliptically polarized light whose polarization state differs wavelength by wavelength. Further, the polarization state of the elliptically polarized light is changed while the light passes through the LC cell 10. Only the components of this elliptically polarized light which are set in the direction of the transmission axis 22a wavelength by wavelength pass the polarization plate 22. Consequently, the light becomes colored in accordance with the light intensity of each wavelength component. The light which has passed the polarization plate 22 is reflected at the reflector 26, passes the polarization plate 22, the LC cell 10, the retardation plate 23 and the polarization plate 21 in order, and goes out from the surface of the LCD device.

The LC cell 10 and the retardation plate 23 cause the light reflected at the reflector 26 to be affected by the opposite birefringence effect to the one that is influential at the time the light entered. The light therefore becomes linearly polarized light whose polarization direction is substantially the same direction to the direction of the transmission axis 21a of the polarization plate 21. Thus, the outgoing light which has passed the polarization plate 21 is colored to substantially the same color as that of the light which has been reflected at the reflector 26.

When a voltage is applied between the electrodes 15 and 17 of the LC cell 10, the molecules of the liquid crystal 13 are aligned upright while keeping the twisted state. As the upright angle of the molecules of the liquid crystal 13 increases, the birefringence effect by the layer of the liquid crystal 13 decreases. When the birefringence effect by the layer of the liquid crystal 13 changes, the polarization state of the light which has passed the LC cell 10 to be incident to the polarization plate 22 changes. Consequently, the colored state of the light which has passed the polarization plate 22 changes and that light is reflected at the reflector 26 to go out from the surface of the LCD device.

The display color of the LCD device can be altered in accordance with the voltage to be applied between the electrodes 15 and 17 in this manner.

Figure 35:
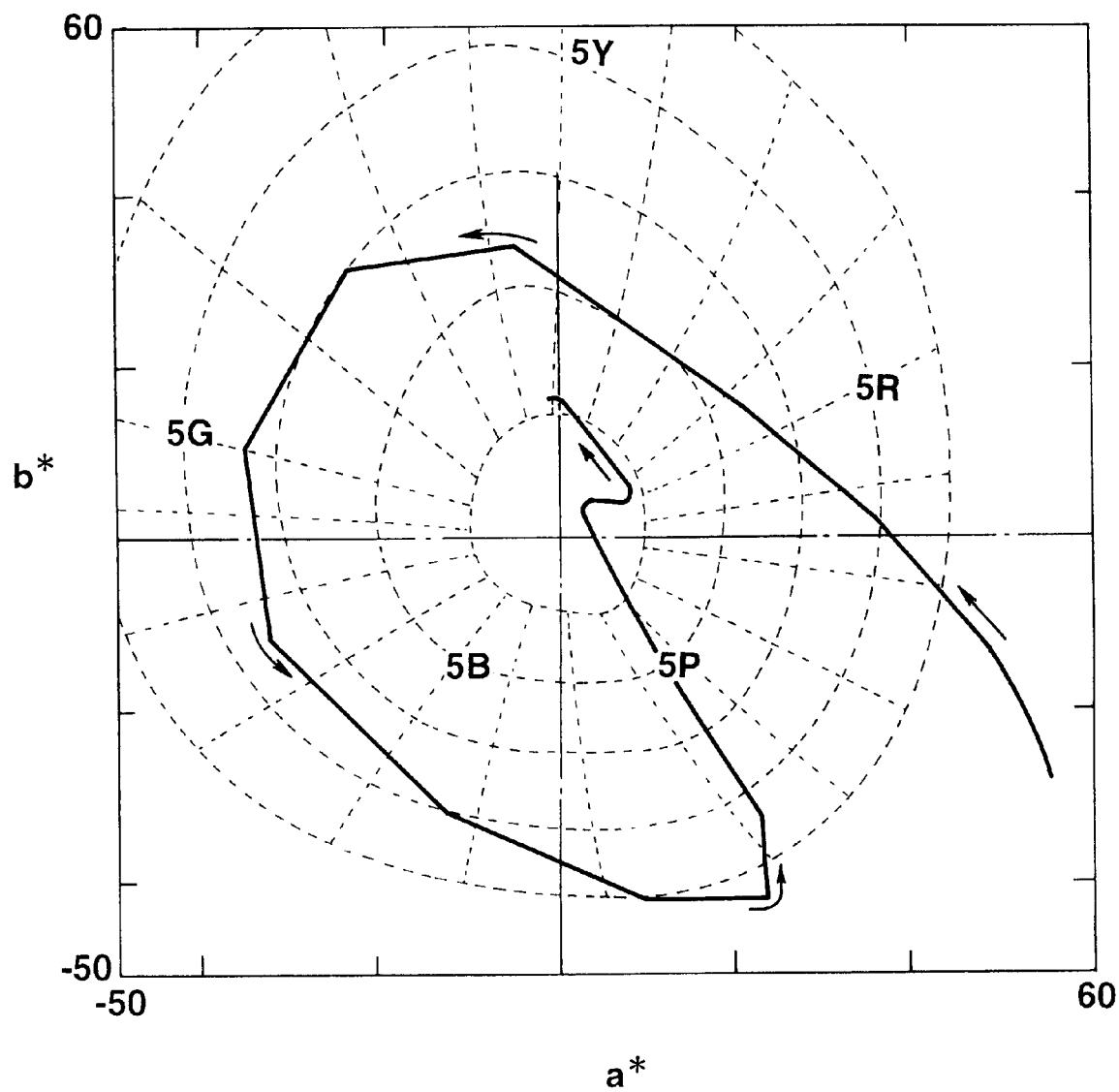
FIG. 35 is an a*-b* chromaticity diagram showing a change in display color according to the third embodiment.
Figure 36A:
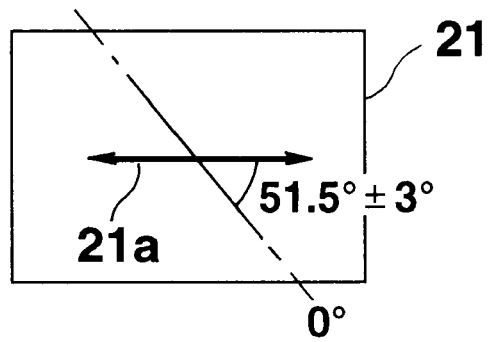
FIGS. 36A to 36D are diagrams illustrating the alignment state of the LC molecules and the directions of the transmission axes of polarization plates of an LCD device according to a modification of the third embodiment.
Figure 36B:
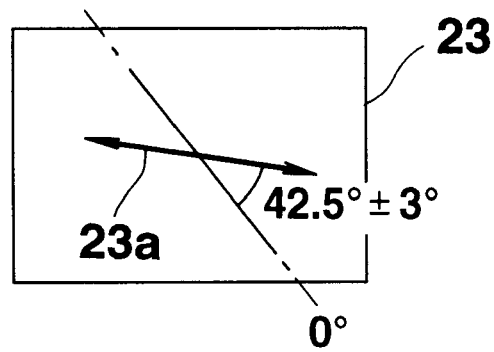
Figure 36C:
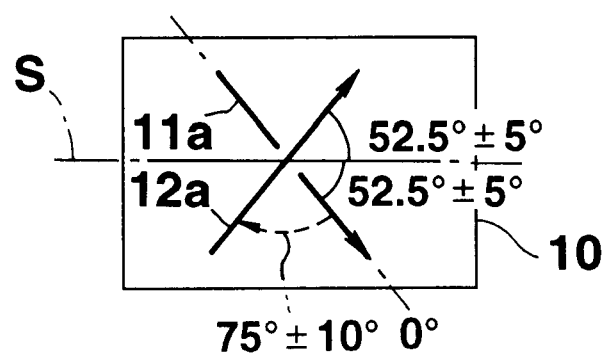
Figure 36D:
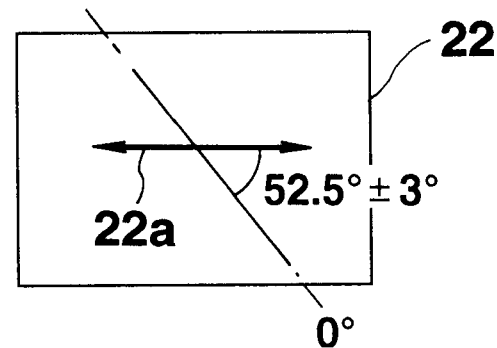

FIG. 35 is an a*-b* chromaticity diagram showing a change in display color according to this embodiment.

As illustrated, the display color of the color LCD device according to this embodiment is close to purple (P) in the initial state where no voltage is applied between the electrodes 15 and 17. As the voltage applied between the electrodes 15 and 17 increases, the display color changes from red (R) to green (G), to blue (B), to black, then to white in order. Those display colors are clear and have high color purities.

Further, the outgoing ratio R(min) in the black display state of the color LCD device of this embodiment, the outgoing ratio R(5V) in the white display state when the applied voltage is 5 V and the outgoing ratio R(7V) when the applied voltage is 7 V are as follows.

R(min)=3.30%
R(5V)=23.64%
R(7V)=28.91%

The display contrast CR between black and white for the color LCD device of this embodiment is as follows:

CR(5V)=7.16
CR(7V)=8.76 where CR(5V) is the contrast when the applied voltage in the white display state is 5 V and CR(7V) is the contrast when the applied voltage in the white display state is 7 V. It is apparent that a sufficiently high contrast is acquired not only when the applied voltage for displaying white is 7 V but also when the applied voltage for displaying white is 5 V.

A modification of the third embodiment will now be discussed.

FIGS. 36A to 36D are diagrams for explaining the alignment state of the molecules of the liquid crystal 13 of the LC cell 10, the directions of the transmission axes of polarization plates 21 and 22 and the direction of the phase-delay axis of the retardation plate 23 in this modification.

According to this modification, given that the aligning direction 11a of the LC molecules is the direction of 0°, the transmission axis 21a of the polarization plate 21 is set in the direction of 52.5°±3° with respect to the opposite direction to the twisted direction of the molecules of the liquid crystal 13 and the phase-delay axis 23a of the retardation plate 23 is set in the direction of 52.5°±3° with respect to the opposite direction to the twisted direction of the molecules of the liquid crystal 13. The aligning directions 11a and 12a of the molecules of the liquid crystal 13 and the direction of the transmission axis 22a of the polarization plate 22 are the same as those in the case illustrated in FIGS. 34A to 34D.

Figure 37:
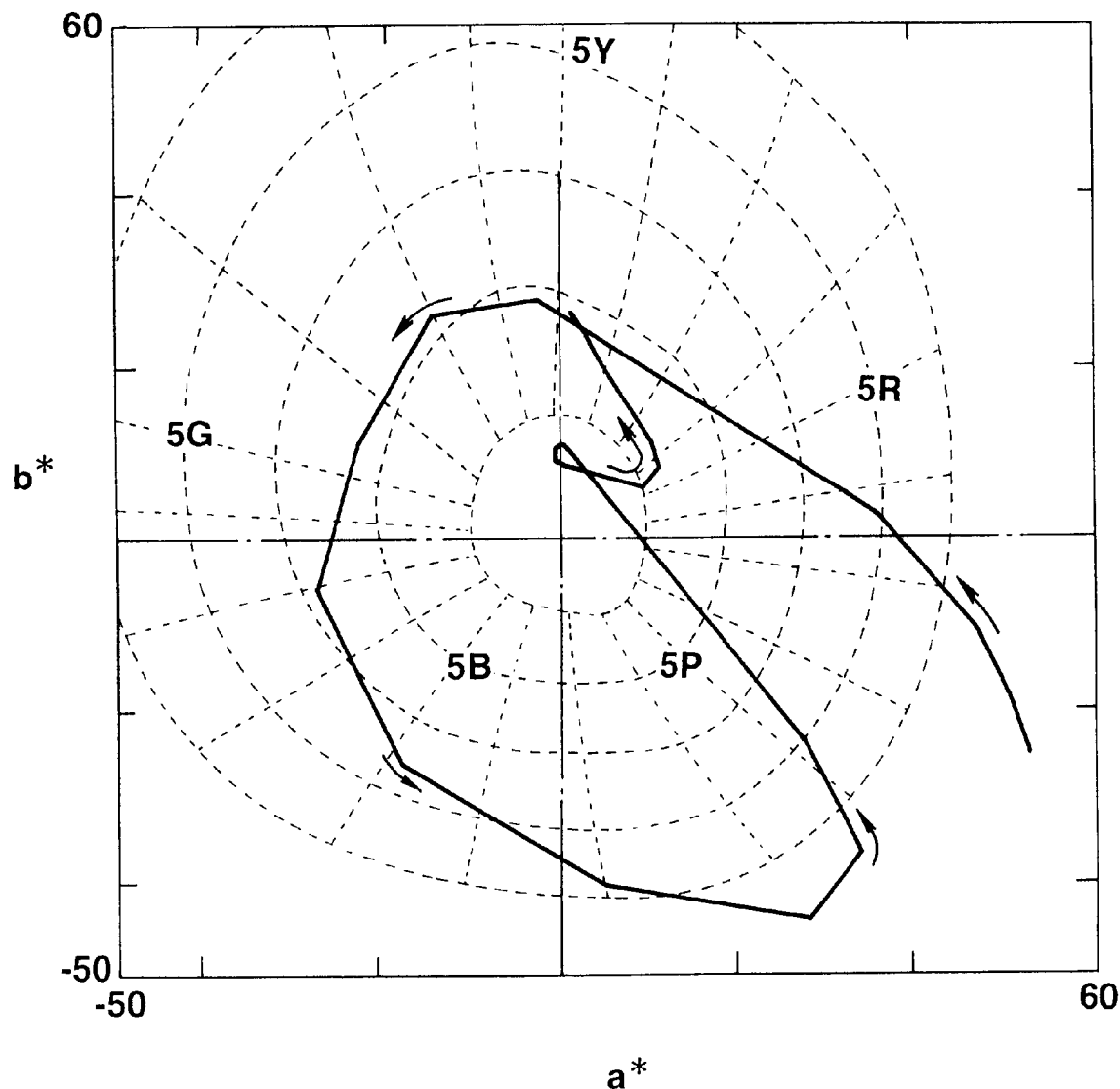
FIG. 37 is an a*-b* chromaticity diagram showing a change in display color according to the modification of the third embodiment.
Figure 38A:
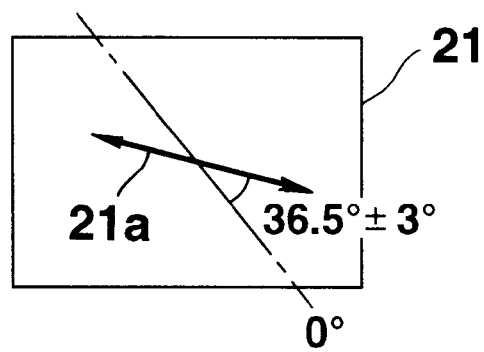
FIGS. 38A to 38D are diagrams illustrating the alignment state of the LC molecules, the directions of the transmission axes of polarization plates and the direction of a phase-delay axis of a retardation plate of an LCD device according to the fourth embodiment.
Figure 38B:
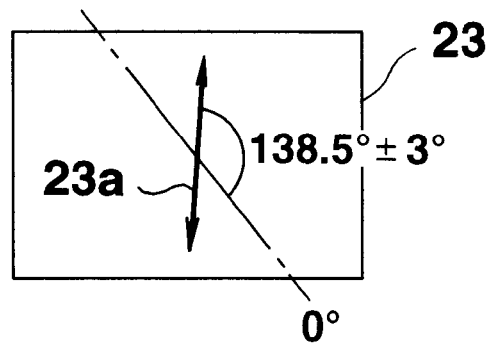
Figure 38C:
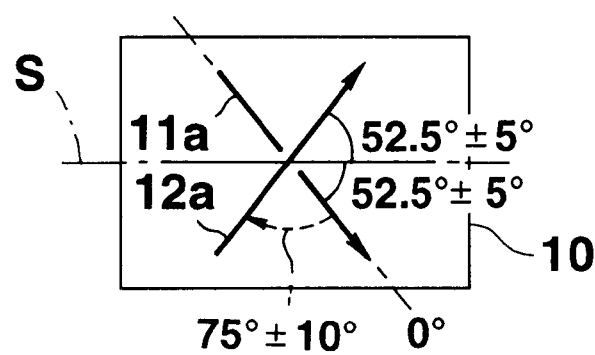
Figure 38D:
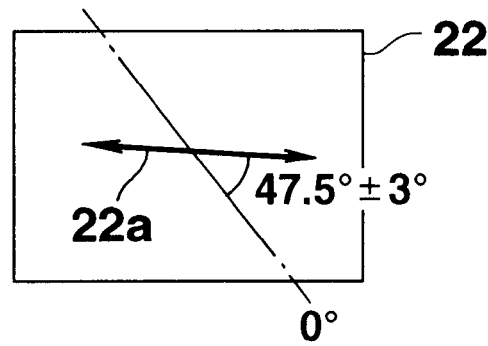

FIG. 37 is an a*-b* chromaticity diagram showing a change in display color of the color LCD device according to this modification.

As illustrated, the display color of the color LCD device according to this modification is close to purple (P) in the initial state where no voltage is applied between the electrodes 15 and 17. As the voltage applied between the electrodes 15 and 17 increases, the display color changes from red (R) to green (G), to blue (B), to black, then to white in order. Those display colors are clear and have high color purities.

Further, the outgoing ratio R(min) in the black display state of the color LCD device of this modification, the outgoing ratio R(5V) in the white display state when the applied voltage is 5 V and the outgoing ratio R(7V) when the applied voltage is 7 V are as follows.

R(min)=2.76%
R(5V)=24.08%
R(7V)=30.60%

The display contrast CR between black and white for the color LCD device of this modification is as follows:

CR(5V)=8.72
CR(7V)=11.09 where CR(5V) is the contrast when the applied voltage in the white display state is 5 V and CR(7V) is the contrast when the applied voltage in the white display state is 7 V. It is apparent that a sufficiently high contrast is acquired not only when the applied voltage for displaying white is 7 V but also when the applied voltage for displaying white is 5 V.

As mentioned above, if the twist angle of the molecules of the liquid crystal 13 is set to 75°±10°, the retardation value Δnd of the LC cell 10 is set to 800 to 1100 nm, the retardation value of the retardation plate 23 is set to 60±20 nm, the transmission axis 22a of the polarization plate 22 is set in the direction of 52.5°±3° with respect to the opposite direction to the twisted direction of the LC molecules, the transmission axis 21a of the polarization plate 21 is set in the direction of 51.5°±3° to 60.5°±3° with respect to the opposite direction to the twisted direction of the LC molecules, and the phase-delay axis 23a of the retardation plate 23 is set in the direction of 42.5°±3° to 52.5°±3° with respect to the opposite direction to the twisted direction of the LC molecules, it is possible to display clear white, black and three primary colors of red, green and blue with high contrasts and high color purities. It is also possible to provide an ECB type LCD device capable of ensuring colorful multi-color display.

Fourth Embodiment

The structure of an LCD device according to this embodiment is the same as that of the LCD device shown in FIG. 33.

In this embodiment, the retardation value Δnd of the LC cell 10 (the product of the refractive anisotropy Δn of the liquid crystal 13 and the layer thickness d of the liquid crystal 13) is set to 800 to 1100 nm.

The retardation value of the retardation plate 23 is 60±20 nm.

FIGS. 38A to 38D are diagrams used to explain the alignment state of the molecules of the liquid crystal 13 in the LC cell 10, the directions of the transmission axes of polarization plates 21 and 22 and the direction of the phase-delay axis of the retardation plate 23 according to this embodiment.

As illustrated, the aligning direction 11a of the molecules of the liquid crystal 13 near the transparent substrate 11 (the direction of the aligning treatment on the aligning film 18) is shifted clockwise by 52.5°±5° with respect to the horizontal axis S of the LC cell 10 and the aligning direction 12a of the molecules of the liquid crystal 13 near the transparent substrate 12 (the direction of the aligning treatment on the aligning film 18) is shifted counterclockwise by 52.5°±5° with respect to the horizontal axis S. The molecules of the liquid crystal 13 are twisted clockwise at a twist angle of 75°±10° toward the transparent substrate 12 from the transparent substrate 11, as indicated by the broken line arrow in the diagram.

Given that the aligning direction 11a of the LC molecules is set to the direction of 0°, the transmission axis 21a of the polarization plate 21 is directed the direction of 36.5°±3° with respect to the opposite direction to the twisted direction of the molecules of the liquid crystal 13 and the transmission axis 22a of the polarization plate 22 is in the direction of 47.5°±3° with respect to the opposite direction to the twisted direction of the molecules of the liquid crystal 13.

The direction of the phase-delay axis 23a of the retardation plate 23 is in the direction of 138.5°±3° with respect to the opposite direction to the twisted direction of the molecules of the liquid crystal 13.

The color LCD device according to this embodiment, like that of the third embodiment, colors light using the birefringence effects of the retardation plate 23 and the LC cell 10 and the polarization effects of the polarization plates 21 and 22.

Figure 39:
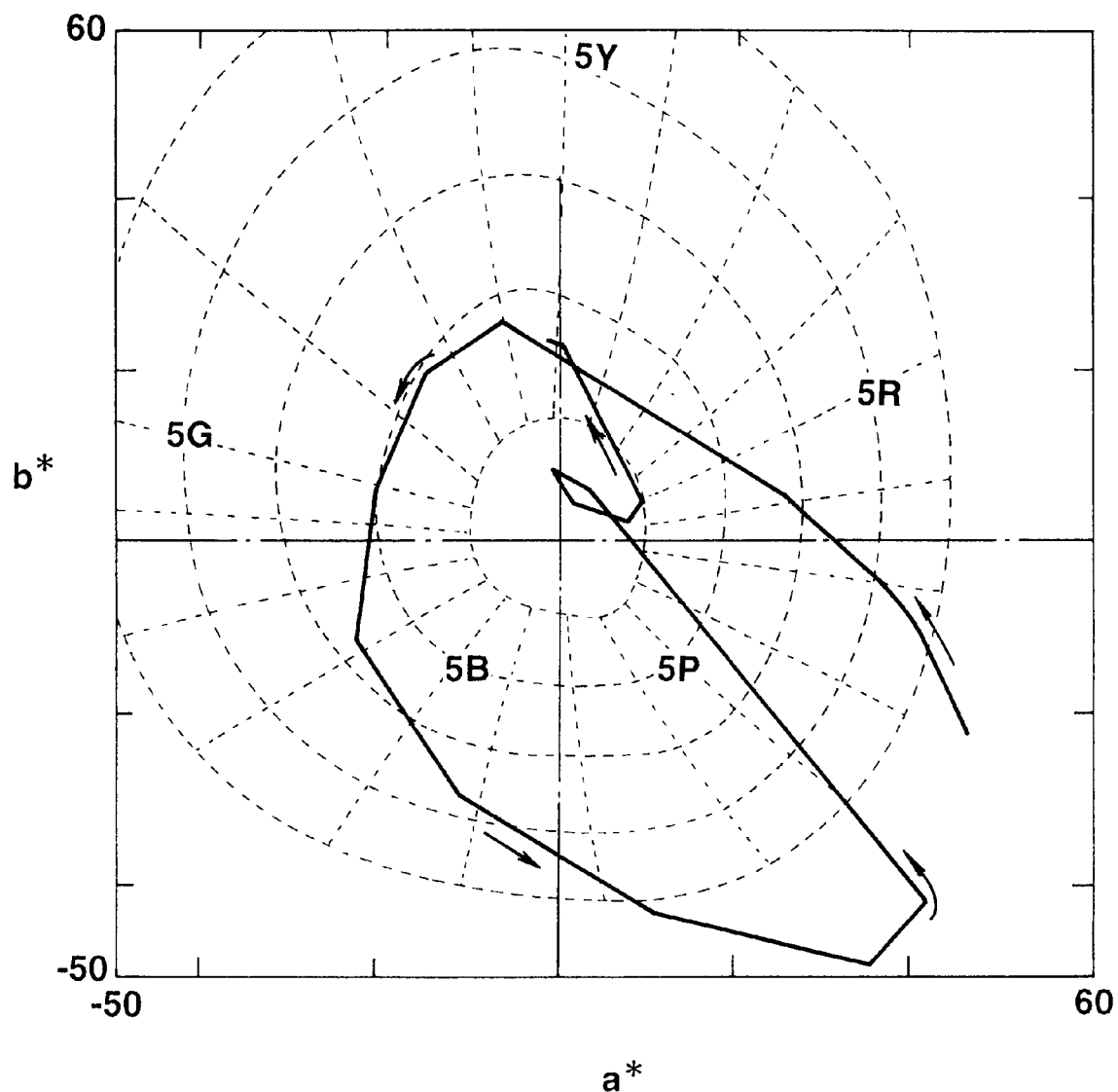
FIG. 39 is an a*-b* chromaticity diagram showing a change in display color according to the fourth embodiment.

FIG. 39 is an a*-b* chromaticity diagram showing a change in display color according to this embodiment.

As illustrated, the display color of the color LCD device according to this embodiment is close to purple (P) in the initial state where no voltage is applied between the electrodes 15 and 17. As the voltage applied between the electrodes 15 and 17 increases, the display color changes from red (R) to green (G), to blue (B), to black, then to white in order. Those display colors are clear and have high color purities.

Further, the outgoing ratio R(min) in the black display state of the color LCD device of this embodiment, the outgoing ratio R(5V) in the white display state when the applied voltage is 5 V and the outgoing ratio R(7V) when the applied voltage is 7 V are as follows.

R(min)=1.85%
R(5V)=22.37%
R(7V)=28.35%

The display contrast CR between black and white for the color LCD device of this embodiment is as follows:

CR(5V)=12.09
CR(7V)=15.32 where CR(5V) is the contrast when the applied voltage in the white display state is 5 V and CR(7V) is the contrast when the applied voltage in the white display state is 7 V. It is apparent that a sufficiently high contrast is acquired not only when the applied voltage for displaying white is 7 V but also when the applied voltage for displaying white is 5 V.

Such display color and contrast are acquired when the twist angle of the liquid crystal 13, the retardation value Δnd of the LC cell 10, the retardation value and the-phase delay axis 23a of the retardation plate 23, and the directions of the transmission axes of the polarization plates 21 and 22 are set under the aforementioned conditional ranges. When the conditions come off the ranges, the display quality becomes poorer in the order of the contrast and then the display color as the degree of the deviation increases.

As discussed above, this embodiment can provide an ECB type LCD device which can display clear white, black and three primary colors of red, green and blue with high contrasts and high color purities, thus ensuring colorful multi-color display.

Fifth Embodiment

Figure 40:
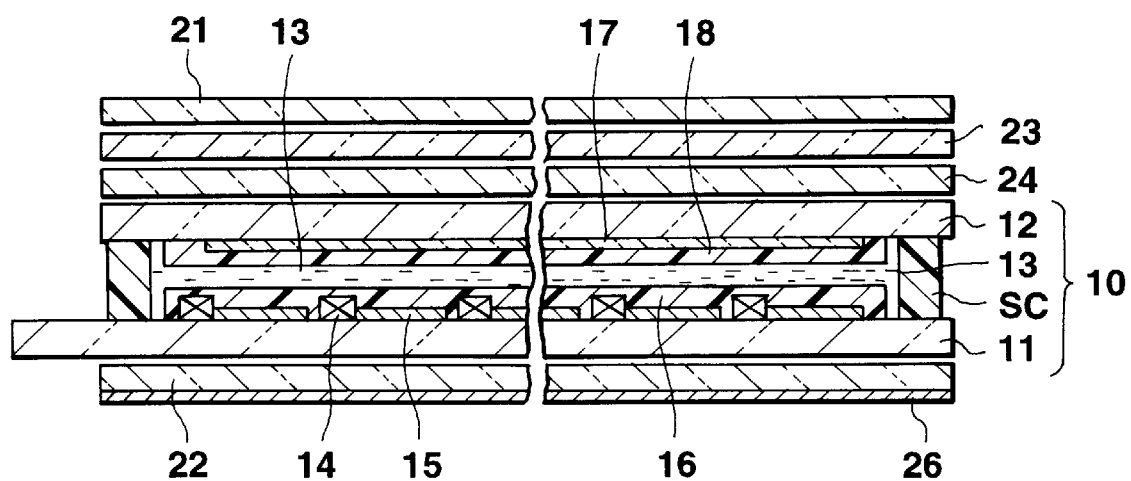
FIG. 40 is a cross-sectional view illustrating the structure of an ECB type color LCD device according to the fifth embodiment of this invention.
Figure 41A:
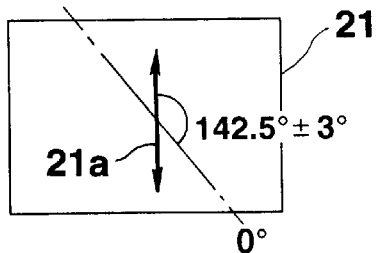
FIGS. 41A to 41E are diagrams illustrating the alignment state of the LC molecules, the directions of the transmission axes of polarization plates and the direction of a phase-delay axis of a retardation plate of an LCD device according to the fifth embodiment.
Figure 41B:
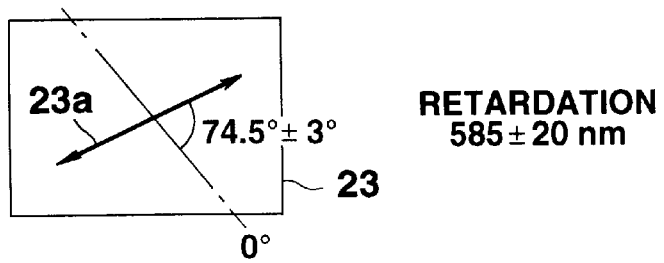
Figure 41C:
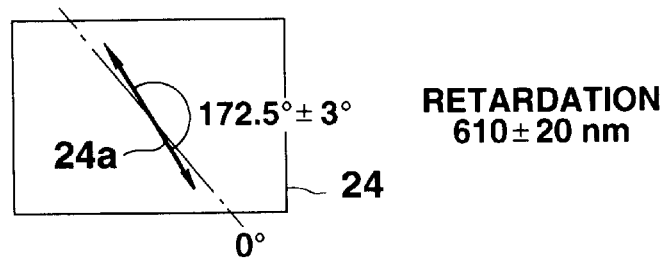
Figure 41D:
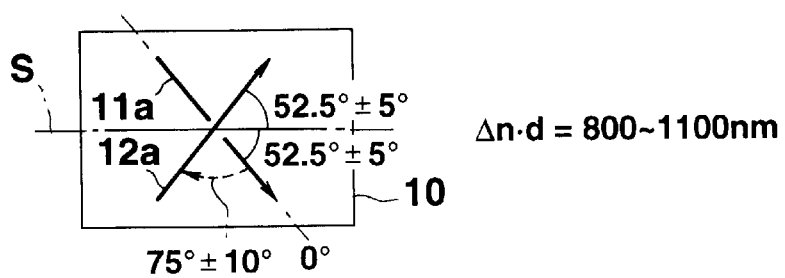
Figure 41E:
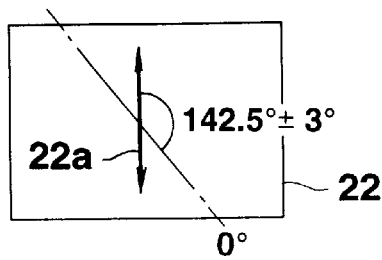

FIG. 40 is a cross-sectional view illustrating the structure of an LCD device according to this embodiment.

This LCD device has another single retardation plate 24 added to the LCD device in FIG. 33. As the other structure is the same as that shown in FIG. 33, like or same reference numerals are given to those components which are the same as the corresponding components of the first embodiment to avoid the otherwise redundant description.

Although the polarization plates 21 and 22 in use are those of the embodiment 1-2, the polarization plates of any of the embodiment 1-1 and the comparative examples 1-1 and 1-2 may be used.

In this embodiment, the retardation value Δnd of the LC cell 10 (the product of the refractive anisotropy Δn of the liquid crystal 13 and the layer thickness d of the liquid crystal 13) is set to 800 to 1100 nm.

The retardation value of the first retardation plate 23 is 585±20 nm and the retardation value of the second retardation plate 24 is 610±20 nm.

FIGS. 41A to 41E are diagrams used to explain the alignment state of the molecules of the liquid crystal 13 in the LC cell 10, the directions of the transmission axes of polarization plates 21 and 22 and the directions of the phase-delay axes of the retardation plates 23 and 24 according to this embodiment.

As illustrated, the aligning direction 11a of the molecules of the liquid crystal 13 near the transparent substrate 11 (the direction of the aligning treatment on the aligning film 18) is shifted clockwise by 52.5°±5° with respect to the horizontal axis S of the LC cell 10 and the aligning direction 12a of the molecules of the liquid crystal 13 near the transparent substrate 12 (the direction of the aligning treatment on the aligning film 18) is shifted counterclockwise by 52.5°±5° with respect to the horizontal axis S. The molecules of the liquid crystal 13 are twisted clockwise at a twist angle of 75°±10° toward the transparent substrate 12 from the transparent substrate 11, as indicated by the broken line arrow in the diagram.

Given that the aligning direction 11a of the LC molecules is set to the direction of 0°, the transmission axis 21a of the polarization plate 21 is directed the direction of 142.5°±3° with respect to the opposite direction to the twisted direction of the molecules of the liquid crystal 13 and the transmission axis 22a of the polarization plate 22 is in the direction of 142.5°±3° with respect to the opposite direction to the twisted direction of the molecules of the liquid crystal 13.

The phase-delay axis 23a of the retardation plate 23 is in the direction of 74.5°±3° with respect to the opposite direction to the twisted direction of the molecules of the liquid crystal 13. The phase-delay axis 24a of the retardation plate 24 is in the direction of 172.5°±3° with respect to the opposite direction to the twisted direction of the molecules of the liquid crystal 13.

According to the color LCD device of this embodiment, the incident light passes through the polarization plate 21 to become linearly polarized light with the transmission axis 21a taken as the polarization direction. As this linearly polarized light passes the retardation plates 23 and 24, it becomes elliptically polarized light whose polarization state differs wavelength by wavelength. Further, the polarization state of the elliptically polarized light is changed while the light passes through the LC cell 10. Only the components of this elliptically polarized light which are set in the direction of the transmission axis 22a wavelength by wavelength pass the polarization plate 22. Consequently, the light becomes colored in accordance with the light intensity of each wavelength component. The light which has passed the polarization plate 22 is reflected at the reflector 26, passes the polarization plate 22, the LC cell 10, the retardation plates 24 and 23 and the polarization plate 21 in order, and goes out from the surface of the LCD device.

The LC cell 10 and the retardation plates 24 and 23 cause the light reflected at the reflector 26 to be affected by the opposite birefringence effect to the one that is influential at the time the light entered. The light therefore becomes linearly polarized light whose polarization direction is substantially the same direction to the direction of the transmission axis 21a of the polarization plate 21. Thus, the outgoing light which has passed the polarization plate 21 is colored to substantially the same color as that of the light which has been reflected at the reflector 26.

When a voltage is applied between the electrodes 15 and 17 of the LC cell 10, the molecules of the liquid crystal 13 are aligned upright while keeping the twisted state. As the upright angle of the molecules of the liquid crystal 13 increases, the birefringence effect by the layer of the liquid crystal 13 decreases. When the birefringence effect by the layer of the liquid crystal 13 changes, the polarization state of the light which has passed the LC cell 10 to be incident to the polarization plate 22 changes. Consequently, the colored state of the light which has passed the polarization plate 22 changes and that light is reflected at the reflector 26 to go out from the surface of the LCD device.

The display color of the LCD device can be altered in accordance with the voltage to be applied between the electrodes 15 and 17 in this manner.

Figure 42:
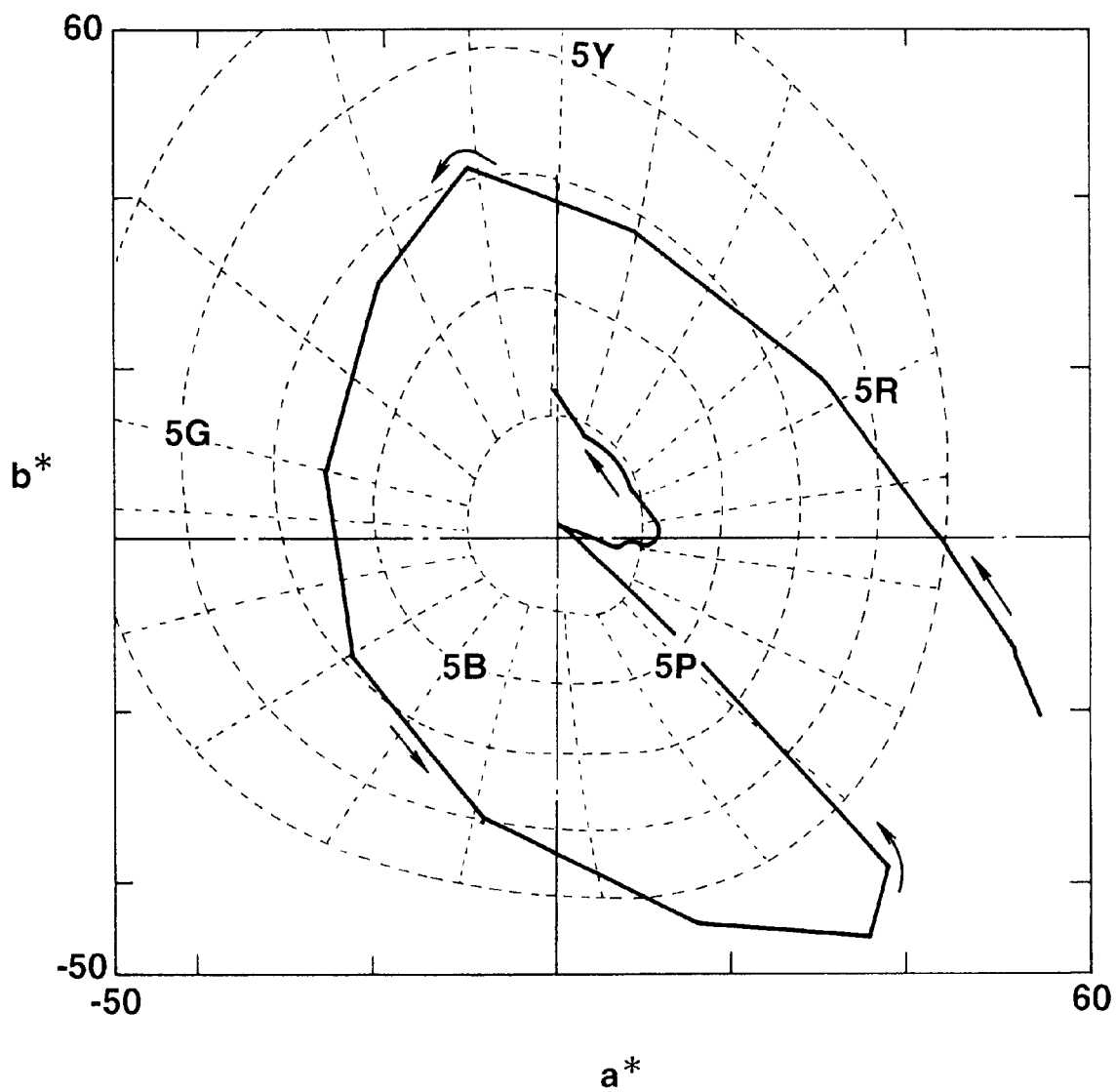
FIG. 42 is an a*-b* chromaticity diagram showing a change in display color according to the fifth embodiment.
Figure 43A:
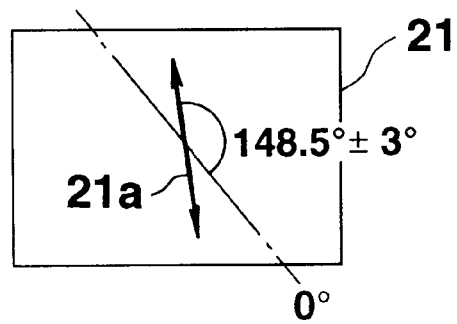
FIGS. 43A to 43E are diagrams illustrating the alignment state of the LC molecules, the directions of the transmission axes of polarization plates and the direction of the phase-delay axis of a retardation plate of an LCD device according to a modification of the fifth embodiment.
Figure 43B:
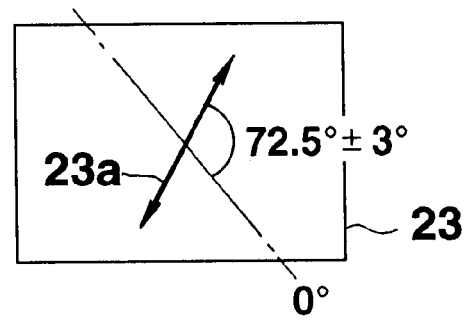
Figure 43C:
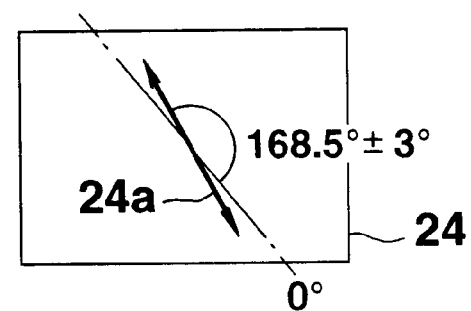
Figure 43D:
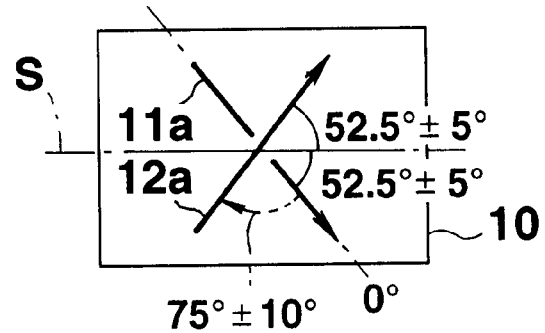
Figure 43E:
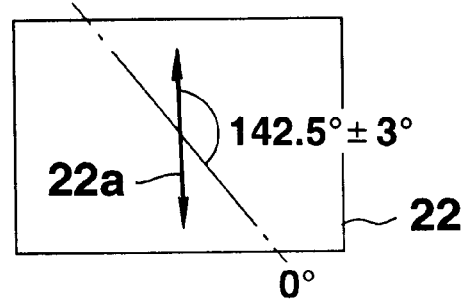

FIG. 42 is an a*-b* chromaticity diagram showing a change in display color according to this embodiment.

As illustrated, the display color of the color LCD device according to this embodiment is close to purple (P) in the initial state where no voltage is applied between the electrodes 15 and 17. As the voltage applied between the electrodes 15 and 17 increases, the display color changes from red (R) to green (G), to blue (B), to black, then to white in order. Those display colors are clear and have high color purities.

Further, the outgoing ratio R(min) in the black display state of the color LCD device of this embodiment, the outgoing ratio R(5V) in the white display state when the applied voltage is 5 V and the outgoing ratio R(7V) when the applied voltage is 7 V are as follows.

R(min)=2.87%

R(5V)=24.57%

R(7V)=30.96%

The display contrast CR between black and white for the color LCD device of this embodiment is as follows:

CR(5V)=8.56

CR(7V)=10.79 where CR(5V) is the contrast when the applied voltage in the white display state is 5 V and CR(7V) is the contrast when the applied voltage in the white display state is 7 V. It is apparent that a sufficiently high contrast is acquired not only when the applied voltage for displaying white is 7 V but also when the applied voltage for displaying white is 5 V.

A modification of this embodiment will now be discussed.

FIGS. 43A to 43E are diagrams for explaining the alignment state of the molecules of the liquid crystal 13 of the LC cell 10, the directions of the transmission axes of polarization plates 21 and 22 and the directions of the phase-delay axes of the retardation plates 23 and 24 in this modification.

According to this modification, given that the aligning direction 11a of the LC molecules is the direction of 0°, the transmission axis 21a of the polarization plate 21 is set in the direction of 148.5°±3° with respect to the opposite direction to the twisted direction of the molecules of the liquid crystal 13, the phase-delay axis 23a of the retardation plate 23 is set in the direction of 72.5°±3° with respect to the opposite direction to the twisted direction of the molecules of the liquid crystal 13, and the phase-delay axis 24a of the retardation plate 24 is set in the direction of 168.5°±3° with respect to the opposite direction to the twisted direction of the molecules of the liquid crystal 13. The aligning directions 11a and 12a of the molecules of the liquid crystal 13 and the direction of the transmission axis 22a of the polarization plate 22 are the same as those in the case illustrated in FIGS. 41A to 41E.

Figure 44:
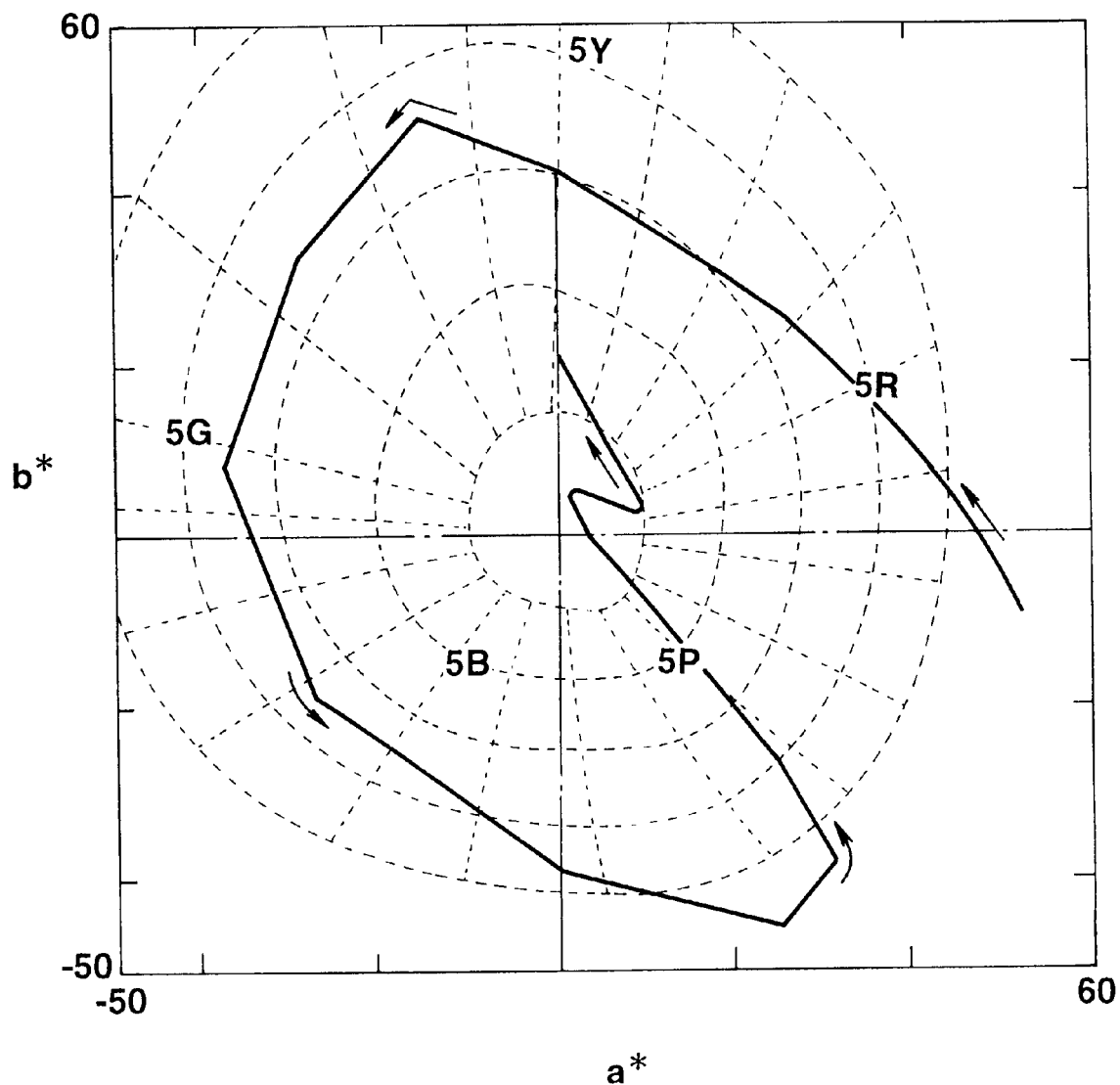
FIG. 44 is an a*-b* chromaticity diagram showing a change in display color according to the modification of the fifth embodiment.
Figure 45A:
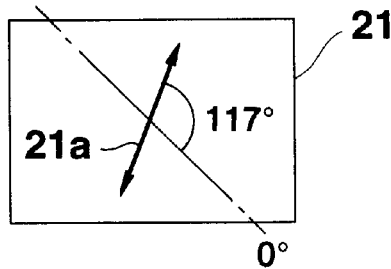
FIGS. 45A to 45E are diagrams illustrating the alignment state of the LC molecules, the directions of the transmission axes of polarization plates and the direction of a phase-delay axis of a retardation plate of an LCD device according to a comparative example of the fifth embodiment.
Figure 45B:
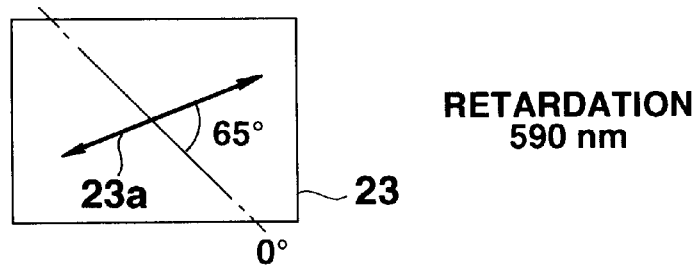
Figure 45C:
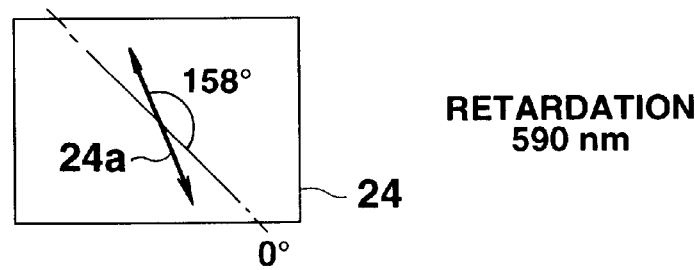
Figure 45D:
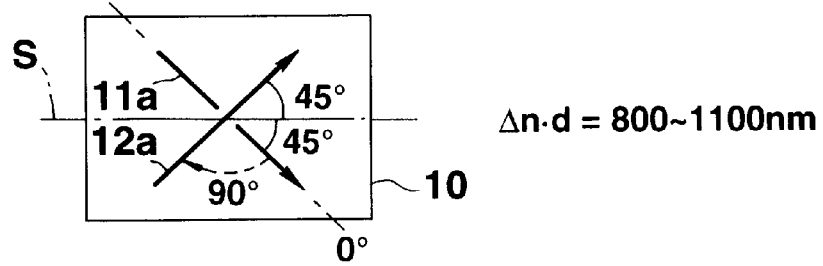
Figure 45E:
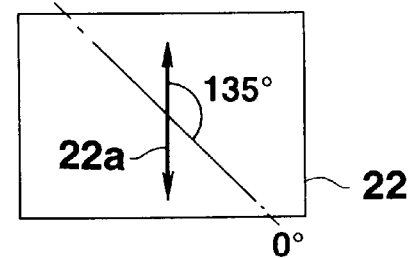

FIG. 44 is an a*-b* chromaticity diagram showing a change in display color of the color LCD device according to this modification.

As illustrated, the display color of the color LCD device according to this modification is close to purple (P) in the initial state where no voltage is applied between the electrodes 15 and 17. As the voltage applied between the electrodes 15 and 17 increases, the display color changes from red (R) to green (G), to blue (B), to black, then to white in order. Those display colors are clear and have high color purities.

Further, the outgoing ratio R(min) in the black display state of the color LCD device of this modification, the outgoing ratio R(5V) in the white display state when the applied voltage is 5 V and the outgoing ratio R(7V) when the applied voltage is 7 V are as follows.

R(min)=2.84%

R(5V)=23.45%

R(7V)=26.98%

The display contrast CR between black and white for the color LCD device of this modification is as follows:

CR(5V)=8.26

CR(7V)=9.50 where CR(5V) is the contrast when the applied voltage in the white display state is 5 V and CR(7V) is the contrast when the applied voltage in the white display state is 7 V. It is apparent that a sufficiently high contrast is acquired not only when the applied voltage for displaying white is 7 V but also when the applied voltage for displaying white is 5 V.

A comparative example of this fifth embodiment will now be described.

The structure of an LCD device according to this comparative example is the same as the structure of the LCD device in FIG. 40.

In this comparative example, the retardation value Δnd of the LC cell 10 is set to 800 to 1100 nm, the retardation value of the retardation plate 23 is about 590 nm and the retardation value of the retardation plate 24 is about 590 nm.

FIGS. 45A to 45E are diagram used to explain the alignment state of the molecules of the liquid crystal 13 in the LC cell 10, the directions of the transmission axes of polarization plates 21 and 22 and the directions of the phase-delay axes of the retardation plates 23 and 24 according to this comparative example.

As illustrated, the aligning direction 11a of the molecules of the liquid crystal 13 near the transparent substrate 11 (the direction of the aligning treatment on the aligning film 18) is shifted clockwise by 45° with respect to the horizontal axis S of the LC cell 10 and the aligning direction 12a of the molecules of the liquid crystal 13 near the transparent substrate 12 (the direction of the aligning treatment on the aligning film 18) is shifted counterclockwise by 45° with respect to the horizontal axis S. The molecules of the liquid crystal 13 are twisted clockwise at a twist angle of 90° toward the transparent substrate 12 from the transparent substrate 11, as indicated by the broken line arrow in the diagram.

Given that the aligning direction 11a of the LC molecules is set to the direction of 0°, the transmission axis 21a of the polarization plate 21 is directed the direction of 117° with respect to the opposite direction to the twisted direction of the molecules of the liquid crystal 13 and the transmission axis 22a of the polarization plate 22 is in the direction of 135° with respect to the opposite direction to the twisted direction of the molecules of the liquid crystal 13.

The phase-delay axis 23a of the retardation plate 23 is in the direction of 65° with respect to the opposite direction to the twisted direction of the molecules of the liquid crystal 13. The phase-delay axis 24a of the retardation plate 24 is in the direction of 158° with respect to the opposite direction to the twisted direction of the molecules of the liquid crystal 13.

Figure 46:
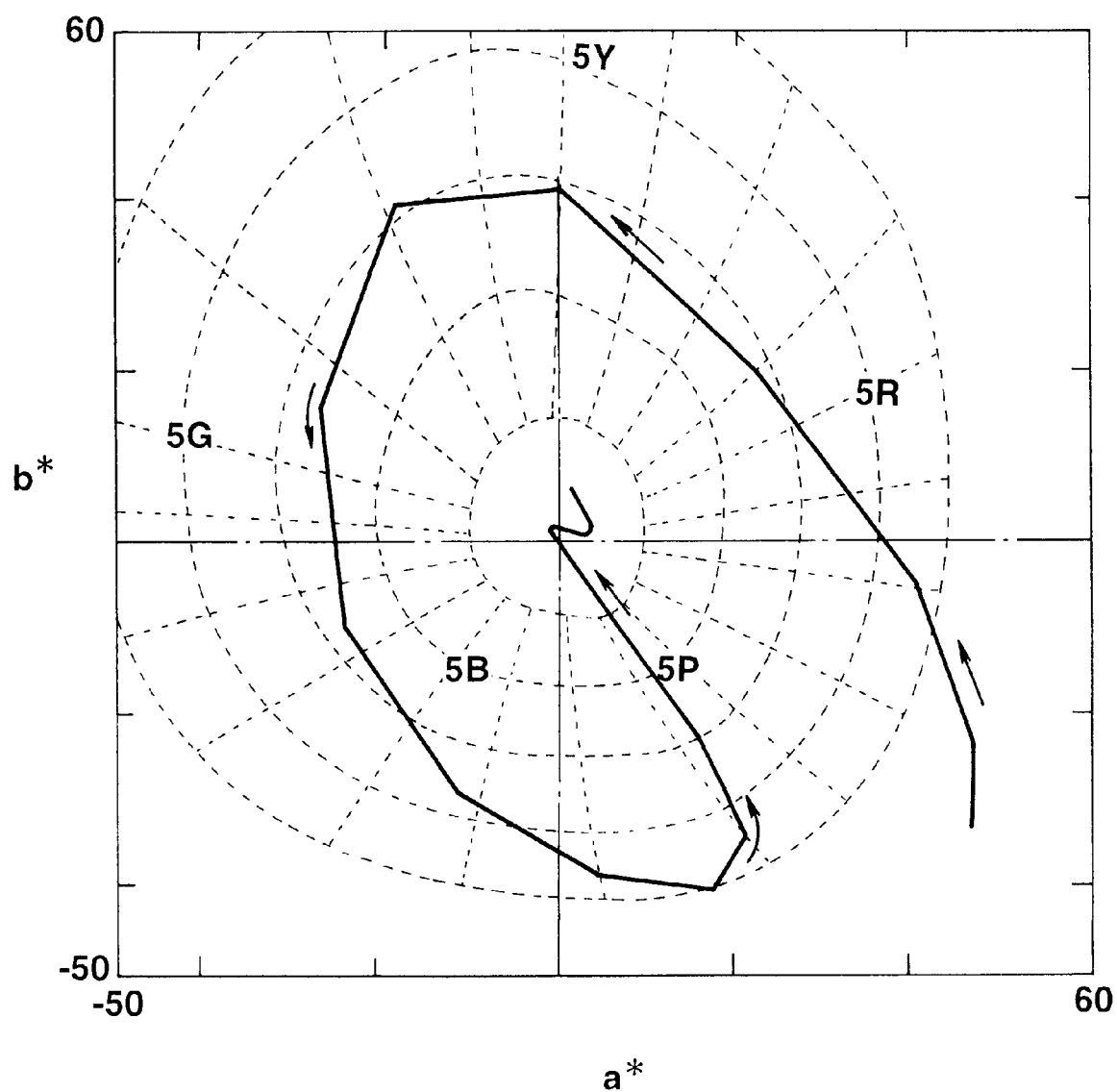
FIG. 46 is an a*-b* chromaticity diagram showing a change in display color according to the comparative example of the fifth embodiment.
Figure 47A:
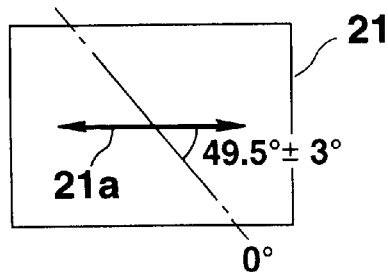
FIGS. 47A to 47E are diagrams illustrating the alignment state of the LC molecules, the directions of the transmission axes of polarization plates and the direction of a phase-delay axis of a retardation plate of an LCD device according to the sixth embodiment.
Figure 47B:
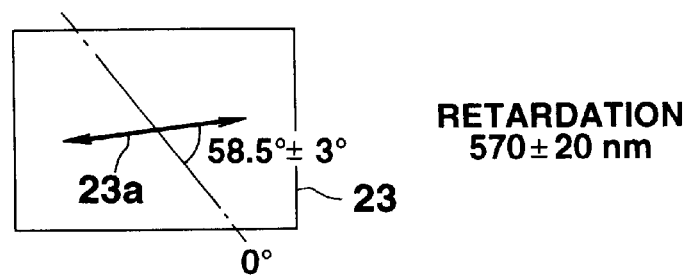
Figure 47C:
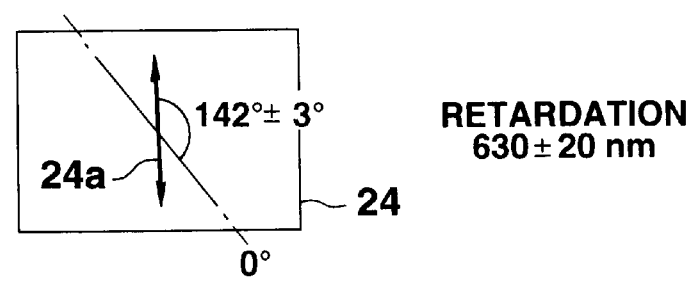
Figure 47D:
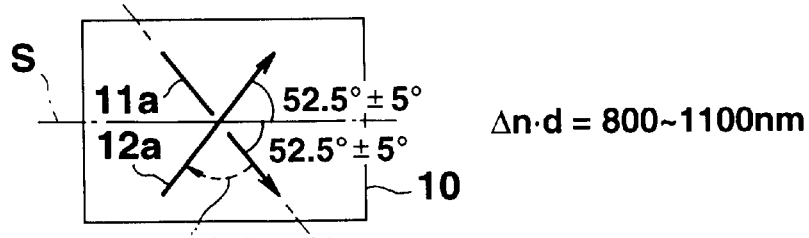
Figure 47E:
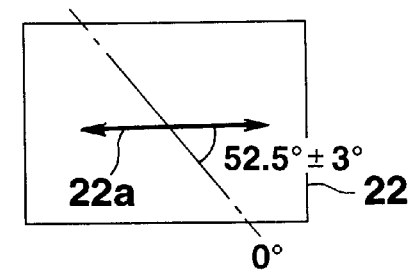

FIG. 46 is an a*-b* chromaticity diagram showing a change in display color according to this comparative example.

As illustrated, the display color of the color LCD device according to this comparative example changes from red (R) to green (G), to blue (B), to black, then to white in order as the voltage applied between the electrodes 15 and 17 increases. Those display colors are clear and have high color purities.

Further, the outgoing ratio R(min) in the black display state of the color LCD device of this comparative example, the outgoing ratio R(5V) in the white display state when the applied voltage is 5 V and the outgoing ratio R(7V) when the applied voltage is 7 V are as follows.

R(min)=2.82%

R(5V)=20.49%

R(7V)=24.12%

The display contrast CR between black and white for the color LCD device of this comparative example is as follows:

CR(5V)=7.27

CR(7V)=8.55

From the above, it is understood that the LCD devices according to the fifth embodiment and its modification can provide a higher contrast than the LCD device of the comparative example.

Sixth Embodiment

The structure of an LCD device according to this embodiment is the same as that of the LCD device shown in FIG. 40.

In this embodiment, the retardation value Δnd of the LC cell 10 (the product of the refractive anisotropy Δn of the liquid crystal 13 and the layer thickness d of the liquid crystal 13) is set to 800 to 1100 nm.

The retardation value of the first retardation plate 23 is 570±20 nm and the retardation value of the second retardation plate 24 is 630±20 nm.

FIGS. 47A to 47E are diagrams used to explain the alignment state of the molecules of the liquid crystal 13 in the LC cell 10, the directions of the transmission axes of polarization plates 21 and 22 and the directions of the phase-delay axes of the retardation plates 23 and 24 according to this embodiment.

As illustrated, the aligning direction 11a of the molecules of the liquid crystal 13 near the transparent substrate 11 (the direction of the aligning treatment on the aligning film 18) is shifted clockwise by 52.5°±5° with respect to the horizontal axis S of the LC cell 10 and the aligning direction 12a of the molecules of the liquid crystal 13 near the transparent substrate 12 (the direction of the aligning treatment on the aligning film 18) is shifted counterclockwise by 52.5°±5° with respect to the horizontal axis S. The molecules of the liquid crystal 13 are twisted clockwise at a twist angle of 75°±10° toward the transparent substrate 12 from the transparent substrate 11, as indicated by the broken line arrow in the diagram.

Given that the aligning direction 11a of the LC molecules is set to the direction of 0°, the transmission axis 21a of the polarization plate 21 is directed the direction of 49.5°±3° with respect to the opposite direction to the twisted direction of the molecules of the liquid crystal 13 and the transmission axis 22a of the polarization plate 22 is in the direction of 52.5°±3° with respect to the opposite direction to the twisted direction of the molecules of the liquid crystal 13.

The phase-delay axis 23a of the retardation plate 23 is in the direction of 58.5°±3° with respect to the opposite direction to the twisted direction of the molecules of the liquid crystal 13. The phase-delay axis 24a of the retardation plate 24 is in the direction of 142.5°±3° with respect to the opposite direction to the twisted direction of the molecules of the liquid crystal 13.

The color LCD device according to this embodiment, like that of the modification of the third embodiment, colors light using the birefringence effects of the retardation plate 23 and the LC cell 10 and the polarization effects of the polarization plates 21 and 22.

Figure 48:
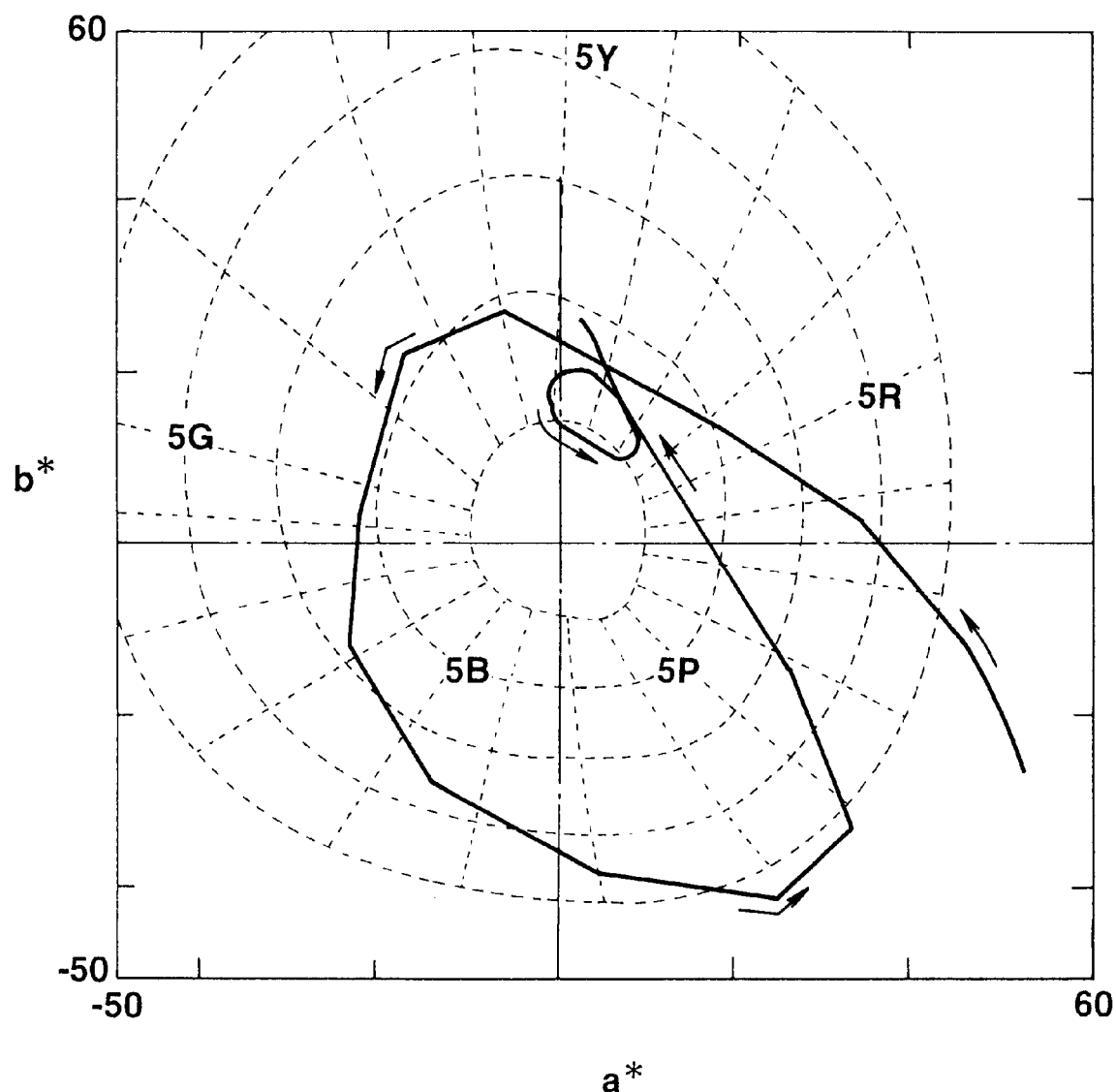
FIG. 48 is an a*-b* chromaticity diagram showing a change in display color according to the sixth embodiment.

FIG. 48 is an a*-b* chromaticity diagram showing a change in display color according to this embodiment.

As illustrated, the display color of the color LCD device according to this embodiment changes from red (R) to green (G), to blue (B), to black, then to white in order as the voltage applied between the electrodes 15 and 17 increases. Those display colors are clear and have high color purities.

Further, the outgoing ratio R(min) in the black display state of the color LCD device of this embodiment, the outgoing ratio R(5V) in the white display state when the applied voltage is 5 V and the outgoing ratio R(7V) when the applied voltage is 7 V are as follows.

R(min)=2.67%

R(5V)=22.25%

R(7V)=28.32%

The display contrast CR between black and white for the color LCD device of this embodiment is as follows:

CR(5V)=8.33

CR(7V)=10.61 where CR(5V) is the contrast when the applied voltage in the white display state is 5 V and CR(7V) is the contrast when the applied voltage in the white display state is 7 V. It is apparent that a sufficiently high contrast is acquired not only when the applied voltage for displaying white is 7 V but also when the applied voltage for displaying white is 5 V.

Such display color and contrast are acquired when the twist angle of the liquid crystal 13, the retardation value Δnd of the LC cell 10, the retardation value of the retardation plate 23, the direction of the phase-delay axis 23a of the retardation plate 23 and the directions of the transmission axes 21a and 22a of the polarization plates 21 and 22 are set under the aforementioned conditional ranges. When the conditions come off the ranges, the display quality becomes poorer in the order of the contrast and then the display color as the degree of the deviation increases.

As discussed above, this embodiment can provide an ECB type LCD device which can display clear white, black and three primary colors of red, green and blue with high contrasts and high color purities, thus ensuring colorful multi-color display.

Seventh Embodiment

Figure 49:
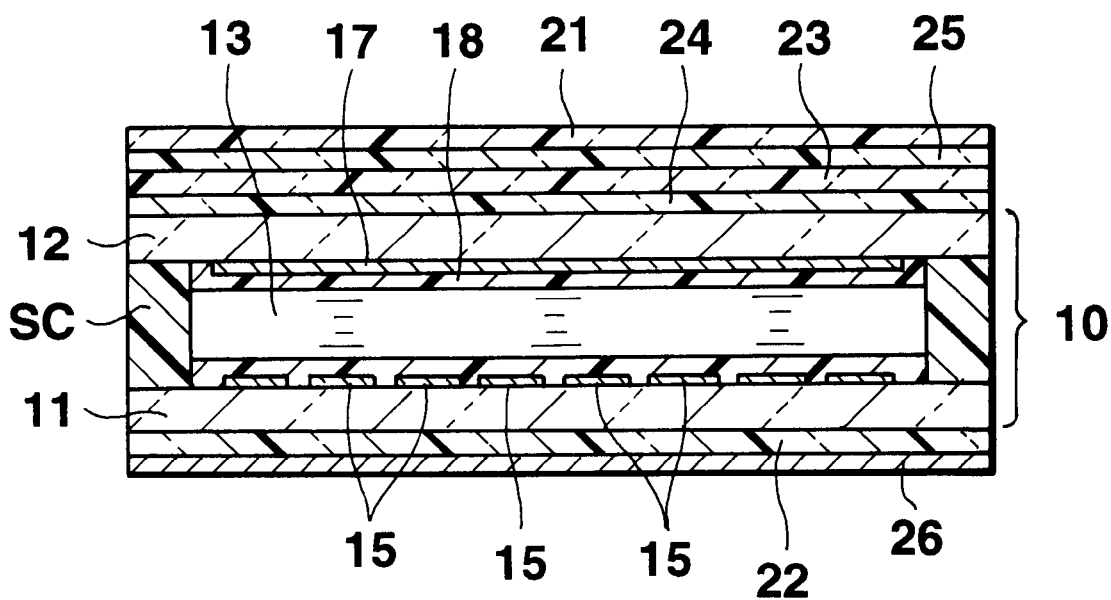
FIG. 49 is a cross-sectional view illustrating the structure of an ECB type color LCD device according to the seventh embodiment of this invention.
Figure 50A:
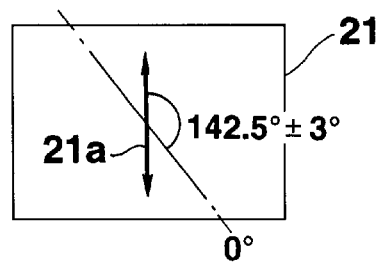
FIGS. 50A to 50F are diagrams illustrating the alignment state of the LC molecules, the directions of the transmission axes of polarization plates and the direction of a phase-delay axis of a retardation plate of an LCD device according to the seventh embodiment.
Figure 50B:
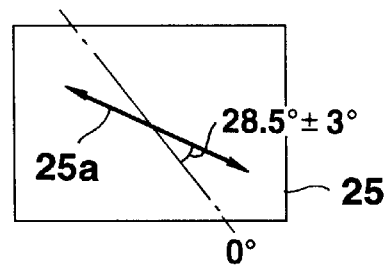
Figure 50C:
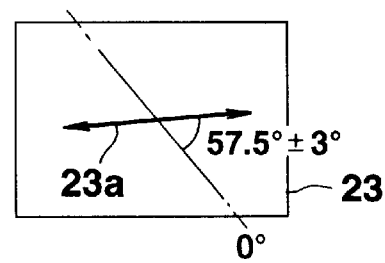
Figure 50D:
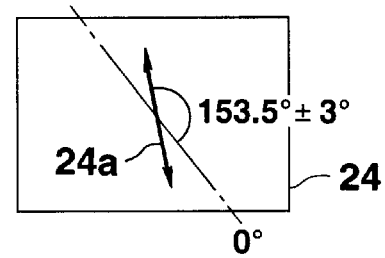
Figure 50E:
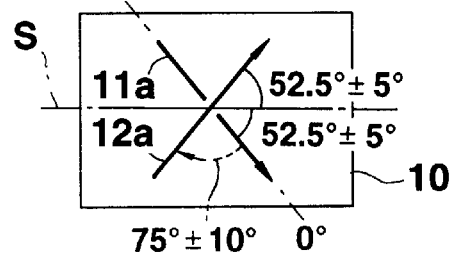
Figure 50F:
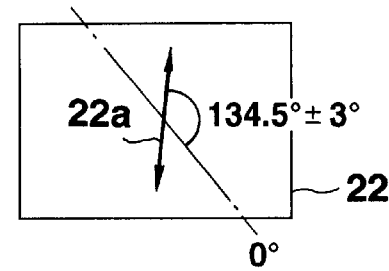

FIG. 49 is a cross-sectional view illustrating the structure of an LCD device according to this embodiment.

This LCD device has another single retardation plate 25 added to the LCD device in FIG. 40. As the other structure is the same as that shown in FIG. 40, like or same reference numerals are given to those components which are the same as the corresponding components of the first embodiment to avoid the otherwise redundant description.

In this embodiment, the retardation value Δnd of the LC cell 10 (the product of the refractive anisotropy Δn of the liquid crystal 13 and the layer thickness d of the liquid crystal 13) is set to 800 to 1100 nm.

The retardation value of the retardation plate 23 is 1500±20 nm, the retardation value of the retardation plate 24 is 1500±20 nm and the retardation value of the retardation plate 25 is 430±20 nm.

FIGS. 50A to 50F are diagrams used to explain the alignment state of the molecules of the liquid crystal 13 in the LC cell 10, the directions of the transmission axes of polarization plates 21 and 22 and the directions of the phase-delay axes of the retardation plates 23, 24 and 25 according to this embodiment.

As illustrated, the aligning direction 11a of the molecules of the liquid crystal 13 near the transparent substrate 11 (the direction of the aligning treatment on the aligning film 18) is shifted clockwise by 52.5°±5° with respect to the horizontal axis S of the LC cell 10 and the aligning direction 12a of the molecules of the liquid crystal 13 near the transparent substrate 12 (the direction of the aligning treatment on the aligning film 18) is shifted counterclockwise by 52.5°±5° with respect to the horizontal axis S. The molecules of the liquid crystal 13 are twisted clockwise at a twist angle of 75°±10° toward the transparent substrate 12 from the transparent substrate 11, as indicated by the broken line arrow in the diagram.

Given that the aligning direction 11a of the LC molecules is set to the direction of 0°, the transmission axis 21a of the polarization plate 21 is directed the direction of 142.5°±3° with respect to the opposite direction to the twisted direction of the molecules of the liquid crystal 13 and the transmission axis 22a of the polarization plate 22 is in the direction of 134.5°±3° with respect to the opposite direction to the twisted direction of the molecules of the liquid crystal 13.

The phase-delay axis 25a of the retardation plate 25 is in the direction of 28.5°±3° with respect to the opposite direction to the twisted direction of the molecules of the liquid crystal 13, the phase-delay axis 23a of the retardation plate 23 is in the direction of 57.5°±3° with respect to the opposite direction to the twisted direction of the molecules of the liquid crystal 13, and the phase-delay axis 24a of the retardation plate 24 is in the direction of 153.5°±3° with respect to the opposite direction to the twisted direction of the molecules of the liquid crystal 13.

According to the color LCD device of this embodiment, the incident light passes through the polarization plate 21 to become linearly polarized light with the transmission axis 21a taken as the polarization direction. As this linearly polarized light passes the retardation plates 23, 24 and 25, it becomes elliptically polarized light whose polarization state differs wavelength by wavelength. Further, the polarization state of the elliptically polarized light is changed while the light passes through the LC cell 10. Only the components of this elliptically polarized light which are set in the direction of the transmission axis 22a wavelength by wavelength pass the polarization plate 22. Consequently, the light becomes colored in accordance with the light intensity of each wavelength component. The light which has passed the polarization plate 22 is reflected at the reflector 26, passes the polarization plate 22, the LC cell 10, the retardation plates 25, 24 and 23 and the polarization plate 21 in order, and goes out from the surface of the LCD device.

The LC cell 10 and the retardation plates 25, 24 and 23 cause the light reflected at the reflector 26 to be affected by the opposite birefringence effect to the one that is influential at the time the light entered. The light therefore becomes linearly polarized light whose polarization direction is substantially the same direction to the direction of the transmission axis 21a of the polarization plate 21. Thus, the outgoing light which has passed the polarization plate 21 is colored to substantially the same color as that of the light which has been reflected at the reflector 26.

When a voltage is applied between the electrodes 15 and 17 of the LC cell 10, the molecules of the liquid crystal 13 are aligned upright while keeping the twisted state. As the upright angle of the molecules of the liquid crystal 13 increases, the birefringence effect by the layer of the liquid crystal 13 decreases. When the birefringence effect by the layer of the liquid crystal 13 changes, the polarization state of the light which has passed the LC cell 10 to be incident to the polarization plate 22 changes. Consequently, the colored state of the light which has passed the polarization plate 22 changes and that light is reflected at the reflector 26 to go out from the surface of the LCD device.

The display color of the LCD device can be altered in accordance with the voltage to be applied between the electrodes 15 and 17 in this manner.

Figure 51:
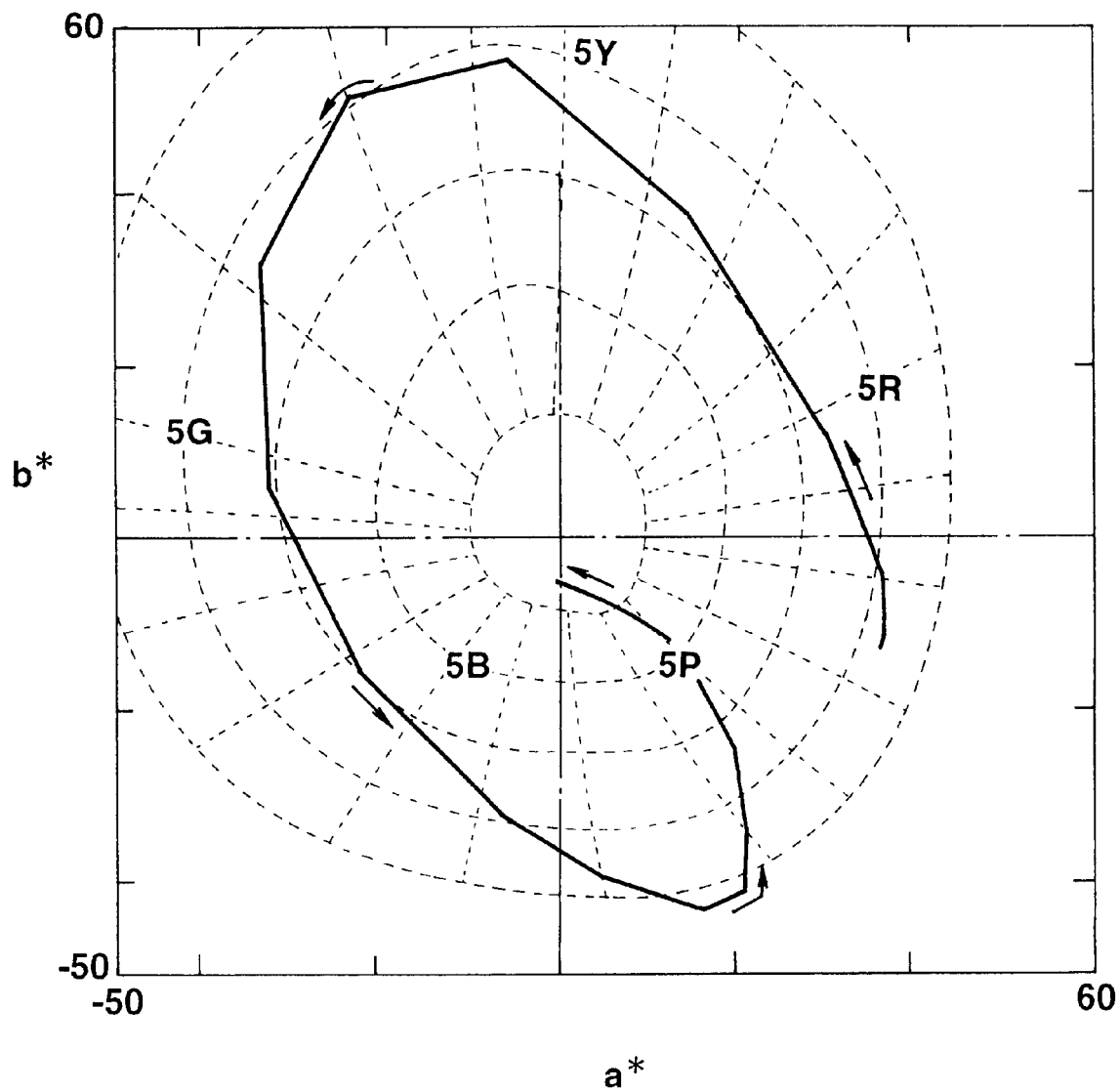
FIG. 51 is an a*-b* chromaticity diagram showing a change in display color according to the seventh embodiment.
Figure 52A:
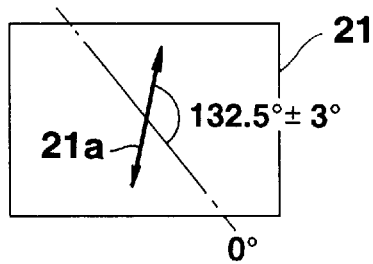
FIGS. 52A to 52F are diagrams illustrating the alignment state of the LC molecules, the directions of the transmission axes of polarization plates and the direction of the phase-delay axis of a retardation plate of an LCD device according to a modification of the seventh embodiment.
Figure 52B:
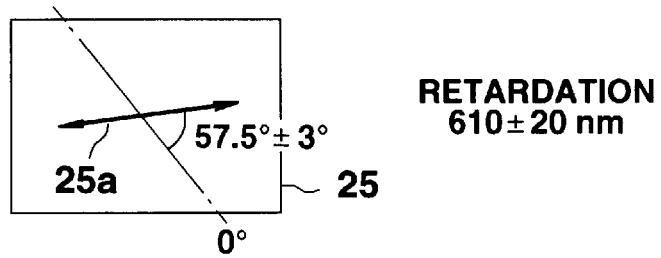
Figure 52C:
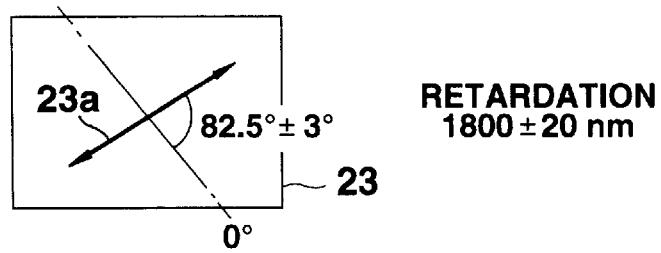
Figure 52D:
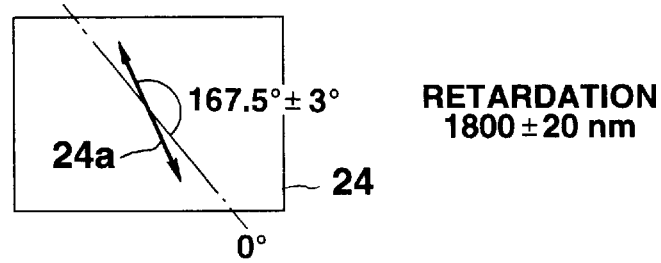
Figure 52E:
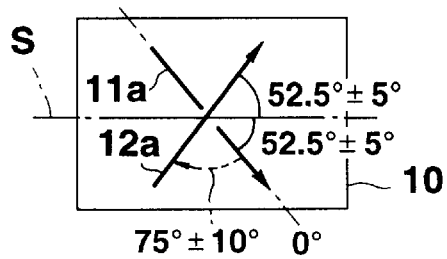
Figure 52F:
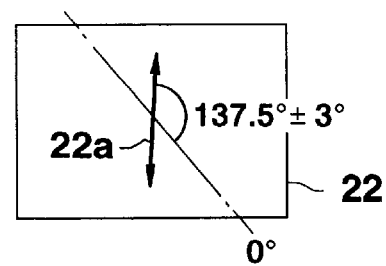

FIG. 51 is an a*-b* chromaticity diagram showing a change in display color according to this embodiment.

As illustrated, the display color of the color LCD device according to this embodiment changes from red (R) to green (G), to blue (B), to black, then to white in order as the voltage applied between the electrodes 15 and 17 increases. Those display colors are clear and have high color purities.

Further, the outgoing ratio R(min) in the black display state of the color LCD device of this embodiment, the outgoing ratio R(5V) in the white display state when the applied voltage is 5 V and the outgoing ratio R(7V) when the applied voltage is 7 V are as follows.

R(min)=1.83%

R(5V)=13.94%

R(7V)=17.02%

The display contrast CR between black and white for the color LCD device of this embodiment is as follows:

CR(5V)=7.62

CR(7V)=9.30 where CR(5V) is the contrast when the applied voltage in the white display state is 5 V and CR(7V) is the contrast when the applied voltage in the white display state is 7 V. It is apparent that a sufficiently high contrast is acquired not only when the applied voltage for displaying white is 7 V but also when the applied voltage for displaying white is 5 V.

A modification of this seventh embodiment will now be discussed.

FIGS. 52A to 52F diagrams for explaining the alignment state of the molecules of the liquid crystal 13 of the LC cell 10, the directions of the transmission axes of polarization plates 21 and 22 and the directions of the phase-delay axes of the retardation plates 23, 24 and 25 in this modification.

According to this modification, given that the aligning direction 11a of the LC molecules is the direction of 0°, the transmission axis 21a of the polarization plate 21 is set in the direction of 132.5°±3° with respect to the opposite direction to the twisted direction of the molecules of the liquid crystal 13, the transmission axis 22a of the polarization plate 22 is set in the direction of 137.5°±3° with respect to the opposite direction to the twisted direction of the molecules of the liquid crystal 13, the phase-delay axis 25a of the retardation plate 25 is set in the direction of 57.5°±3° with respect to the opposite direction to the twisted direction of the molecules of the liquid crystal 13, the phase-delay axis 23a of the retardation plate 23 is set in the direction of 82.5°±3° with respect to the opposite direction to the twisted direction of the molecules of the liquid crystal 13 and the phase-delay axis 24a of the retardation plate 24 is set in the direction of 167.5°±3° with respect to the opposite direction to the twisted direction of the molecules of the liquid crystal 13. The aligning directions 11a and 12a of the molecules of the liquid crystal 13 are the same as those in the case illustrated in FIGS. 50A to 50F.

Figure 53:
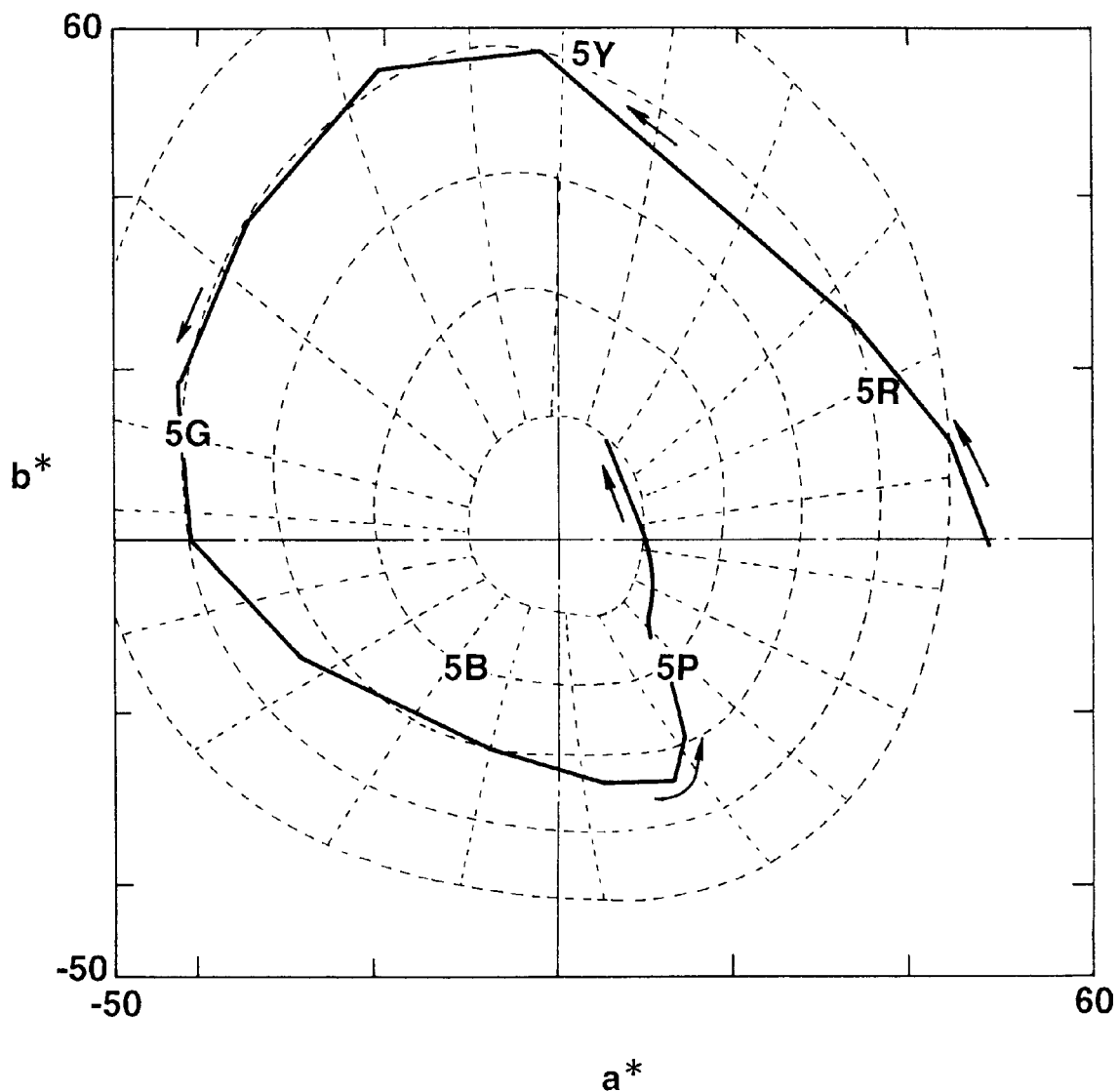
FIG. 53 is an a*-b* chromaticity diagram showing a change in display color according to the modification of the seventh embodiment.
Figure 54A:
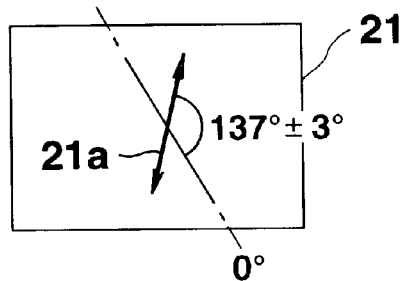
FIGS. 54A to 54D are diagrams illustrating the alignment state of the LC molecules, the directions of the transmission axes of polarization plates and the direction of a phase-delay axis of a retardation plate of an LCD device according to the eighth embodiment.
Figure 54B:
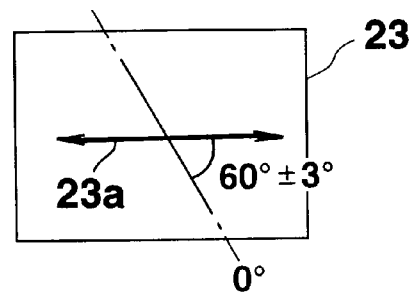
Figure 54C:
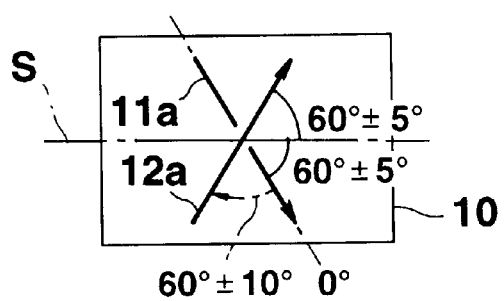
Figure 54D:
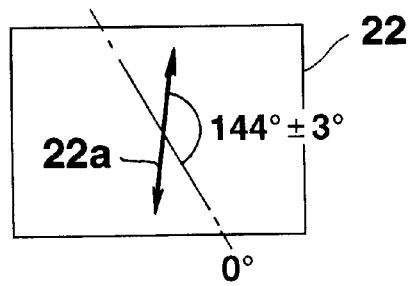

FIG. 53 is an a*-b* chromaticity diagram showing a change in display color of the color LCD device according to this modification.

As illustrated, the display color of the color LCD device according to this modification changes from red (R) to green (G), to blue (B), to black, then to white in order as the voltage applied between the electrodes 15 and 17 increases. Those display colors are clear and have high color purities.

Further, the outgoing ratio R(min) in the black display state of the color LCD device of this modification, the outgoing ratio R(5V) in the white display state when the applied voltage is 5 V and the outgoing ratio R(7V) when the applied voltage is 7 V are as follows.

R(min)=2.75%

R(5V)=21.33%

R(7V)=26.93%

The display contrast CR between black and white for the color LCD device of this modification is as follows:

CR(5V)=7.76

CR(7V)=9.29 where CR(5V) is the contrast when the applied voltage in the white display state is 5 V and CR(7V) is the contrast when the applied voltage in the white display state is 7 V. It is apparent that a sufficiently high contrast is acquired not only when the applied voltage for displaying white is 7 V but also when the applied voltage for displaying white is 5 V.

As mentioned above, if the twist angle of the molecules of the liquid crystal 13 is set to 75°±10°, the retardation value Δnd of the LC cell 10 is set to 800 to 1100 nm, the retardation value of the retardation plate 23 is set to 60±20 nm, the retardation value of the retardation plate 24 is set to 1550±20 nm, the retardation value of the retardation plate 25 is set to 1500±20 nm, the transmission axis 22a of the polarization plate 22 is directed in the range of 134.5°±3° to 137.5°±3° with respect to the opposite direction to the twisted direction of the LC molecules, the transmission axis 21a of the polarization plate 21 is directed in the range of 132.5°±3° to 142.5°±3° with respect to the opposite direction to the twisted direction of the LC molecules, the phase-delay axis 23a of the retardation plate 23 is directed in the range of 28.5°±3° to 57.5°±3° with respect to the opposite direction to the twisted direction of the LC molecules, the phase-delay axis 24a of the retardation plate 24 is directed in the range of 57.5°±3° to 82.5°±3° with respect to the opposite direction to the twisted direction of the LC molecules, and the phase-delay axis 25a of the retardation plate 25 is directed in the range of 153.5°±3° to 167.5°±3° with respect to the opposite direction to the twisted direction of the LC molecules, it is possible to display clear white, black and three primary colors of red, green and blue with high contrasts and high color purities. It is also possible to provide an ECB type LCD device capable of ensuring colorful multi-color display.

Eighth Embodiment

The structure of an LCD device according to this embodiment is the same as that of the LCD device shown in FIG. 33.

In this embodiment, the retardation value Δnd of the LC cell 10 (the product of the refractive anisotropy Δn of the liquid crystal 13 and the layer thickness d of the liquid crystal 13) is set to 800 to 1100 nm.

The retardation value of the retardation plate 23 is 215±20 nm.

FIGS. 54A to 54D are diagrams used to explain the alignment state of the molecules of the liquid crystal 13 in the LC cell 10, the directions of the transmission axes of polarization plates 21 and 22 and the direction of the phase-delay axis of the retardation plate 23 according to this embodiment.

As illustrated, the aligning direction 11a of the molecules of the liquid crystal 13 near the transparent substrate 11 (the direction of the aligning treatment on the aligning film 18) is shifted clockwise by 60.5°±5° with respect to the horizontal axis S of the LC cell 10 and the aligning direction 12a of the molecules of the liquid crystal 13 near the transparent substrate 12 (the direction of the aligning treatment on the aligning film 18) is shifted counterclockwise by 60.5°±5° with respect to the horizontal axis S. The molecules of the liquid crystal 13 are twisted clockwise at a twist angle of 60°±10° toward the transparent substrate 12 from the transparent substrate 11, as indicated by the broken line arrow in the diagram.

Given that the aligning direction 11a of the LC molecules is set to the direction of 0°, the transmission axis 21a of the polarization plate 21 is directed the direction of 137°±3° with respect to the opposite direction to the twisted direction of the molecules of the liquid crystal 13 and the transmission axis 22a of the polarization plate 22 is in the direction of 144°±3° with respect to the opposite direction to the twisted direction of the molecules of the liquid crystal 13.

The direction of the phase-delay axis 23a of the retardation plate 23 is in the direction of 60°±3° with respect to the opposite direction to the twisted direction of the molecules of the liquid crystal 13.

The color LCD device according to this embodiment, like that of the third embodiment, colors light using the birefringence effects of the retardation plate 23 and the LC cell 10 and the polarization effects of the polarization plates 21 and 22.

Figure 55:
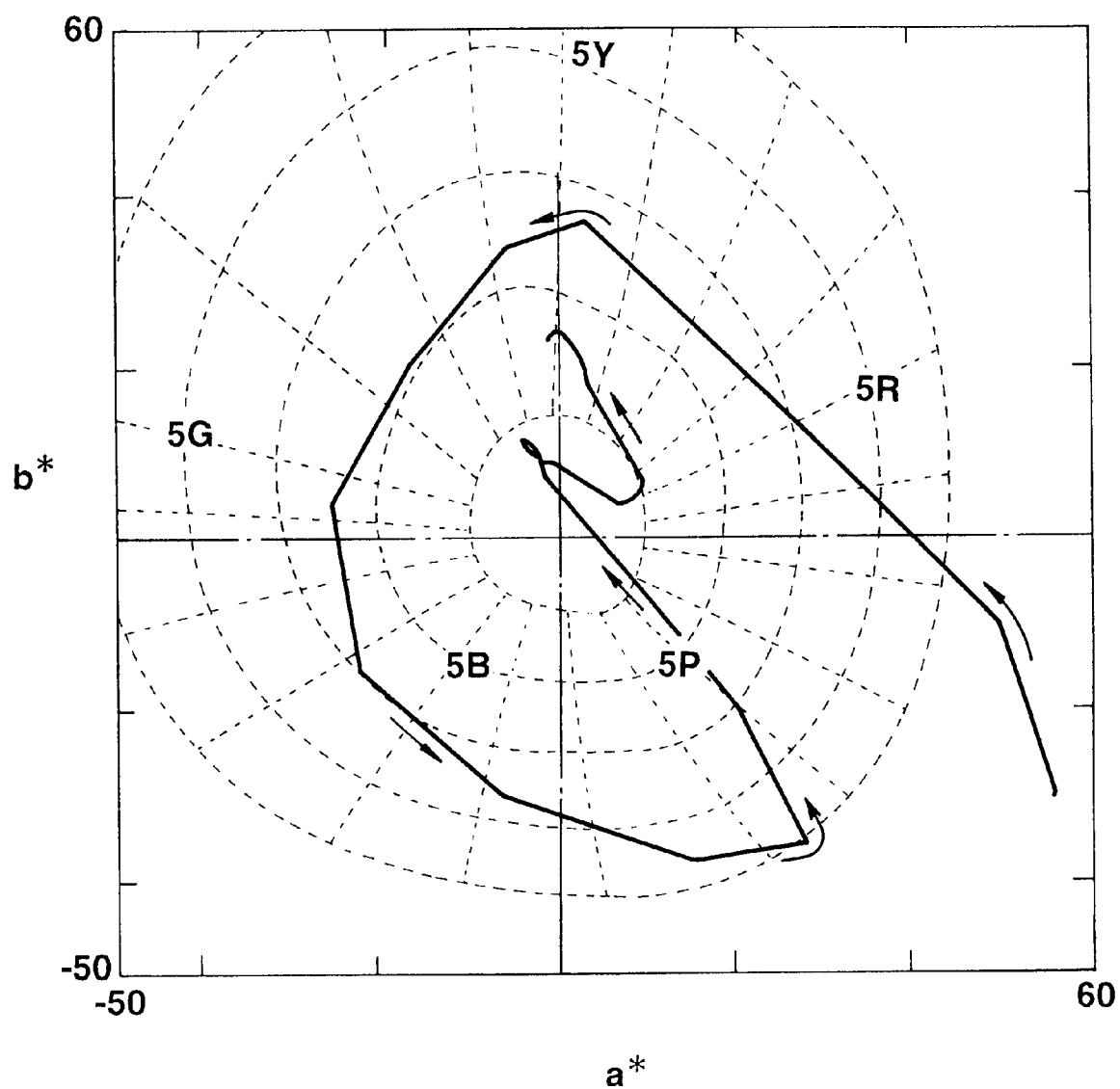
FIG. 55 is an a*-b* chromaticity diagram showing a change in display color according to the eighth embodiment.
Figure 56A:
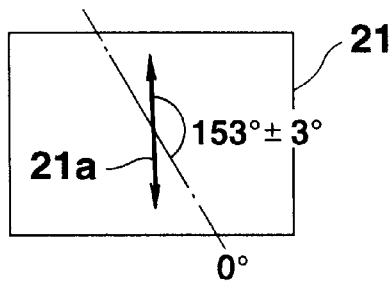
FIGS. 56A to 56E are diagrams illustrating the alignment state of the LC molecules, the directions of the transmission axes of polarization plates and the direction of a phase-delay axis of a retardation plate of an LCD device according to the ninth embodiment.
Figure 56B:
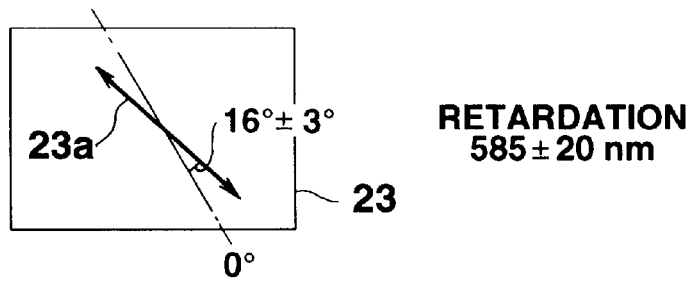
Figure 56C:
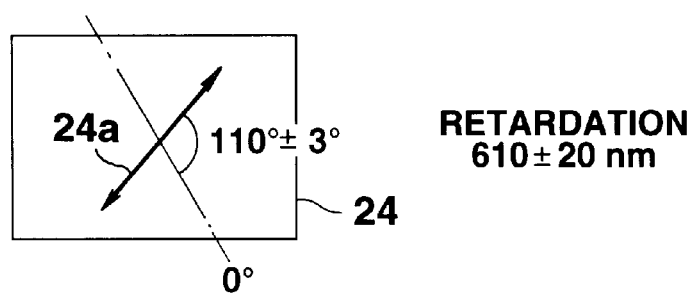
Figure 56D:
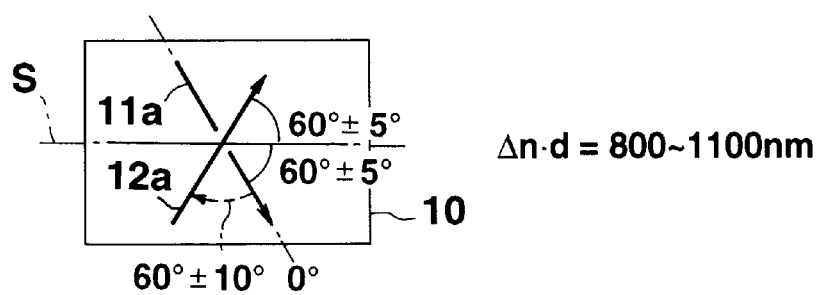
Figure 56E:
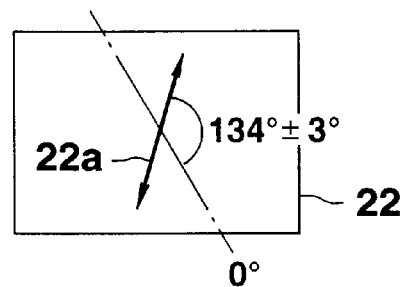

FIG. 55 is an a*-b* chromaticity diagram showing a change in display color according to this embodiment.

As illustrated, the display color of the color LCD device according to this embodiment changes from red (R) to green (G), to blue (B), to black, then to white in order as the voltage applied between the electrodes 15 and 17 increases. Those display colors are clear and have high color purities.

Further, the outgoing ratio R(min) in the black display state of the color LCD device of this embodiment, the outgoing ratio R(5V) in the white display state when the applied voltage is 5 V and the outgoing ratio R(7V) when the applied voltage is 7 V are as follows.

R(min)=2.92%

R(5V)=24.21%

R(7V)=29.85%

The display contrast CR between black and white for the color LCD device of this embodiment is as follows:

CR(5V)=8.29
CR(7V)=10.22
where CR(5V) is the contrast when the applied voltage in the white display state is 5 V and CR(7V) is the contrast when the applied voltage in the white display state is 7 V. It is apparent that a sufficiently high contrast is acquired not only when the applied voltage for displaying white is 7 V but also when the applied voltage for displaying white is 5 V.

As discussed above, this embodiment can provide an ECB type LCD device which can display clear white, black and three primary colors of red, green and blue with high contrasts and high color purities, thus ensuring colorful multi-color display.

Ninth Embodiment

The structure of an LCD device according to this embodiment is the same as that of the LCD device shown in FIG. 40.

In this embodiment, the retardation value $\Delta$nd of the LC cell 10 (the product of the refractive anisotropy $\Delta$n of the liquid crystal 13 and the layer thickness d of the liquid crystal 13) is set to 800 to 1100 nm.

The retardation value of the first retardation plate 23 is 585±20 nm and the retardation value of the second retardation plate 24 is 610±20 nm.

FIGS. 56A to 56E are diagrams used to explain the alignment state of the molecules of the liquid crystal 13 in the LC cell 10, the directions of the transmission axes of polarization plates 21 and 22 and the direction of the phase-delay axes of the retardation plates 23 and 24 according to this embodiment.

As illustrated, the aligning direction 11a of the molecules of the liquid crystal 13 near the transparent substrate 11 (the direction of the aligning treatment on the aligning film 18) is shifted clockwise by 60°±5° with respect to the horizontal axis S of the LC cell 10 and the aligning direction 12a of the molecules of the liquid crystal 13 near the transparent substrate 12 (the direction of the aligning treatment on the aligning film 18) is shifted counterclockwise by 60°±5° with respect to the horizontal axis S. The molecules of the liquid crystal 13 are twisted clockwise at a twist angle of 60°±10° toward the transparent substrate 12 from the transparent substrate 11, as indicated by the broken line arrow in the diagram.

Given that the aligning direction 11a of the LC molecules is set to the direction of 0°, the transmission axis 21a of the polarization plate 21 is directed the direction of 153°±3° with respect to the opposite direction to the twisted direction of the molecules of the liquid crystal 13 and the transmission axis 22a of the polarization plate 22 is in the direction of 134°±3° with respect to the opposite direction to the twisted direction of the molecules of the liquid crystal 13.

The direction of the phase-delay axis 23a of the retardation plate 23 is in the direction of 16°±3° with respect to the opposite direction to the twisted direction of the molecules of the liquid crystal 13. The direction of the phase-delay axis 24a of the retardation plate 24 is in the direction of 110°±3° with respect to the opposite direction to the twisted direction of the molecules of the liquid crystal 13.

The color LCD device according to this embodiment, like that of the modification of the third embodiment, colors light using the birefringence effects of the retardation plate 23 and the LC cell 10 and the polarization effects of the polarization plates 21 and 22.

Figure 57:
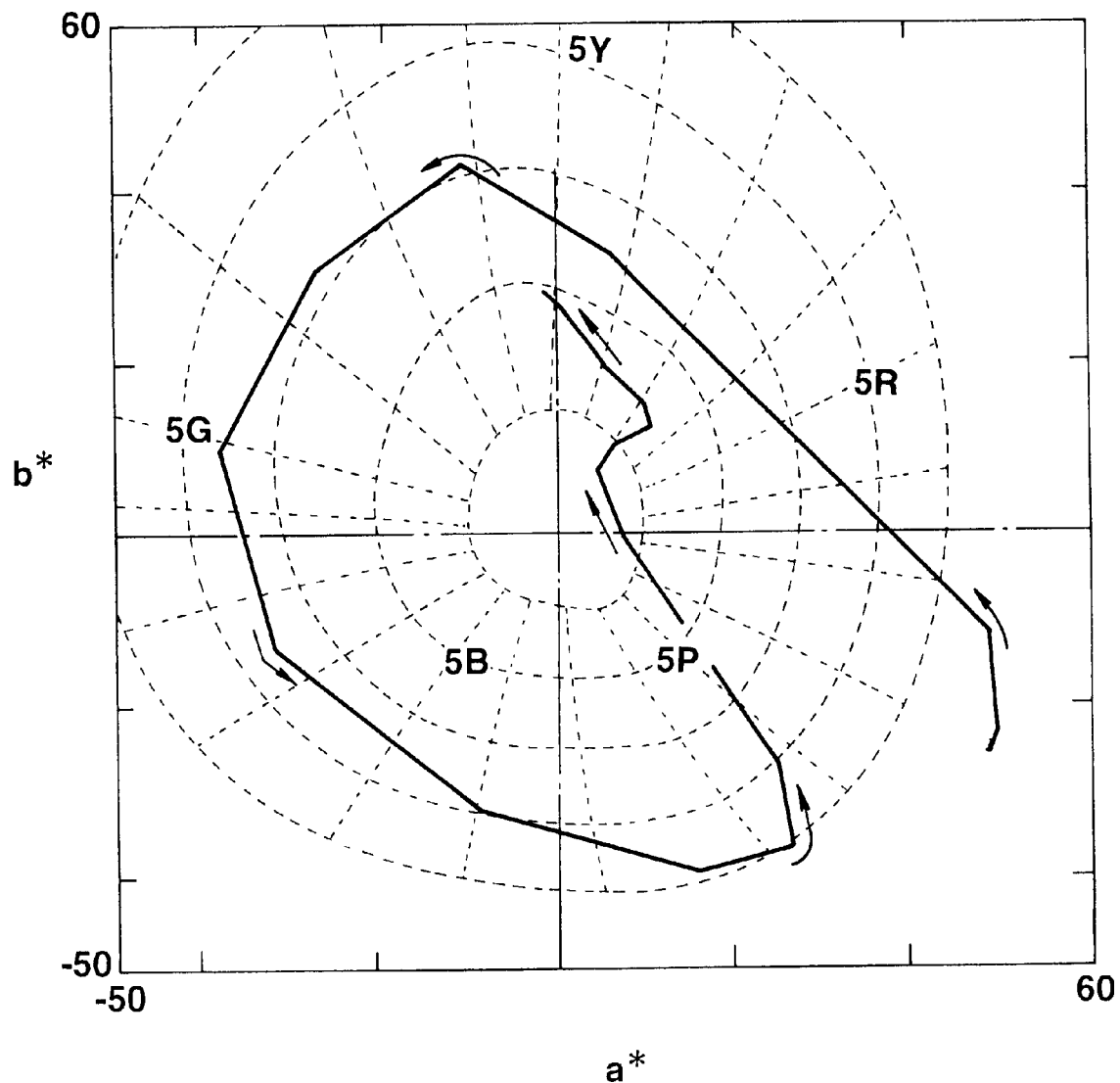
FIG. 57 is an a*-b* chromaticity diagram showing a change in display color according to the ninth embodiment.

FIG. 57 is an a*-b* chromaticity diagram showing a change in display color according to this embodiment.

As illustrated, the display color of the color LCD device according to this embodiment changes from red (R) to green (G), to blue (B), to black, then to white in order as the voltage applied between the electrodes 15 and 17 increases. Those display colors are clear and have high color purities.

Further, the outgoing ratio R(min) in the black display state of the color LCD device of this embodiment, the outgoing ratio R(5V) in the white display state when the applied voltage is 5 V and the outgoing ratio R(7V) when the applied voltage is 7 V are as follows.

R(min)=2.97%
R(5V)=21.77%
R(7V)=24.60%

The display contrast CR between black and white for the color LCD device of this embodiment is as follows:

CR(5V)=7.33
CR(7V)=8.28 where CR(5V) is the contrast when the applied voltage in the white display state is 5 V and CR(7V) is the contrast when the applied voltage in the white display state is 7 V. It is apparent that a sufficiently high contrast is acquired not only when the applied voltage for displaying white is 7 V but also when the applied voltage for displaying white is 5 V.

As discussed above, this embodiment can provide an ECB type LCD device which can display clear white, black and three primary colors of red, green and blue with high contrasts and high color purities, thus ensuring colorful multi-color display.

Tenth Embodiment

Figure 58:
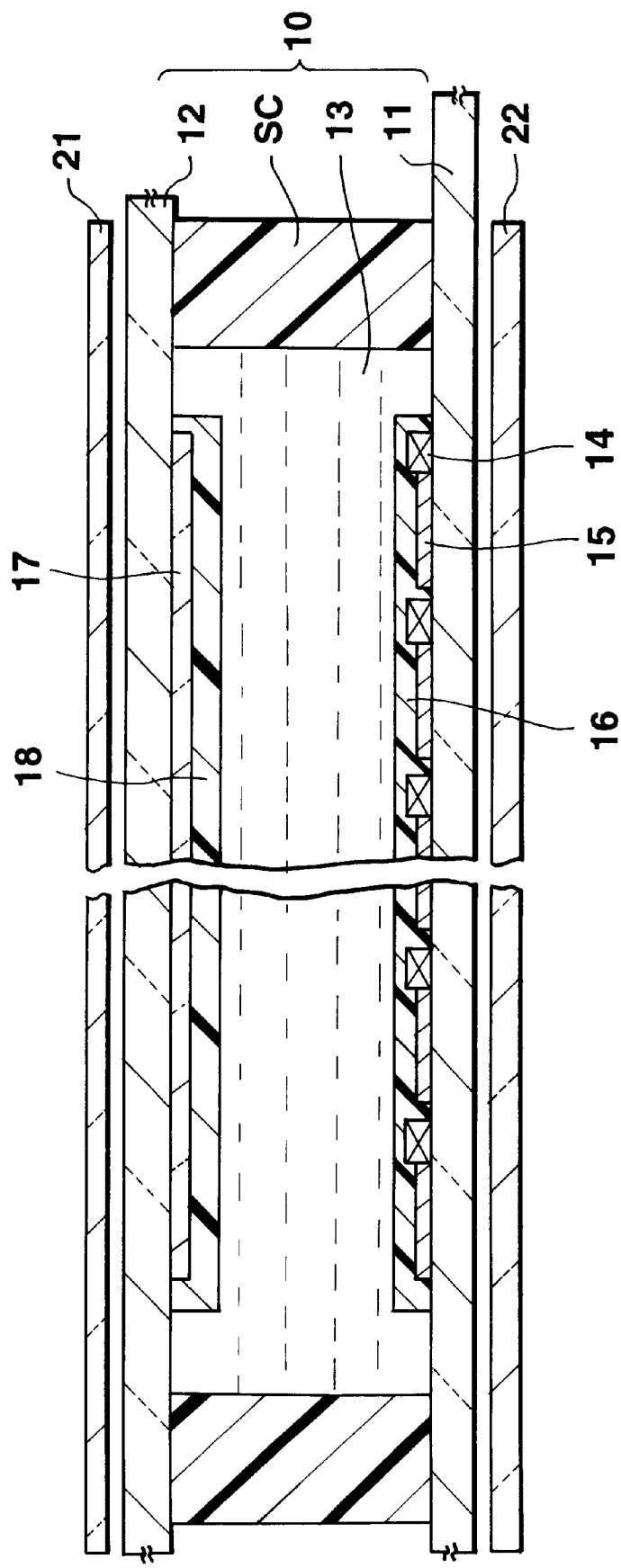
FIG. 58 is a cross-sectional view illustrating the structure of an ECB type color LCD device according to the tenth embodiment of this invention.

FIG. 58 is a cross-sectional view illustrating the structure of an ECB type LCD device according to the tenth embodiment of this invention.

The illustrated LCD device has substantially the same structure as the LCD device in FIG. 1, but is of a transparent type which displays images using light from a back light (not shown) located at the back of the polarization plate 22.

Figure 59A:
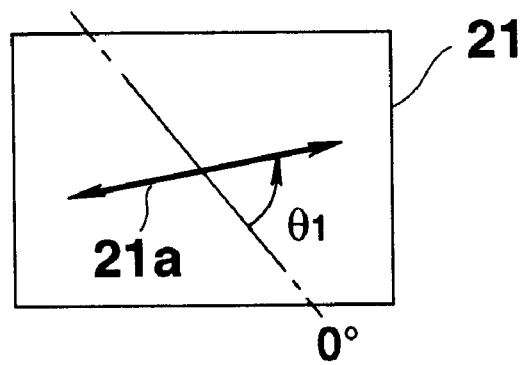
FIGS. 59A to 59C are diagrams illustrating the alignment state of the LC molecules, the directions of the transmission axes of polarization plates and the direction of a transmission axis of a retardation plate of the LCD device in FIG. 58.
Figure 59B:
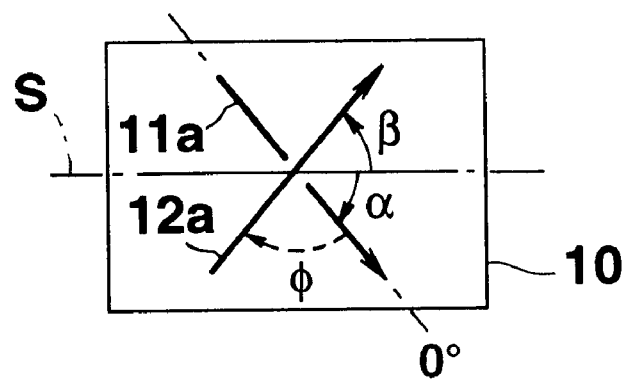
Figure 59C:
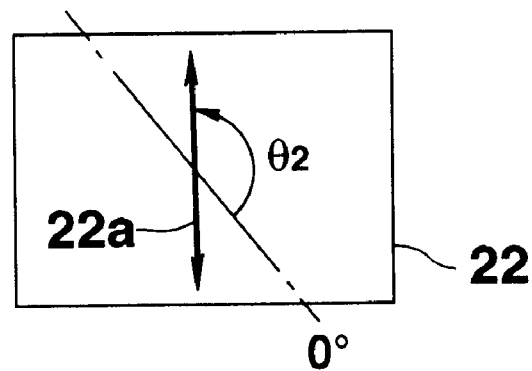

FIGS. 59A to 59C is a diagram used to explain the alignment state of the molecules of the liquid crystal 13 in the LC cell 10, and the directions of the transmission axes of polarization plates 21 and 22 according to this embodiment.

As illustrated, the aligning direction 11a of the molecules of the liquid crystal 13 near the transparent substrate 11 (the direction of the aligning treatment on the aligning film 18) is shifted clockwise by $\alpha$° with respect to the horizontal axis S of the LC cell 10 and the aligning direction 12a of the molecules of the liquid crystal 13 near the transparent substrate 12 (the direction of the aligning treatment on the aligning film 18) is shifted counterclockwise by $\beta$° with respect to the horizontal axis S. The molecules of the liquid crystal 13 are twisted clockwise at a twist angle of $\theta$° toward the transparent substrate 12 from the transparent substrate 11, as indicated by the broken line arrow in the diagram.

The deviation angles $\alpha$ and $\beta$ in the aligning directions of the LC molecules in the vicinity of the transparent substrates 11 and 12 with respect to the horizontal scale S are $\alpha$=60°±2.5° to 45°±0.5°
$\beta$=60°±2.5° to 45°±0.5°.

The twist angle $\phi$ of the molecules of the liquid crystal 13 is $\phi$=60°±5° to 90°±5°.

The value of the retardation $\Delta$nd of the LC cell 10 is 800 to 1100 nm.

Given that the aligning direction 11a of the LC molecules is set to the direction of 0°, the transmission axis 21a of the polarization plate 21 is directed the direction of θ1° with respect to the opposite direction to the twisted direction of the molecules of the liquid crystal 13 and the transmission axis 22a of the polarization plate 22 is in the direction of θ2° with respect to the opposite direction to the twisted direction of the molecules of the liquid crystal 13.

The deviation angles θ1 and θ2 of the transmission axes 21a and 22a of the polarization plates 21 and 22 are as follows.

θ1=51°±3° to 70°±3°

θ2=135°±3° to 150°±3°.

According to the color LCD device of this embodiment, the light from the back light passes through the polarization plate 22 to become linearly polarized light whose polarization direction is in the direction of the transmission axis 22a. As this linearly polarized light passes the LC cell 10, it becomes elliptically polarized light whose polarization state differs wavelength by wavelength. Only the components of this elliptically polarized light which are set in the direction of the transmission axis 21a wavelength by wavelength pass the polarization plate 21. Consequently, the light becomes colored in accordance with the light intensity of each wavelength component.

When a voltage is applied between the electrodes 15 and 17 of the LC cell 10, the molecules of the liquid crystal 13 are aligned upright while keeping the twisted state. As the upright angle of the molecules of the liquid crystal 13 increases, the birefringence effect by the layer of the liquid crystal 13 decreases. When the birefringence effect by the layer of the liquid crystal 13 changes, the polarization state of the light which has passed the LC cell 10 to be incident to the polarization plate 21 changes. Consequently, the colored state of the light which has passed the polarization plate 21 changes and that light goes out from the surface of the LCD device.

The display color of the LCD device can be altered in accordance with the voltage to be applied between the electrodes 15 and 17 in this manner.

This embodiment will now be discussed with reference to specifically structured color LCD devices.

Display device I
 φ=60°±5°
 Δnd=970±20 nm
 θ1=60°±3°
 θ2=140°±3°.
Display device II
 φ=60°±5°
 Δnd=970±20 nm
 θ1=60°±3°
 θ2=150°±3°.
Display device III
 φ=60°±5°
 Δnd=970±20 nm
 θ1=70°±3°
 θ2=140°±3°.
Display device IV
 φ=60°±5°
 Δnd=970±20 nm
 θ1=70°±3°
 θ2=150°±3°.
Display device V
 φ=75°±5°
 Δnd=950±20 nm
 θ1=62.5°±3°
 θ2=142.5°±3°.
Display device VI
 φ=75°±5°
 Δnd=1000±20 nm
 θ1=62.5°±3°
 θ2=142.5±3°.
Display device VII
 φ=90°±5°
 Δnd=920±20 nm
 θ1=51°±3°
 θ2=135°±3°.
Display device VIII
 φ=90°±5°
 Δnd=960±20 nm
 θ1=51°±3°
 θ2=135°±3°.

Figure 60:
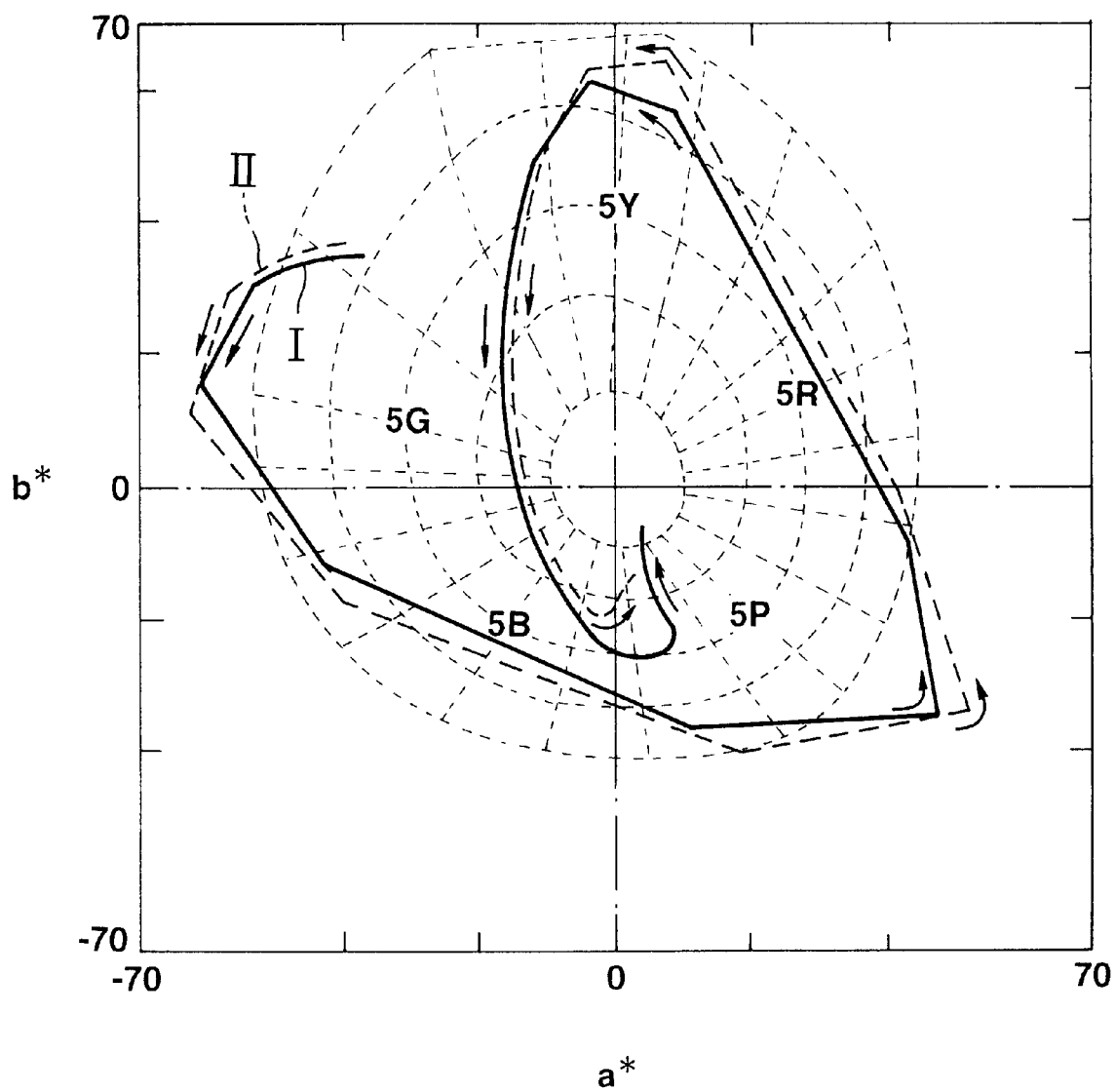
FIG. 60 is an a*-b* chromaticity diagram showing changes in display colors for an LCD device I and an LCD device II according to the tenth embodiment.
Figure 61:
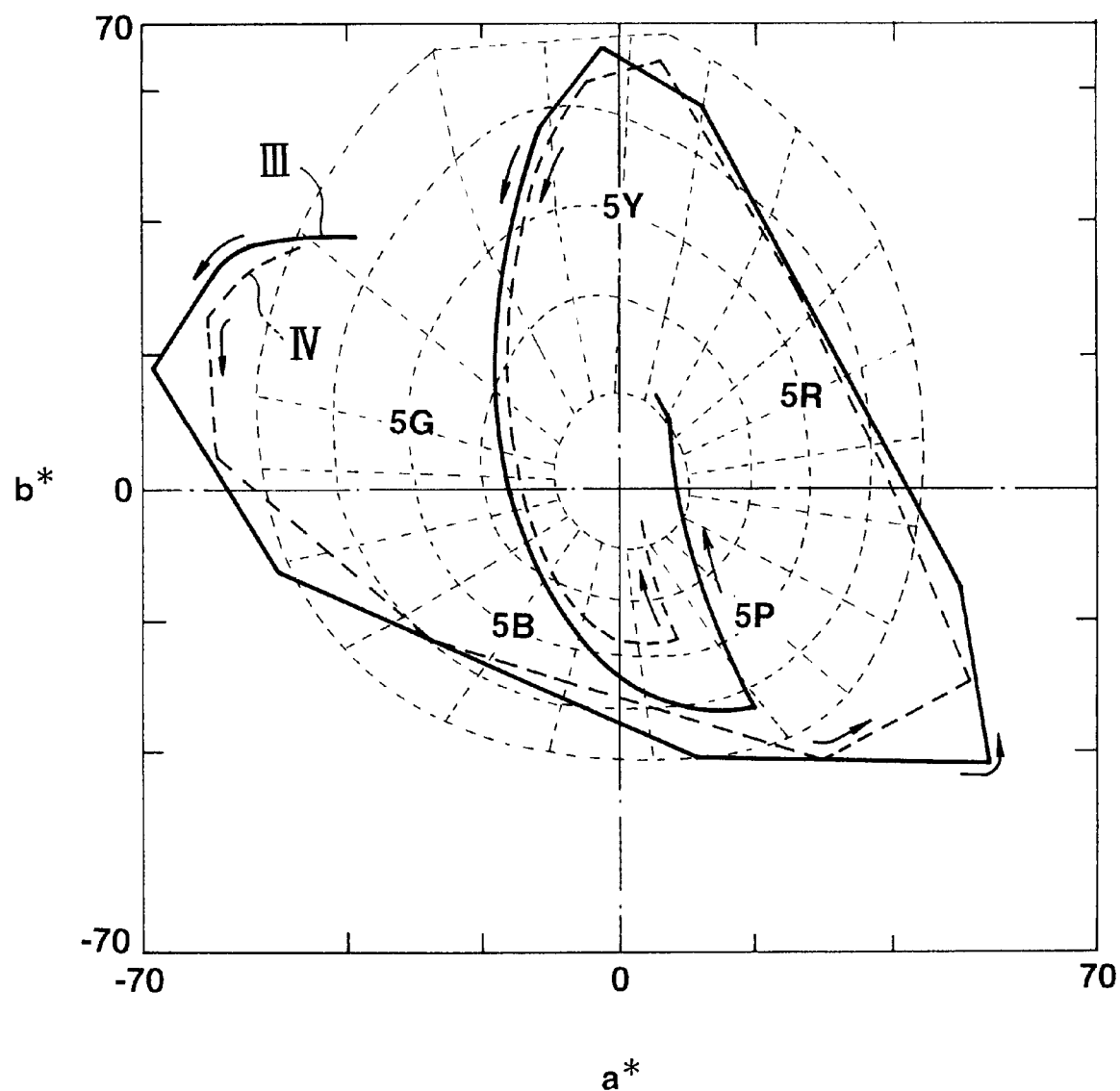
FIG. 61 is an a*-b* chromaticity diagram showing changes in display colors for an LCD device III and an LCD device IV according to the tenth embodiment.
Figure 62:
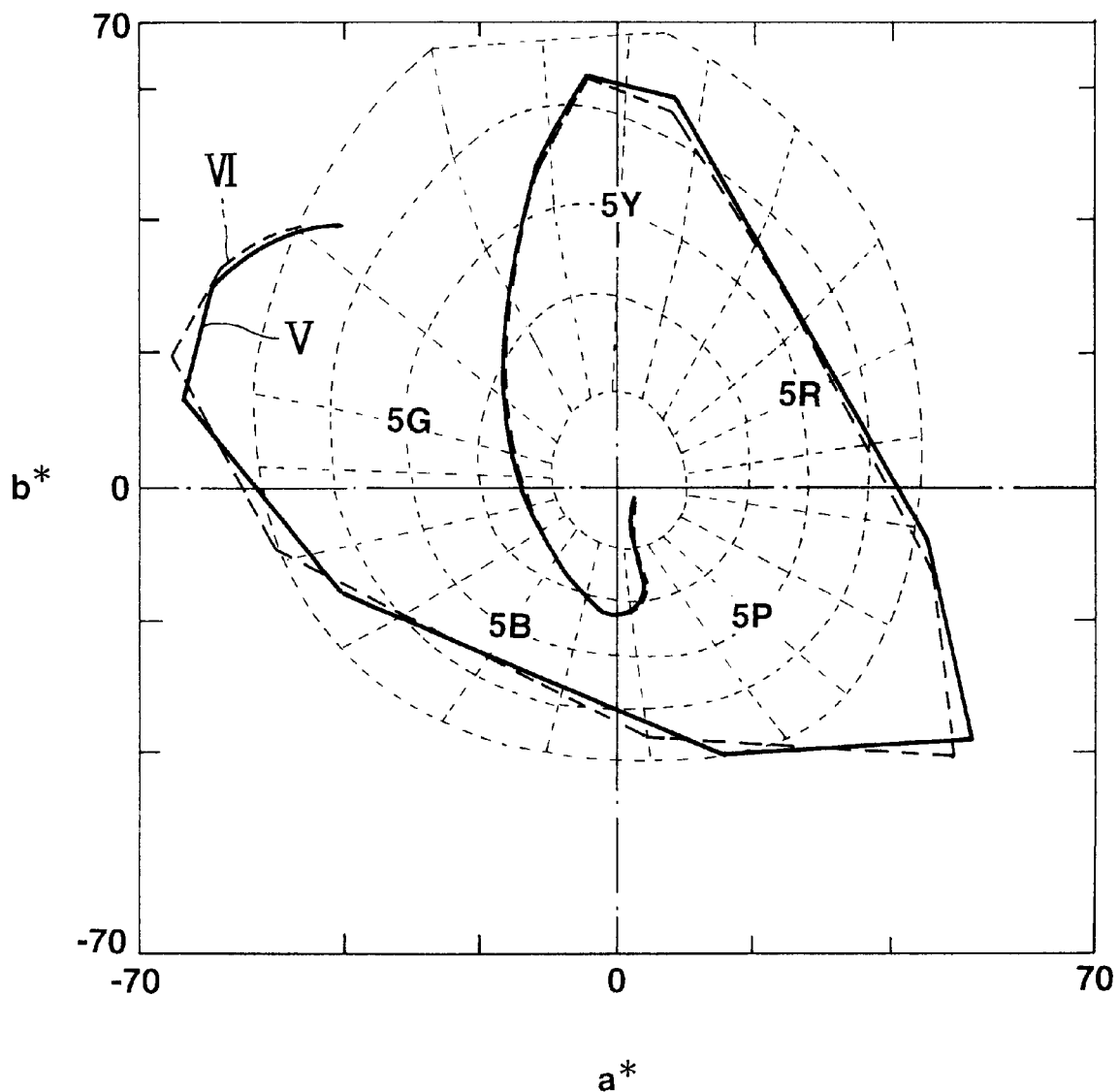
FIG. 62 is an a*-b* chromaticity diagram showing changes in display colors for an LCD device V and an LCD device VI according to the tenth embodiment.
Figure 63:
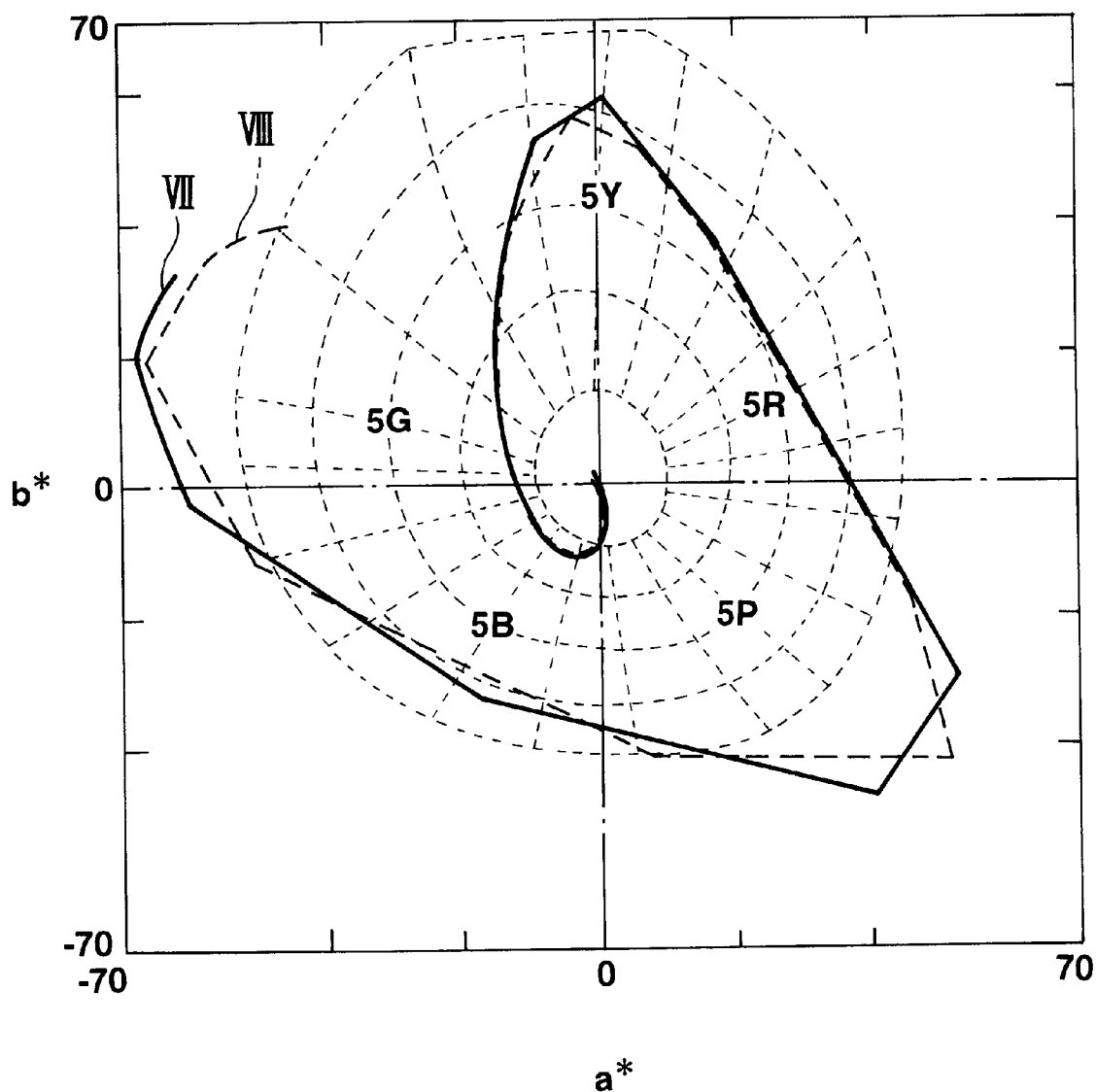
FIG. 63 is an a*-b* chromaticity diagram showing changes in display colors for an LCD device VII and an LCD device VIII according to the tenth embodiment.

FIGS. 60 through 63 are a*-b* chromaticity diagrams showing changes in display colors according to the display devices I to VIII. (FIG. 60 is associated with the display devices I and II, FIG. 61 is associated with the display devices III and IV, FIG. 62 is associated with the display devices V and VI, and FIG. 63 is associated with the display devices VII and VIII.)

As illustrated, the display color with no voltage applied between the electrodes 15 and 17 of each display device is slightly yellowish green. As the voltage applied between the electrodes 15 and 17 increases, the display color changes from red (R) to green (G), to blue (B), to white (W), then to black in order. Those red, green, blue, white and black colors are clear and have high color purities.

The outgoing ratios R(min) in the black display state of the display devices I through VIII, the outgoing ratios R(max) in the white display state and the contrasts CR(R (max)/R(min)) become as follows.

Display device I
 R(min)=0.26%
 R(max)=30.8%
 CR=about 119
Display device II
 R(min)=0.33%
 R(max)=32.9%
 CR=about 100
Display device III
 R(min)=0.21%
 R(max)=27.2%
 CR=about 129
Display device IV
 R(min)=0.14%
 R(max)=30.3%
 CR=about 216
Display device V
 R(min)=0.12%
 R(max)=21.4%
 CR=about 178
Display device VI
 R(min)=0.11%
 R(max)=21.5%
 CR=about 195

Display device VII
  R(min)=0.07%
  R(max)=13.3%
  CR=about 190
Display device VIII
  R(min)=0.06%
  R(max)=14.3%
  CR=about 238

According to this color LCD device, as described above, when the incident light is white light, it is possible to display at least the three primary colors of red, green and blue, and achromatic colors of white and black. In other words, as the voltage applied between the electrodes 15 and 17 increases, the display color changes from red (R) to green (G), to blue (B), to white (W), then to black in order.

The display contrast of this color LCD device or the ratio of the outgoing ratio of light in the white display to the ratio of the outgoing ratio of light in the black display is greater than about 100. Particularly, the display device IV has a very high contrast of CR=about 216. Although the display devices VII and VIII have low light outgoing ratios in the white display state, they show very high contrasts and display clearer black due to a small outgoing ratio in the black display state.

Such display color and contrast are acquired when the following conditions are met:

$$\phi=60°\pm5° \text{ to } 90°\pm5°$$

$$\Delta nd=800 \text{ to } 1100 \text{ nm}$$

$$\theta1=51°\pm3° \text{ to } 70°\pm3°$$

$$\theta2=135°\pm3° \text{ to } 150°\pm3°.$$

When the conditions come off the ranges, the display quality becomes poorer in the order of the contrast and then the display color as the degree of the deviation increases.

Eleventh Embodiment

Figure 64:
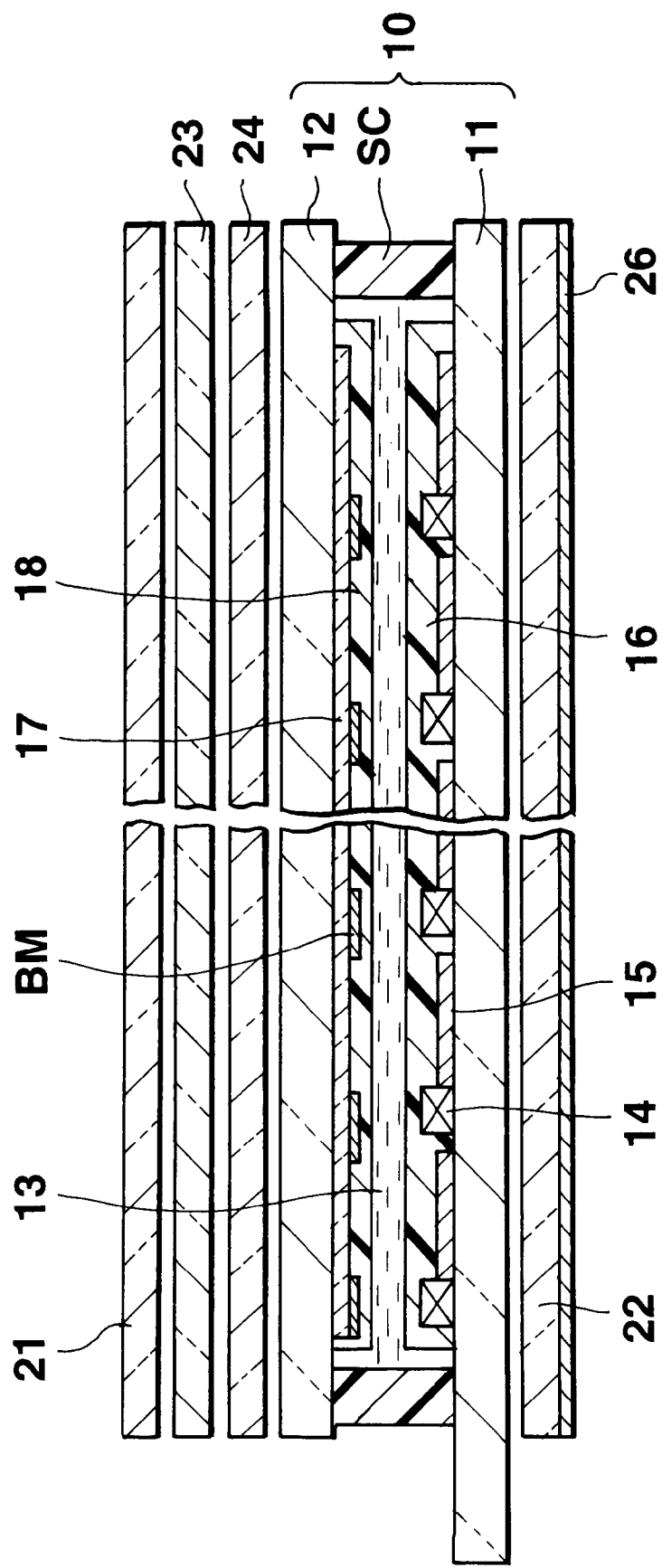
FIG. 64 is a cross-sectional view illustrating the structure of an ECB type color LCD device according to the eleventh embodiment of this invention.

FIG. 64 is a cross-sectional view illustrating the structure of an ECB type color LCD device according to the eleventh embodiment of this invention.

The structure of the illustrated LCD device is substantially the same as that of the LCD device in FIG. 40, with a difference lying in that a black mask BM for preventing the leakage of light in non-display areas is provided on the surfaces of the opposing electrodes 17 which face the associated TFTs 14.

Figure 65:
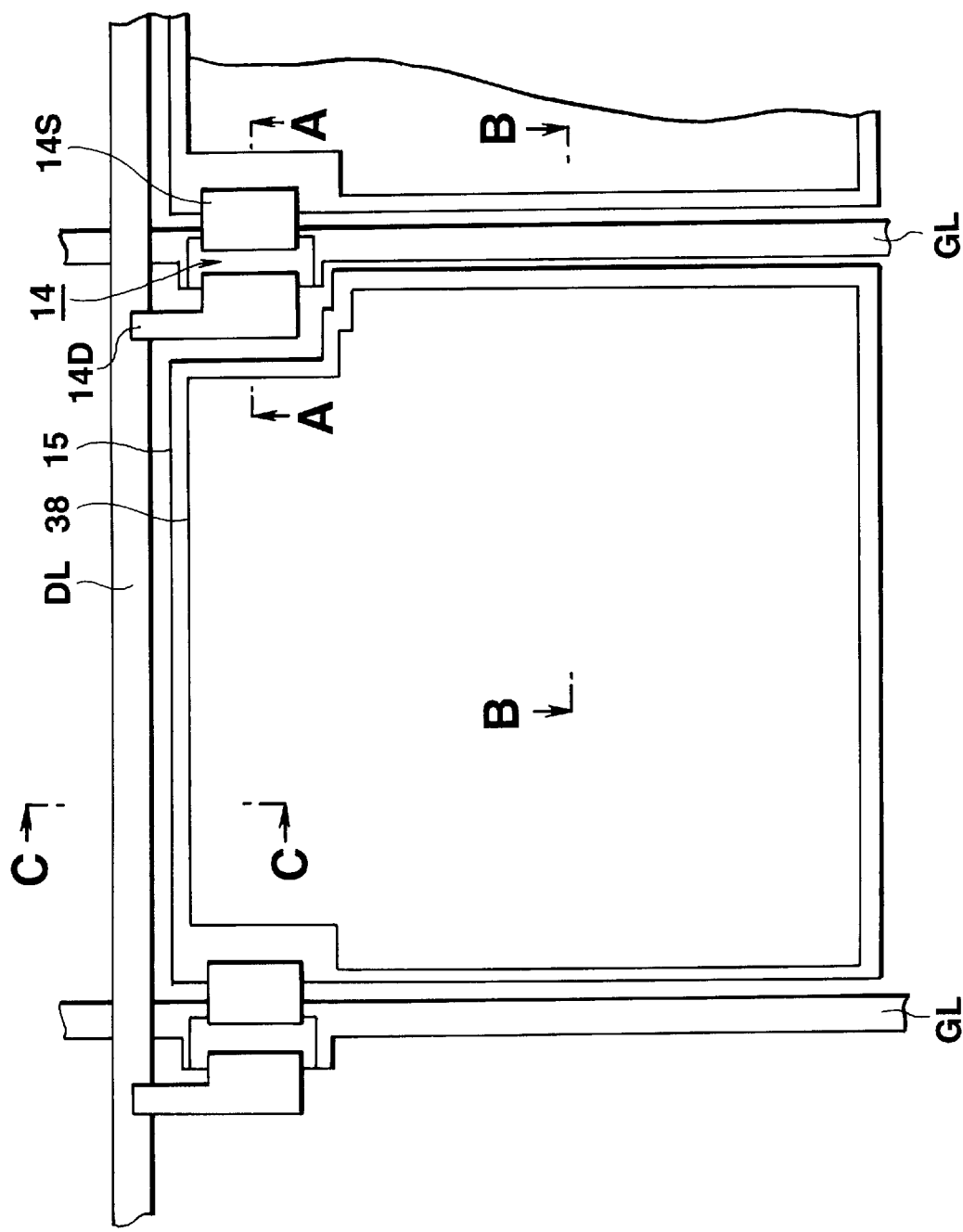
FIG. 65 is an enlarged plan view showing the structure of the ECB type color LCD device in FIG. 64 on the TFT substrate side.
Figure 66:
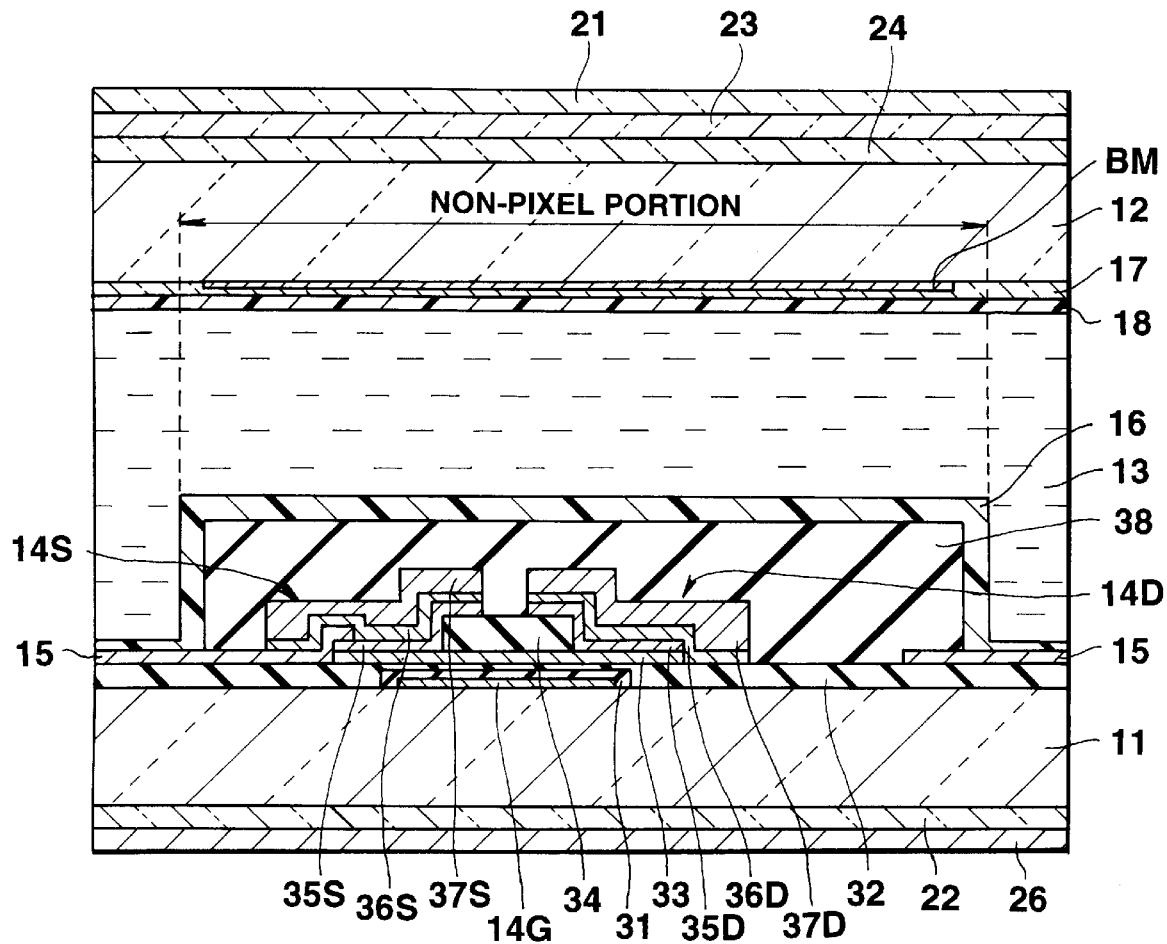
FIG. 66 is a cross-sectional view along the line A—A in FIG. 65.
Figure 67:
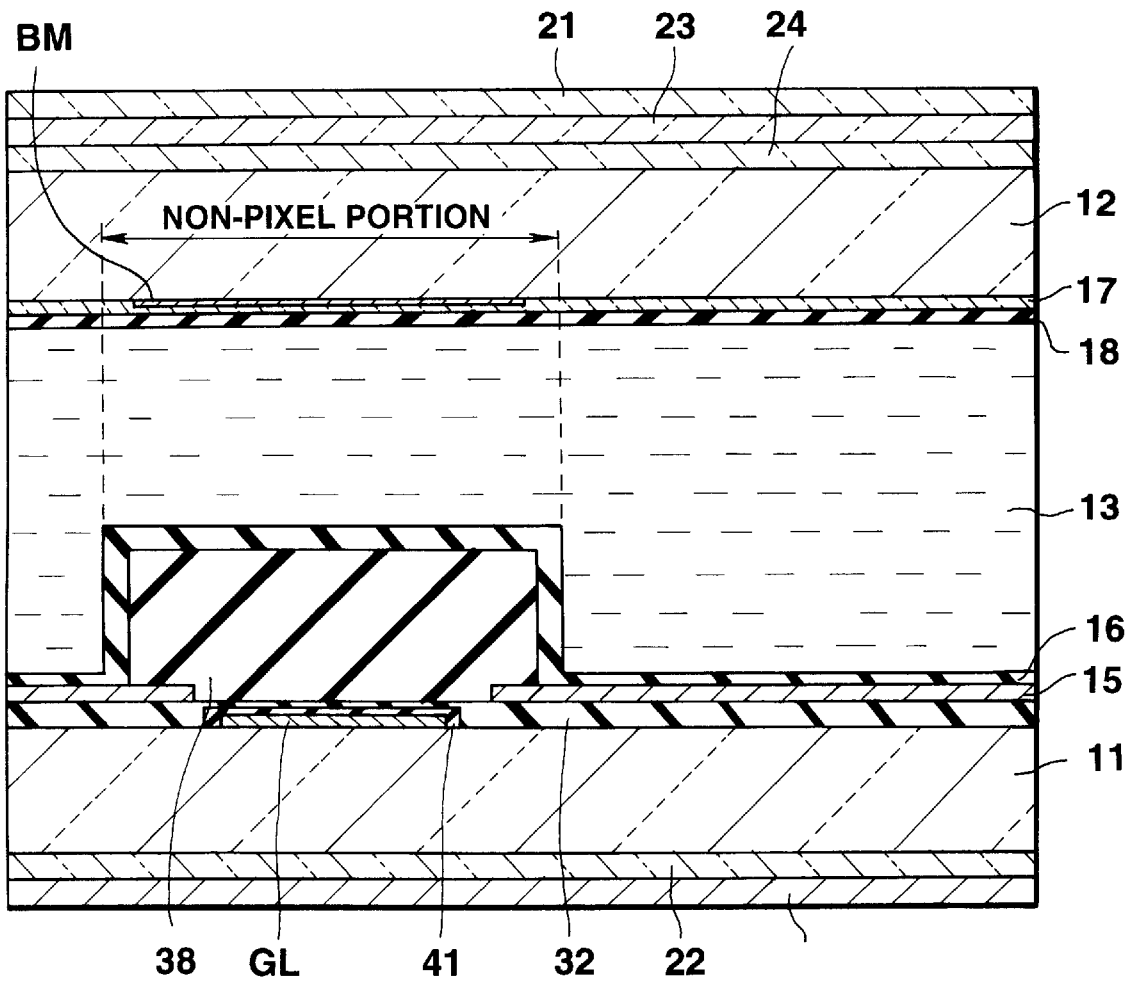
FIG. 67 is a cross-sectional view along the line B—B in FIG. 65.
Figure 68:
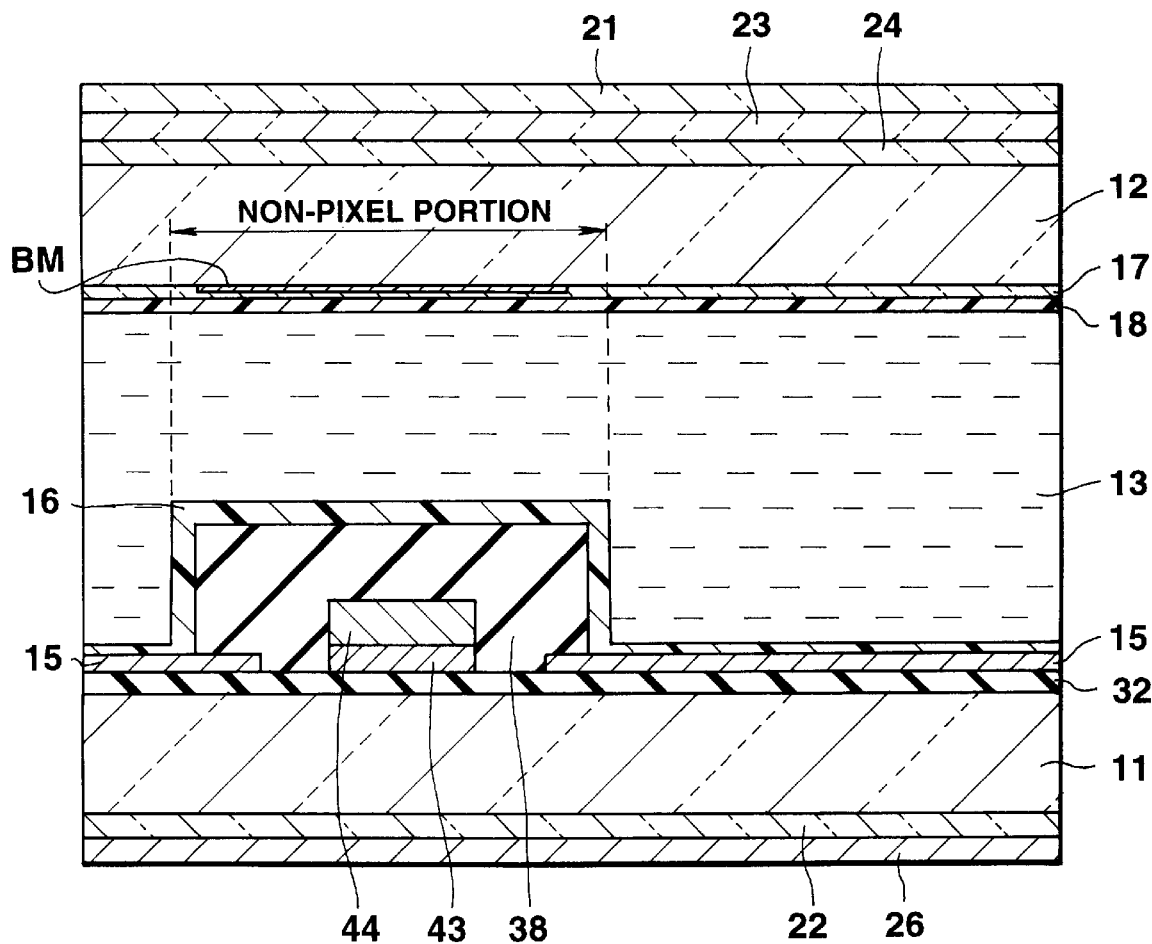
FIG. 68 is a cross-sectional view along the line C—C in FIG. 65.

FIG. 65 shows in enlargement the planar structure of the TFT substrate 11 for one pixel, and FIGS. 66 through 68 respectively show the cross sections of the structure along the lines A—A, B—B and C—C.

As shown in FIG. 66, each TFT 14 comprises a gate electrode 14G formed on the TFT substrate 11, a gate oxide film 31 formed by anodic oxidization of the surface of the gate electrode 14G, an insulating film 32 of SiN or the like, an intrinsic semiconductor layer 33, a blocking layer 34 formed on the intrinsic semiconductor layer 33 to protect the channel region, n type semiconductor layers 35S and 35D connected to the intrinsic semiconductor layer 33, chrome layers 36S and 36D located on the n type semiconductor layers, and aluminum titanium (AlTi) layers 37S and 37D respectively formed on the chrome layers 36S and 36D.

The pixel electrodes 15 are formed on the insulating film 32 to be connected to the source electrodes 14S (n type semiconductor layer 35S and chrome layer 36S) of the associated TFTs 14.

An overcoat layer (protection layer) 38 of SiN or the like is formed on the end portions of the TFTs 34 and the pixel electrodes 15.

The gate lines GL are formed of an aluminum titanium film or the like on the TFT substrate 11 as shown in enlargement in FIG. 67. The surfaces of the gate lines GL are subjected to anodic oxidization to form an insulating layer 41. The aforementioned insulating film 32 which serves as the gate insulating films of the TFTs 14 are formed on the gate lines GL.

Formed on the gate lines GL are an overcoat layer 38, which extends in a stripe pattern to protect the gate lines GL.

The data lines DL have a laminated layer structure of a chrome film 43 and an aluminum titanium film 44, formed on the insulating film 32 which is formed on the entire surface of the TFT substrate 11, as shown in enlargement in FIG. 68. The drain electrodes 14D of the TFTs 14 are connected to the data lines DL.

Formed on the data lines DL are the overcoat layer 38, which extends in a stripe pattern to protect the data lines DL.

Figure 69A:
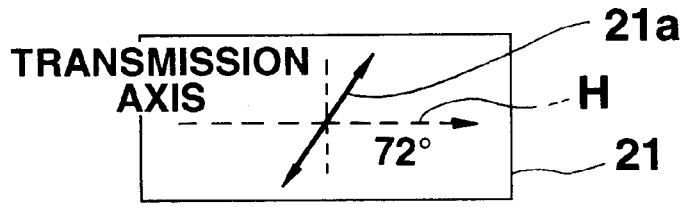
FIG. 69A is a diagram showing the direction of the transmission axis of an upper polarization plate of the ECB type color LCD device in FIG. 64.

The aligning film 18 is located on the entire surfaces of the pixel electrodes 15 and the overcoat layer 38. The surface of the aligning film 18 is subjected to an aligning treatment like rubbing in the lower right direction 11a of 45° as shown in FIG. 69D.

The common electrodes 17 facing the associated pixel electrodes 15 are located on the upper transparent substrate (opposing substrate) 12.

A black mask BM is formed on the non-display areas of the common electrodes 17 which are associated the spaces between the pixel electrodes 15, as shown in FIGS. 66, 67 and 68. The overcoat layer 38 is formed on the non-display areas, so that the layer thickness of the liquid crystal 13 in those areas is thinner than that in the other portion, resulting in different coloring than the coloring of the other portion even when the same voltage is applied. The gate signal (the voltage of the gate lines GL) and the data signal (the voltage of the data lines DL), not the display voltage, are applied to the non-display areas, so that an image different from what is intended is displayed there.

The black mask BM is therefore provided to prevent the coloring at those non-display areas from appearing at the display surface.

It is to be noted that the black mask BM is formed narrower than the width (size) of the overcoat layer 38 as shown in FIGS. 66, 67 and 68.

The aligning film 18 is located on the entire surfaces of the common electrodes 17 and the black mask BM. The aligning film 18 is subjected to an aligning treatment like rubbing in the direction 12a as shown in FIG. 69D (the direction of 90° counterclockwise with respect to the direction 11a of the aligning treatment of the aligning film 18).

The liquid crystal 13 is a nematic liquid crystal added with a chiral substance. The molecules of the liquid crystal 13 are twisted 90° toward the opposing substrate 12 from the TFT substrate 11 as shown in FIG. 69D in accordance with the aligning treatments subjected to the aligning films 16 and 18.

Figure 69B:
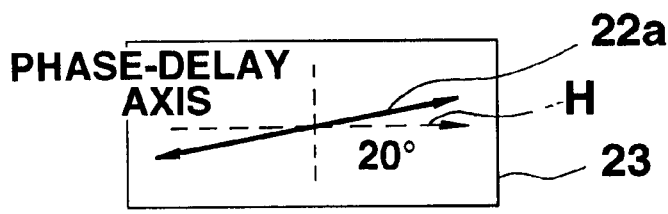
FIG. 69B is a diagram showing the direction of the drawing axis of an upper retardation plate of the ECB type color LCD device in FIG. 64.
Figure 69C:
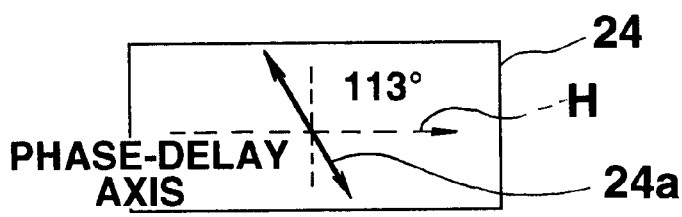
FIG. 69C is a diagram showing the direction of the drawing axis of a lower retardation plate of the ECB type color LCD device in FIG. 64.
Figure 69D:
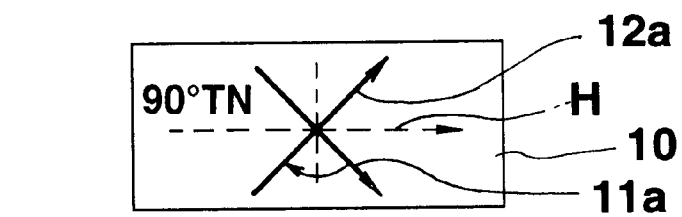
FIG. 69D is a diagram showing the direction of an aligning treatment on an aligning film of the ECB type color LCD device in FIG. 64.
Figure 69E:
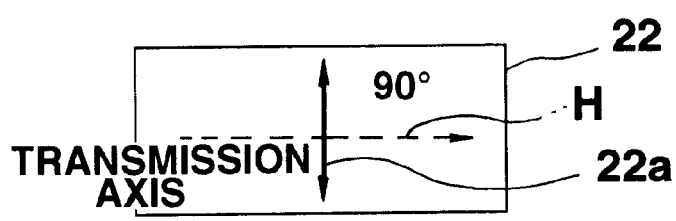
FIG. 69E is a diagram showing the direction of the transmission axis of a lower polarization plate of the ECB type color LCD device in FIG. 64.
Figure 69F:
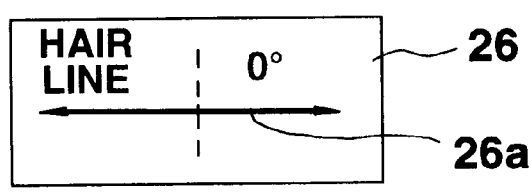
FIG. 69F is a diagram showing the direction of the hair line of a reflector of the ECB type color LCD device in FIG. 64.

The reflector 26 is subjected to the hair line treatment in the direction 26a shown in FIG. 69F.

As shown in FIG. 69B, the retardation plate 23 is positioned in such a manner that its axis (phase-delay axis) 23a which has the maximum refractive index on a plane intersects the horizontal direction H parallel to one side of the substrate by an angle of 20° counterclockwise. As shown in FIG. 69C, the retardation plate 24 is positioned in such a manner that its axis (phase-delay axis) 24a which has the maximum refractive index on a plane intersects the horizontal direction H by an angle of 20° counterclockwise.

The transmission axis 21a of the polarization plate 21 intersects the horizontal direction H by 90° counterclockwise, as shown in FIG. 69A. The transmission axis 22a of the polarization plate 22 intersects the horizontal direction H by 72°, as shown in FIG. 69E.

The color LCD device according to this embodiment, like the color LCD devices of the fourth and fifth embodiments, colors light using the birefringence effects of the retardation plates 23 and 24 and the LC cell 10 and the polarization effects of the polarization plates 21 and 22.

Figure 70:
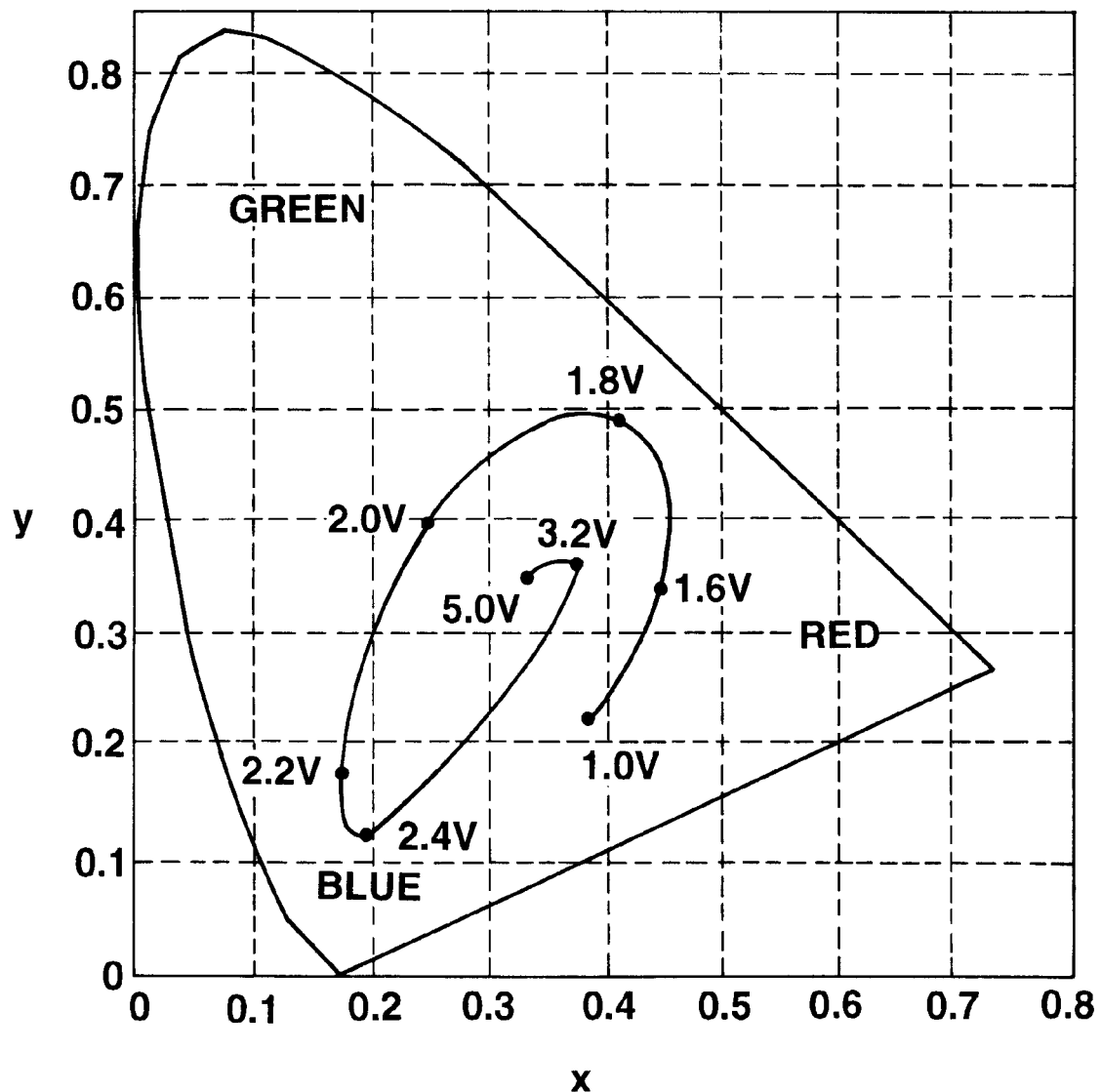
FIG. 70 is a CIE chromaticity diagram of the display colors of the ECB type color LCD device shown in FIGS. 64 to 69F.

FIG. 70 presents a CIE chromaticity diagram for the thus constituted color LCD device in the case where the retardations of the retardation plates 23 and 24 are set to 590 nm, and Δnd (the product of the refractive anisotropy Δn and the layer thickness d) of the layer of the liquid crystal 13 is set to 0.99.

The portions where the pixel electrodes 15 face the common electrodes 17 display colors with high purities according to the applied voltage as shown in FIG. 70.

But, the layer of the liquid crystal 13 at the portions between the pixel electrodes where the overcoat layer 38 is formed is thinner than that at the other portion. The non-display areas therefore show optical characteristics different from those of the pixel areas (display areas) and show different coloring than the other areas even when the same voltage is applied. Further, as the gate signal and data signal or the like are applied to the non-display areas, those areas provide colors different from the intended colors.

If such coloring of the non-display areas directly appears outside, the color LCD device suffers a reduction in the purities of the display colors and a reduction in contrast.

To prevent such an event, the black mask BM is provided in the above-described manner.

Since the size of the black mask BM is smaller than the size (width, area) of the non-display areas, the black mask BM does not cover the pixel portion (display portion) even if the TFT substrate 11 and the opposing substrate 12 are slightly misaligned at the time those substrates are adhered via the seal member SC. This can avoid a reduction in the area of the opening of the pixel portion, which would otherwise lessen the brightness.

A description will now be given of a method of manufacturing the color LCD device with the above-described structure.

First, an AlTi film is formed on the TFT substrate 11, and is patterned to form the gate electrodes 14G and gate lines GL. Then, the surfaces of the gate electrodes 14G and gate lines GL are subjected to anodic oxidization, thus forming the insulating films 31 and 41.

Subsequently, an SiN film is formed on the entire substrate surface by a CVD method or the like.

An intrinsic semiconductor such as amorphous Si (Silicon) is deposited by the CVD method or the like and is then patterned to form the intrinsic semiconductor layer 33. The block layer 34 of SiN or the like is formed on the area of the intrinsic semiconductor layer 33 where the channel region is to be formed. Then, amorphous Si or the like doped with an n type impurity is deposited by the CVD method or the like and is patterned into the shapes of the electrodes, forming the n type semiconductor layers 35S and 35D.

Next, ITO or the like is deposited on the entire surface of the resultant structure by sputtering and is then patterned to form the pixel electrodes 15. Subsequently, a chrome (Cr) layer and an aluminum titanium (AlTi) layer are sequentially deposited and are patterned to form the source electrodes 14S, the drain electrodes 14D and the data lines DL by using the same mask.

An insulating film of SiN or the like is formed on the entire substrate surface by the CVD method or the like and is patterned into shapes corresponding to the TFTs 14, the data lines DL and the gate lines GL, thus forming the overcoat layer 38.

Then, the aligning film 18 of polyimide is formed on the entire surface of the resultant structure and its surface is subjected to an aligning treatment of rubbing in the direction 16a. This completes the processing on the TFT substrate 11 side.

With regard to the opposing substrate 12, a Cr film is formed on the opposing substrate 12 by sputtering or the like and is then patterned into a smaller shape than the non-display areas, thus forming the black mask BM. Next, an ITO film is deposited on the entire surface of the opposing substrate 12 where the black mask BM is formed, and is then patterned to form the common electrodes 17. The black mask BM may also be formed by coating resin containing a black dye or the like on the substrate and patterning the resin.

Subsequently, the aligning film 18 is formed on the common electrodes 17 and is then subjected to an aligning treatment. This completes the processing on the opposing substrate 12 side.

An unhardened seal member SC is coated on one of the thus formed TFT substrate 11 and opposing substrate 12, and a spacer is then sprayed thereon. Subsequently, the other one of the TFT substrate 11 and the opposing substrate 12 is aligned with and adhered to the seal-member coated substrate. Even if slight misalignment occurs at this time, however, the black mask BM does not cover the display areas because the size of the black mask BM is smaller than the width and area of the non-display areas.

After the seal member SC is hardened, the liquid crystal is filled into the LC cell formed by both substrates 11 and 12 and the seal member SC using vacuum injection or the like, then the liquid crystal injection hole is sealed. Thereafter, the retardation plates 21 and 22, the polarization plates 23 and 24 and the reflector 26 are adhered, thus completing the color LCD device according to this embodiment.

The above-described process provides an ECB type color LCD device which has the proper aperture ratio even if there is a positional deviation between the substrates 11 and 12.

Twelfth Embodiment

Although the black mask BM is located on the opposing substrate 12 in the eleventh embodiment, it may be located on the TFT substrate 11.

Figure 71:
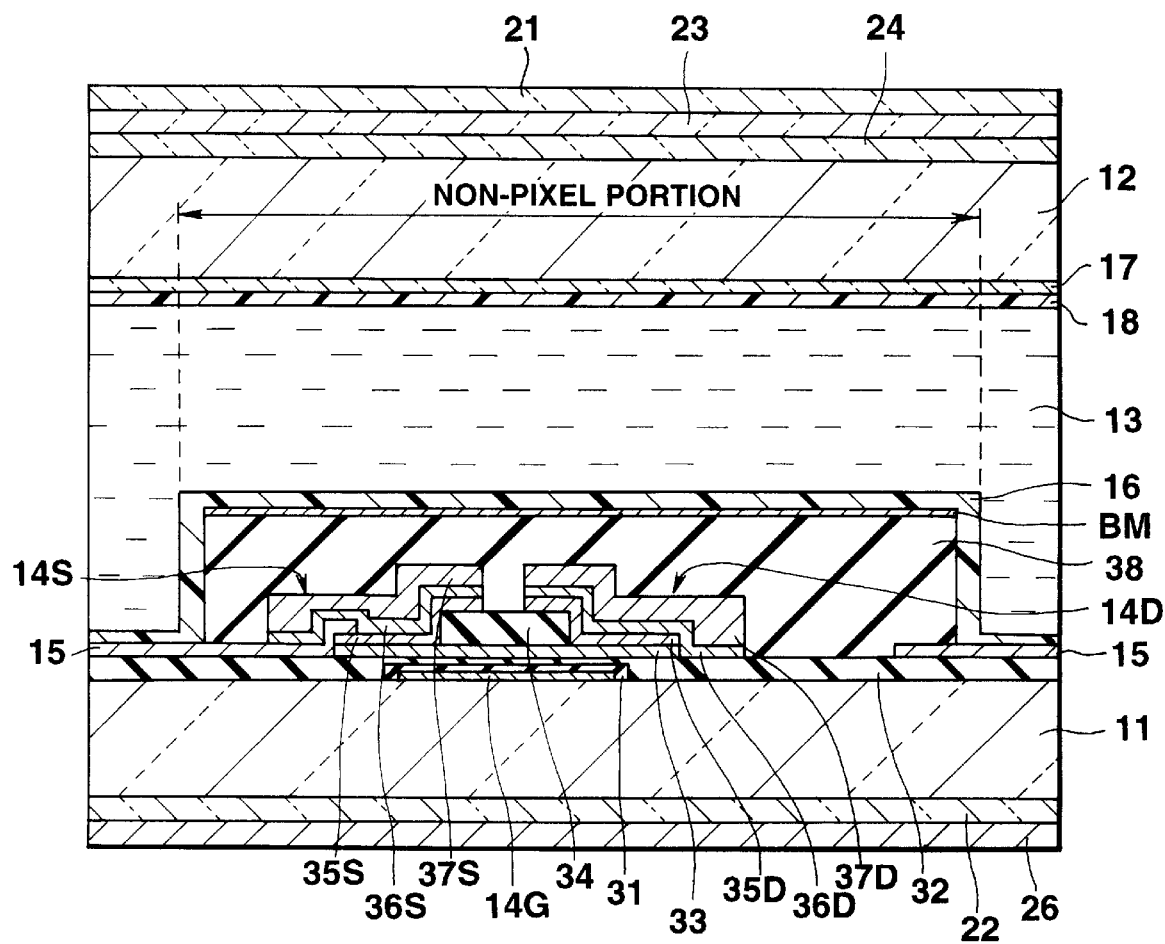
FIG. 71 is a cross-sectional view along the line A—A (FIG. 65) of an LCD device according to the twelfth embodiment of this invention.
Figure 72:
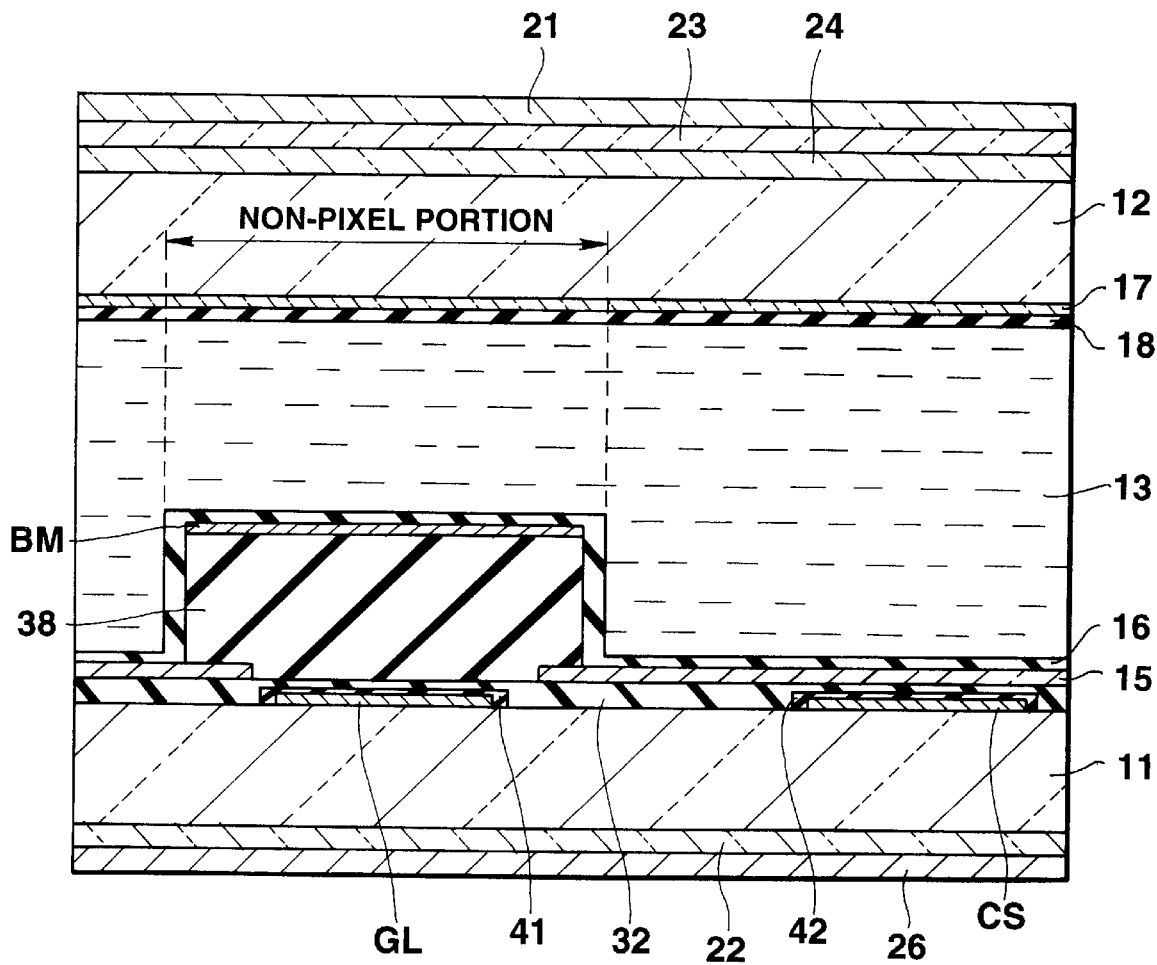
FIG. 72 is a cross-sectional view along the line B—B (FIG. 65) of an LCD device according to the twelfth embodiment of this invention.
Figure 73:
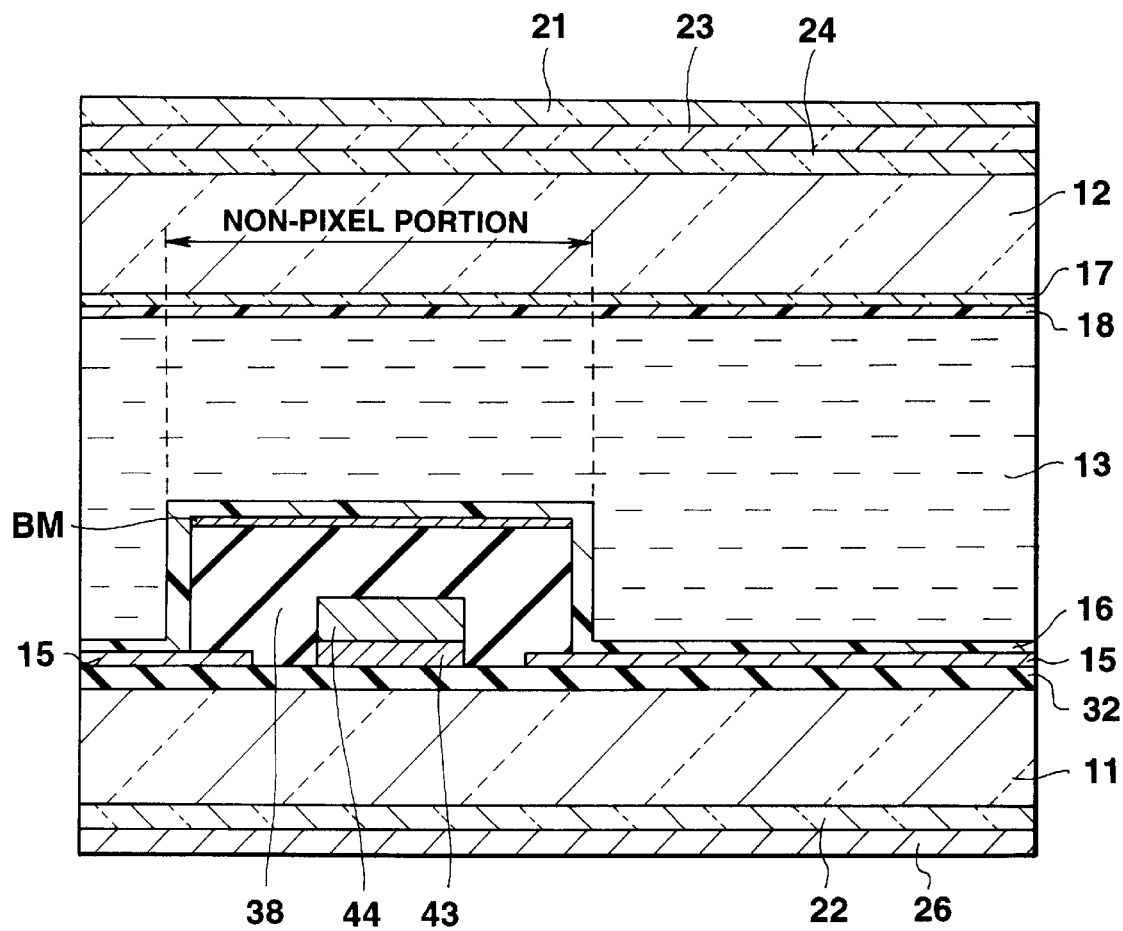
FIG. 73 is a cross-sectional view along the line C—C (FIG. 65) of an LCD device according to the twelfth embodiment of this invention.

FIGS. 71 through 73 show the cross-sectional structures along the lines A—A, B—B and C—C in FIG. 65 when the black mask BM is positioned on the TFT substrate side.

In the structure illustrated in FIGS. 71–73, the black mask BM is formed on the overcoat layer 38. The black mask BM with the illustrated pattern can be formed by forming an SiN film for the formation of the overcoat layer 38, then forming a light-shielding film for forming the black mask BM and finally patterning those films using a common patterning mask. This method can therefore reduce the number of steps for the photolithography processing.

Thirteenth Embodiment

Figure 74:
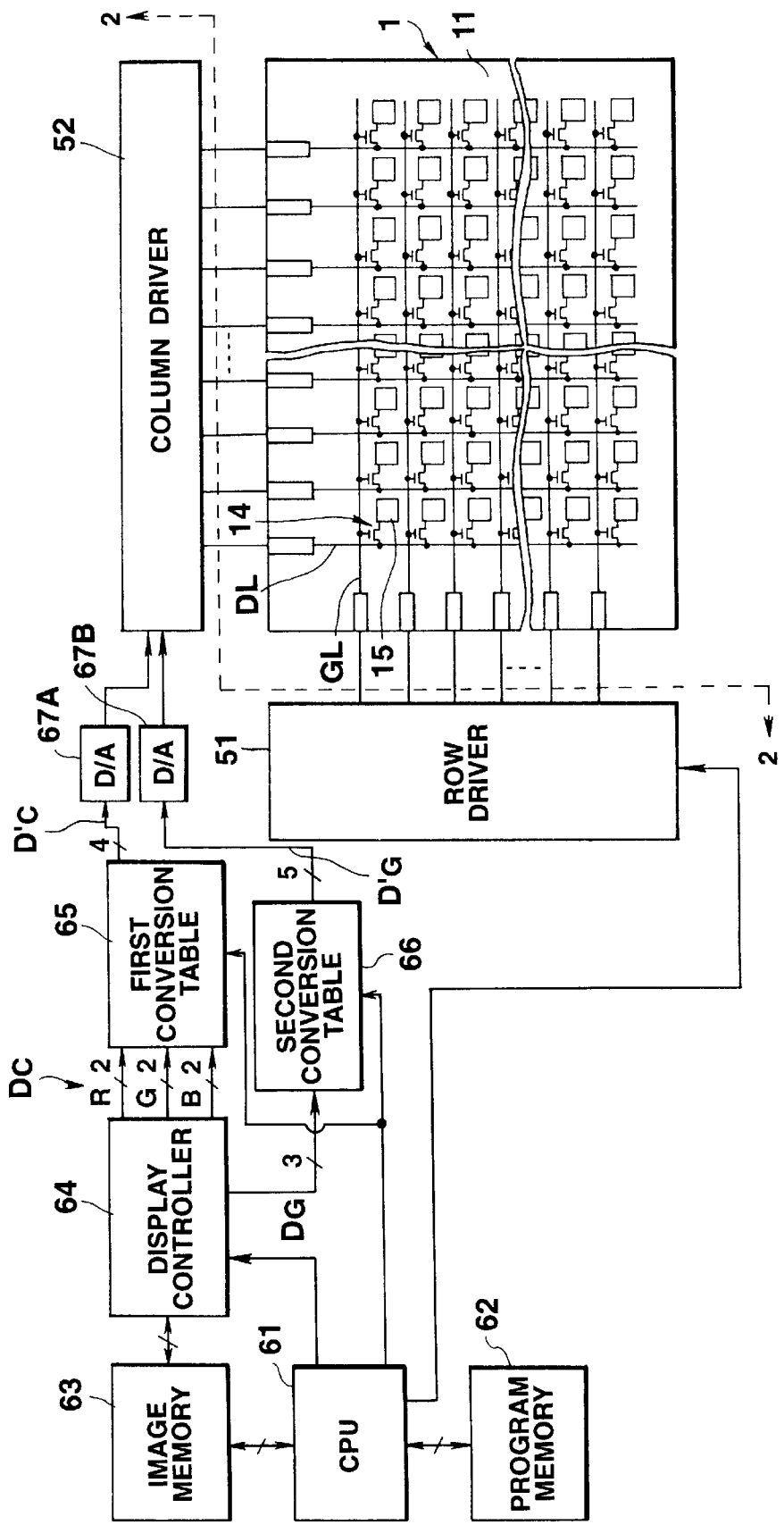
FIG. 74 is a block diagram illustrating the structure of an LCD apparatus according to the thirteenth embodiment of this invention.

FIG. 74 is a block diagram illustrating the structure of an LCD apparatus according to the thirteenth embodiment of this invention.

An LCD device 1 used in this LCD apparatus is the LCD device of the eleventh embodiment which has the black mask formed on the opposing substrate. But, an LCD device with the black mask formed on the TFT substrate or an LCD device without the black mask may also be used.

As illustrated, a driver 2 comprises a CPU 61, a program memory 62, an image memory (display memory) 63, a display controller 64, a first conversion table 65, a second conversion table 66, a D/A (Digital/Analog) converter 67A, a D/A converter 67B, a row driver 51 and a column driver 52.

The CPU 61 controls the entire system in accordance with predetermined programs. Stored in the program memory 62 are the operation programs for the CPU 61, such as an image forming program. Digital image data is written in the image memory 63 under the control of the CPU 61.

The display controller 64 sequentially reads digital image data from the image memory 63 under the control of the CPU 61, separates the data into color data $D_C$ consisting of six bits, two bits for each of RGB, and 3-bit gradation data $D_G$, and supplies the color data $D_C$ to the first conversion table 65 and the gradation data $D_G$ to the second conversion table 66.

The first conversion table 65 converts the 6-bit color data $D_C$ to 4-bit digital voltage data $D_C'$ which is in turn supplied to the D/A converter 67A. The D/A converter 67A converts the digital voltage data $D_C'$ to an analog color signal and supplies it to the column driver 52.

The second conversion table 66 converts the 3-bit gradation data $D_G$ to 5-bit digital voltage data $D_G'$ which is in turn supplied to the D/A converter 67B. The D/A converter 67B converts the digital voltage data $D_G'$ to an analog gradation signal and supplies it to the column driver 52.

The column driver 52 sequentially samples the analog color signal and the analog gradation signal for each scan line, and supplies the sampled analog color signal to odd-numbered data lines DL and the sampled analog gradation signal to even-numbered data lines DL.

The row driver 51 supplies a gate signal (scan signal) to the individual gate lines GL under the control of the CPU 61.

Figure 75:
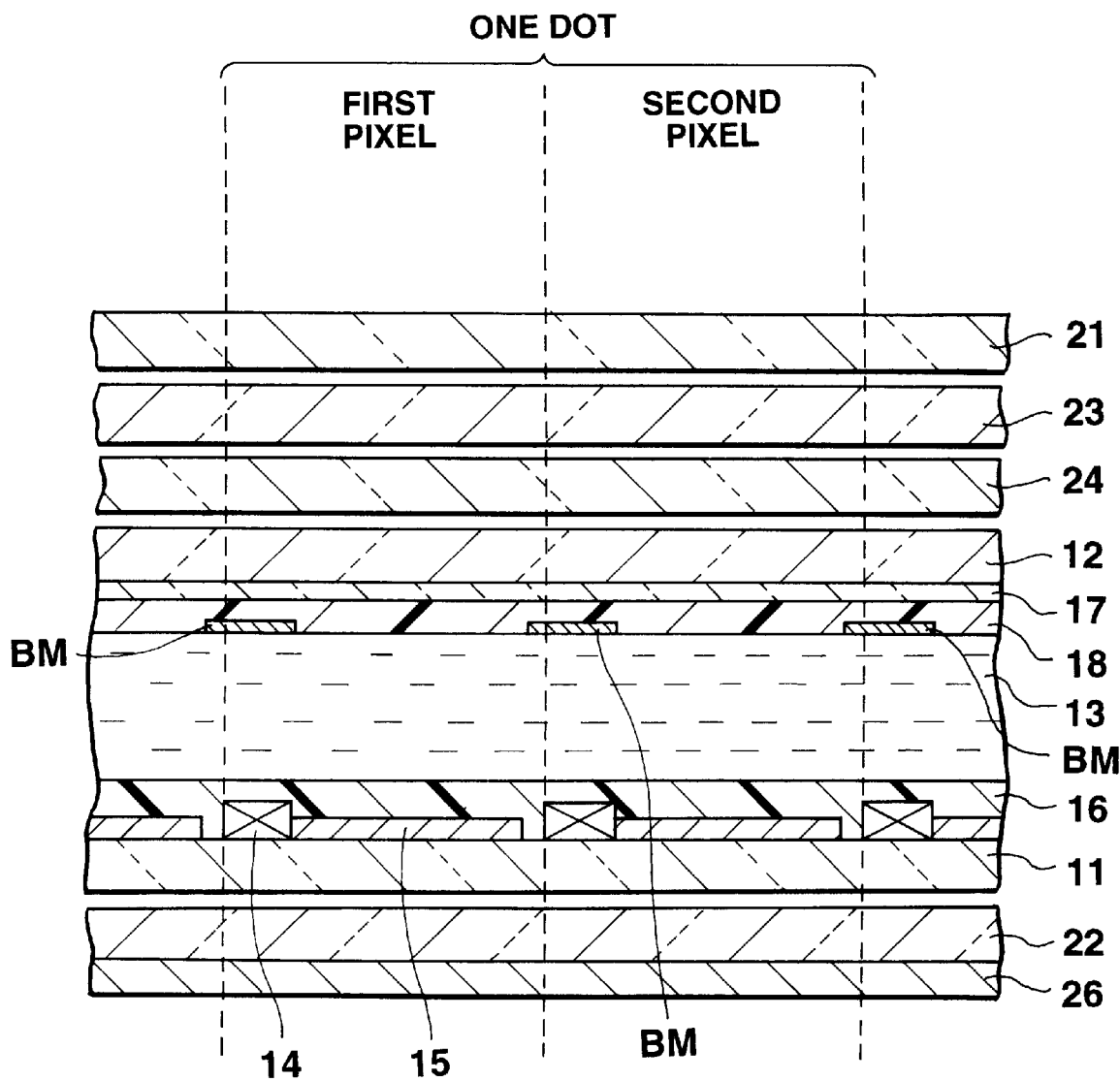
FIG. 75 is a diagram showing the structure of one dot of an ECB type LCD device in the LCD apparatus in FIG. 74.

According to the thus constituted LCD apparatus, each dot of the LCD device 1 (the minimum dot for displaying an image) is comprised of two adjoining pixels (first pixel and second pixel), as shown in FIG. 75.

Figure 76:
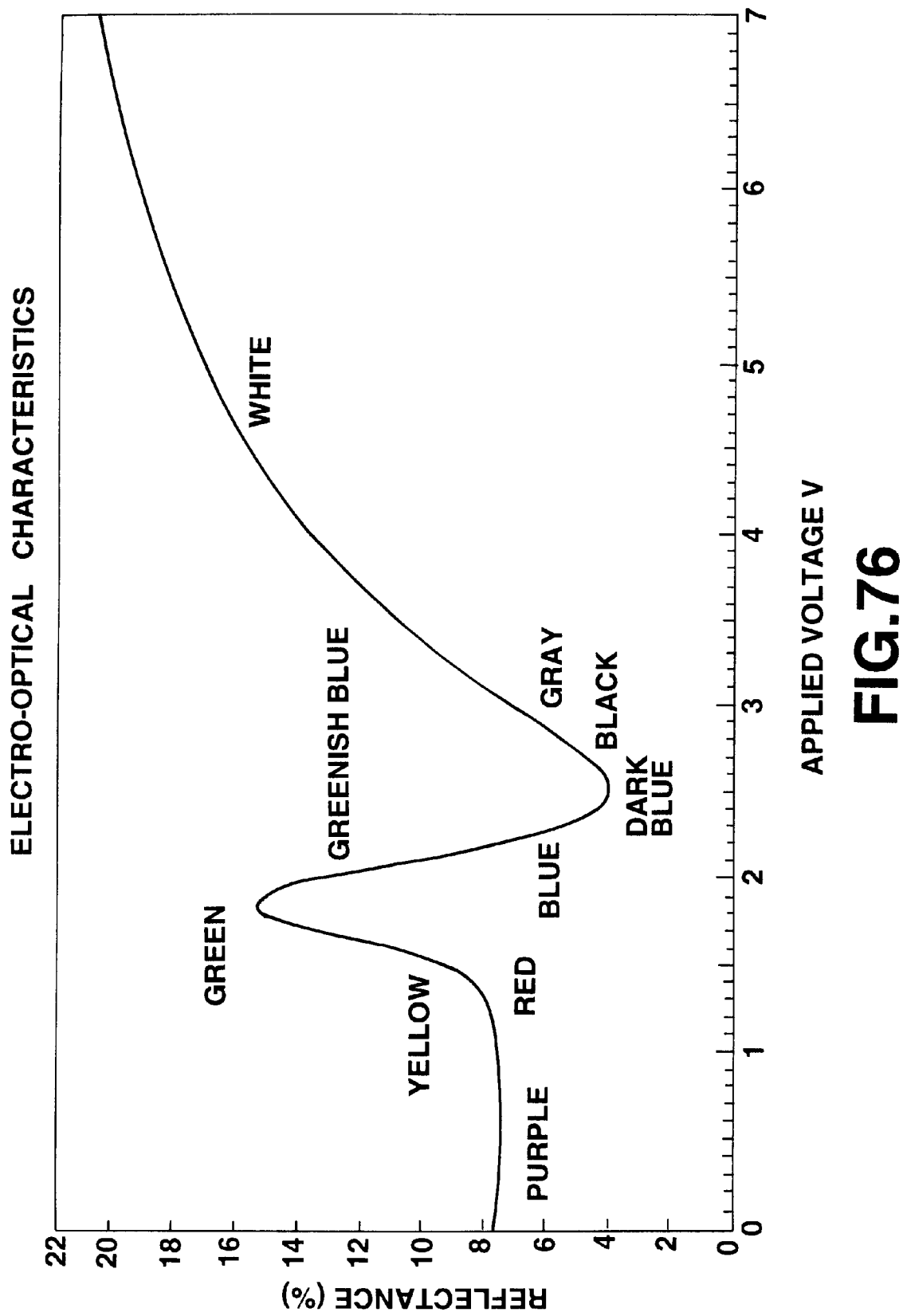
FIG. 76 is a diagram showing the relationship among the applied voltage, reflectance and display color.

As apparent from the characteristics shown in FIG. 76, colors are displayed and hue changes when the applied voltage is equal to or lower than a certain value (2.4 V), while it is colorless and only the luminance changes beyond this range. It is therefore possible to designate a color by applying an arbitrary voltage equal to or lower than 2.4 V to the first pixel. It is possible to designate a gradation by applying an arbitrary voltage greater than 2.4 V to the second pixel.

Each pixel is too small to be recognized by human eyes. Therefore, the display of the first pixel and that of the second pixel are visually synthesized to permit the viewer to recognize colors with different gradations, thus accomplishing color gradation display.

Figure 77A:
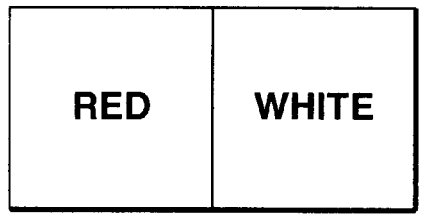
FIGS. 77A to 77D are diagrams exemplifying the display color for one dot and the display gradation in the LCD apparatus in FIG. 74.
Figure 77B:
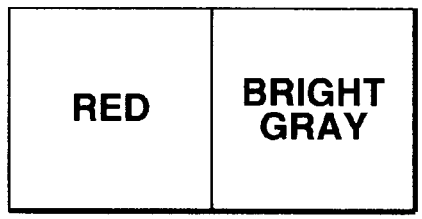
Figure 77C:
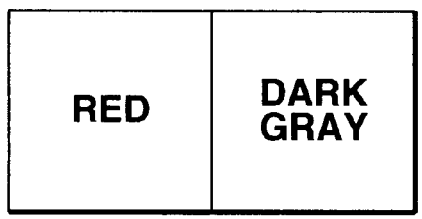
Figure 77D:
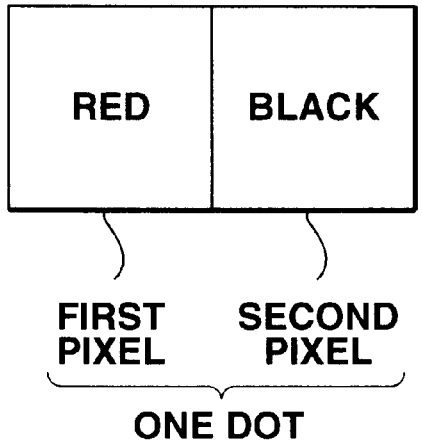

To display "bright red" as shown in FIG. 77A, for example, "red" should be displayed on the first pixel and "white" should be displayed on the second pixel. As a result, "bright red" is displayed. To display "little bright red" as shown in FIG. 77B, "red" should be displayed on the first pixel and "bright gray" should be displayed on the second pixel. To display "little dark red" as shown in FIG. 77C, "red" should be displayed on the first pixel and "dark gray" should be displayed on the second pixel. To display "dark red" as shown in FIG. 77D, "red" should be displayed on the first pixel and "black" should be displayed on the second pixel.

A description will now be given of how the first pixel and the second pixel display each color and each gradation.

In the driver 2 shown in FIG. 74, the CPU 61 runs the programs stored in the program memory 62 to properly write digital image data, which defines an image to be displayed, in the image memory 63. The display controller 64 reads the digital image data, written in the image memory 63 by the CPU 61.

The display controller 64 sends the 6-bit color data $D_C$ consisting of two bits for each of RGB, included in the read digital image data, to the first conversion table 65 and sends the gradation data $D_G$ to the second conversion table 66.

The first conversion table 65 converts the 6-bit color data $D_C$ to 4-bit digital voltage data $D_C'$ in accordance with the conversion table shown in FIG. 78. The second conversion table 66 converts the 3-bit gradation data $D_G$ to 5-bit digital voltage data $D_G'$ in accordance with the conversion table shown in FIG. 79.

For example, data "000001" indicating "dark blue," data "000010" indicating "deep blue" and data "000011" indicating "light blue" in the conversion table in FIG. 78 are converted to digital voltage data of "1001."

In the conversion table in FIG. 79, data "000" indicating "dark gradation" is converted to digital voltage data of "01101," and data "111" indicating "bright gradation" is converted to digital voltage data of data "10100."

The first conversion table 65 supplies the converted 4-bit digital voltage data $D_C'$ to the D/A converter 67A. The D/A converter 67A converts this digital voltage data $D_C'$ to an analog color signal and supplies it to the column driver 52. The second conversion table 66 supplies the 5-bit digital voltage data $D_G'$ to the D/A converter 67B. The D/A converter 67B converts this digital voltage data $D_G'$ to an analog gradation signal and supplies it to the column driver 52.

The column driver 52 sequentially samples the analog color signal and the analog gradation signal for each scan line, and supplies the voltage corresponding to the sampled analog color signal to odd-numbered data lines DL and the voltage corresponding to the sampled analog gradation signal to even-numbered data lines DL.

The TFTs 14 are turned on at the timing at which the scan signal (gate signal) is supplied from the row driver 51, allowing the voltages corresponding to the sampled analog color signal and the sampled analog gradation signal, which have been applied to the data lines DL, are respectively applied to an odd-numbered column of pixel electrodes and an even-numbered column of pixel electrodes. That is, those voltages are respectively applied to the first pixel and the second pixel.

In accordance with the applied voltages, the first pixel displays the associated color and the second pixel displays the associated colorless gradation.

The display of the first pixel and that of the second pixel are visually synthesized to permit the viewer to recognize a color gradation image.

Fourteenth Embodiment

Figure 80:
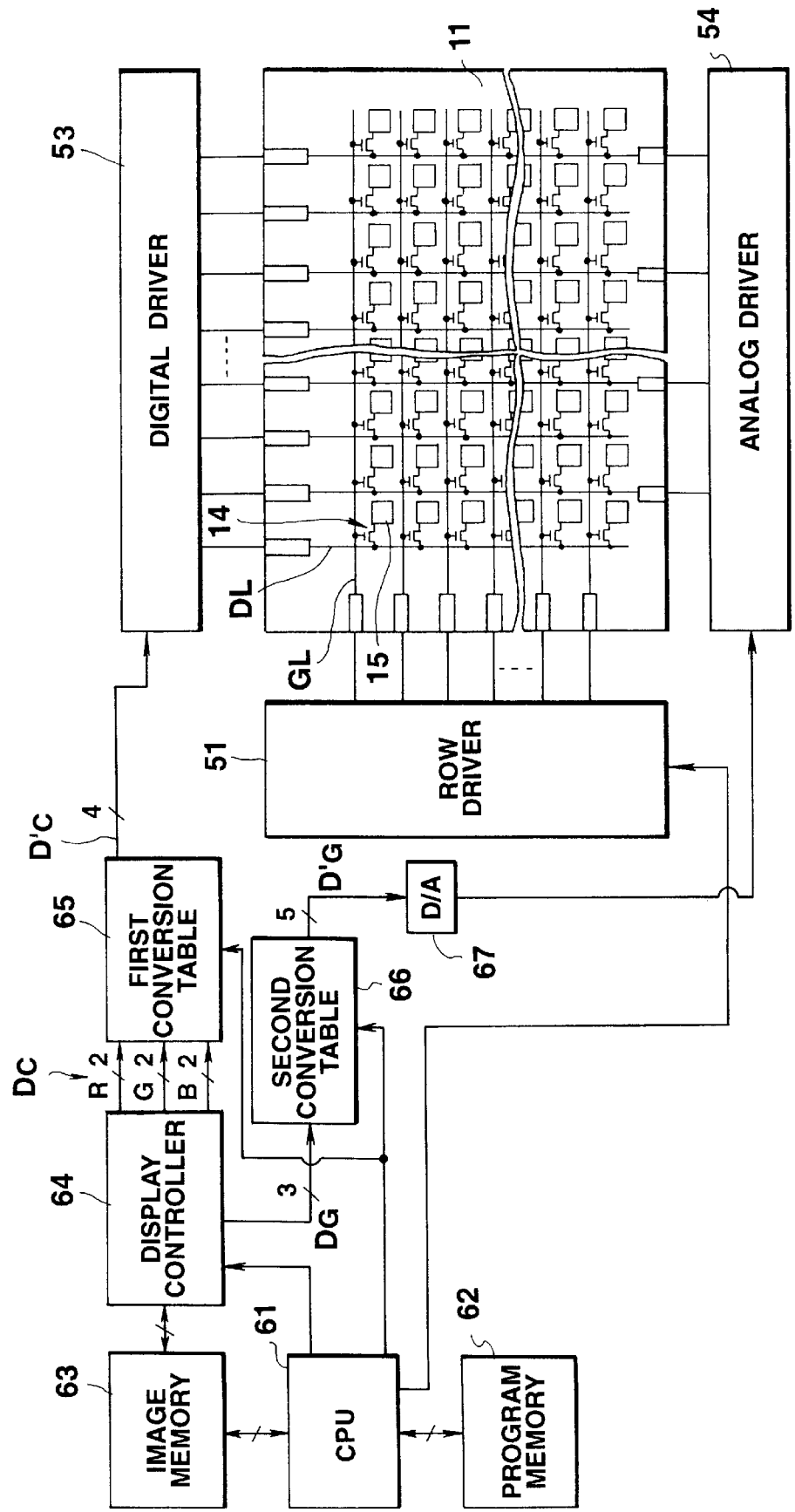
FIG. 80 is a block diagram illustrating the structure of an LCD apparatus according to the fourteenth embodiment of this invention.

Although the column driver 52 drives the first and second pixels in the thirteenth embodiment, separate drivers may be used to drive the first and second pixels respectively. FIG. 80 shows the structure of an ECB type LCD apparatus with such a modified structure.

A digital driver 53 is connected to odd-numbered data lines DL. The first conversion table 65 is connected to the digital driver 53 to supply digital voltage data $D_C'$ to this driver 53.

An analog driver 54 is connected to even-numbered data lines DL. The D/A converter 67 is connected to the analog driver 54 to supply an analog gradation signal to this driver 54.

The digital driver 53 samples one scan line of digital voltage data $D_C'$, converts the data to an analog color signal by means of an incorporated D/A converter, and supplies a voltage corresponding to the analog color signal to the odd-numbered columns of data lines DL. The analog driver 54 samples one scan line of an analog gradation signals, and supplies voltages corresponding to the sampled analog gradation signals to the even-numbered columns of data lines DL.

When supplied with the scan signal from the row driver 51, the TFTs 14 are turned on so that voltages corresponding to the analog color signal and the analog gradation signal are respectively applied to the first and second pixels via the enabled TFTs 14.

In accordance with the applied voltages, the first pixel displays the associated color and the second pixel displays the associated colorless gradation.

The display of the first pixel and that of the second pixel are visually synthesized to permit the viewer to recognize a color gradation image.

According to the above-described structure, the digital driver 53 supplies only the voltage corresponding to the analog color signal to the data lines DL. It is therefore possible to suppress the supply voltage of the digital driver 53 to about the maximum voltage (3.75 V) needed to display colors, thus reducing the consumed power.

Further, the data $D_C'$ supplied to the digital driver 53 is a digital signal, causing no variation in the specified color originating from signal rounding which is inevitable in the case of an analog signal. Therefore, the color as specified can be displayed on the first pixel, thus preventing irregular colors from being displayed.

Fifteenth Embodiment

Although the thirteenth and fourteenth embodiments are designed in such a way that the first pixel displays a color and the second pixel displays a gradation, a color and a gradation may be displayed in two consecutive frames, not by the first and second pixels.

The operation of the fifteenth embodiment with such a structure will now be discussed.

The circuit structure is the same as that of the LCD apparatus shown in FIG. 74.

For odd-numbered frames, the first conversion table 65 and the D/A converter 67A operate so that the column driver 52 sequentially samples the analog gradation signal from the D/A converter 67A and supplies a voltage corresponding to the associated sample data to all the data lines DL. For even-numbered frames, the second conversion table 66 and the D/A converter 67B operate so that the column driver 52 sequentially samples the analog gradation signal from the D/A converter 67B and supplies a voltage corresponding to the associated sample data to all the data lines DL.

With this structure, a color image displayed in an odd-numbered frame and a monochrome image displayed in an even-numbered frame are visually synthesized to permit the viewer to recognize a color gradation image.

The same structure may be achieved by the circuit structure shown in FIG. 80.

In this case, the digital driver 53 and the analog driver 54 are both connected to all the data lines DL. Thus, the output terminal of the digital driver 53 is connected to the output terminal of the analog driver 54 via the data lines DL.

For odd-numbered frames, the first conversion table 65 and the digital driver 53 operate to supply a voltage corresponding to the gradation signal to all the data lines DL. At this time, the output terminal of the analog driver 54 is set open. For even-numbered frames, the second conversion table 66 and the D/A converter 67 operate to supply a voltage corresponding to the analog gradation signal to all the data lines DL. At this time, the output terminal of the digital driver 53 is set open.

This structure also can allow a viewer to visually combine a color image displayed in an odd-numbered frame and a monochrome image displayed in an even-numbered frame and to recognize a color gradation image.

In displaying an arbitrary image by plural frames of display images combined, it is desirable to set the effective frame frequency equal to or higher than 30 Hz.

MODIFICATION OF EMBODIMENTS

Although this invention is adapted to an ECB type LCD device which has TFTs as active elements in the first to fifteenth embodiments, this invention is also adaptable to an ECB type LCD device which uses MIMs as active elements. This invention can be adapted to a passive matrix ECB type LCD device which does not use active elements or an ECB type LCD device of a segment type.

Although this invention is adapted to an ECB type LCD device of a reflection type in the first to ninth embodiments and the eleventh to the fifteenth embodiments and is adapted to an ECB type LCD device of a transparent type, this invention (any of the first to fifteenth embodiments) is adaptable to both reflection and transparent type LCD apparatuses.

Although the described LCD devices of the first to fifteenth embodiments are of a TN type, this invention may also be adapted to an STN type LCD device.

Although the polarization plates of the embodiments 1-1 and 1-2 are used in the color LCD device according to the first embodiment, those polarization plates are also adaptable to a monochromatic LCD device.

In the first embodiment, the directions of the transmission axes of the polarization plates can be changed as desired.

In the first to fifteenth embodiments, the directions of the transmission axes of the polarization plates, the number of the retardation plates (including the case of no retardation plate), the directions of the phase-delay axes and the retardation values of the retardation plates, and the retardation value Δnd of the LC cell 10 can be changed as needed.

In the thirteenth to fifteenth embodiments, the colors that are displayable by each dot of the LCD device 1 are not limited to the three primary colors. That is, displayable colors, and an achromatic colors of black or white may be combined to ensure gradation display of any color.

The structures of the above-described embodiments can be combined as needed. For example, the LCD device with the structure of the second embodiment may be provided with the black mask in the eleventh embodiment, and color and gradation may be displayed as done in the fifteenth embodiment. Properly combining the above-described embodiments can accomplish full-color display.

Although a single dot is constituted of two pixels in the thirteenth and fourteenth embodiments, it may be constituted of three or more pixels. For instance, a single dot may be constituted of a single pixel for displaying a color and a plurality of pixels for displaying gradations. Alternatively, a single dot may be constituted of a plurality of pixels for displaying colors and a single pixel for displaying a gradation, or a plurality of pixels for displaying colors and a plurality of pixels for displaying gradations.

Although the color display and the gradation display are switched between two consecutive frames and image data is displayed based on the visual combination of the color and gradation in the fifteenth embodiment, such switching may be performed over three or more consecutive frames. For example, the first and third frames in three consecutive frames may be used for color display while the second frame is used for gradation display.

What is claimed is:

1. A liquid crystal display device comprising:

a first substrate having first electrodes formed thereon;

a second substrate positioned to face said first substrate and having second electrodes formed thereon;

a liquid crystal sealed between said first and second substrates; and first and second polarization plates arranged to sandwich said first and second substrates, each having such polarization and transmittance characteristics that when only said first and second polarization plates are placed one on the other in such a way as to have substantially perpendicular transmission axes, a spectrum deviation value of a transmission light, which is acquired by dividing a transmittance of light with a wavelength of 500 nm by a transmittance of light with a wavelength of 440 nm, becomes substantially smaller than 0.4.

2. The liquid crystal display device according to claim 1, wherein each of said first and second polarization plates has the polarization and transmittance characteristics such that when only said first and second polarization plates are placed one on the other in such a way as to have substantially parallel transmission axes, a spectrum deviation value of a transmission light which is acquired by subtracting a transmittance of light with a wavelength of 640 nm from a transmittance of light with a wavelength of 460 nm, is greater than −3%.

3. The liquid crystal display device according to claim 1, wherein a reflector is provided outside of one of said first and second polarization plates.

4. The liquid crystal display device according to claim 1, wherein said first and second polarization plates are arranged to have said transmission axes set in such directions as to cause said liquid crystal display device to display a plurality of colors, white and black in accordance with a voltage applied between said first and second electrodes.

* * * * *